US012319498B2

(12) United States Patent
Rocholl et al.

(10) Patent No.: US 12,319,498 B2
(45) **Date of Patent: *Jun. 3, 2025**

(54) REAR ELECTRIC LOADER FOR ELECTRIC REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Doge Center, MN (US); Andrew Kotloski, Oshkosh, WI (US); Wallace Buege, West Bend, WI (US); Caleb Binder, Oshkosh, WI (US); Martin J. Schimke, Red Granite, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,943

(22) Filed: Dec. 15, 2023

(65) Prior Publication Data

US 2024/0116706 A1 Apr. 11, 2024

Related U.S. Application Data

(63) Continuation of application No. 16/851,522, filed on Apr. 17, 2020, now Pat. No. 11,878,861.

(Continued)

(51) Int. Cl.
*B65F 3/20* (2006.01)
*B65F 3/24* (2006.01)

(52) U.S. Cl.
CPC .............. *B65F 3/208* (2013.01); *B65F 3/203* (2013.01); *B65F 3/24* (2013.01)

(58) Field of Classification Search
CPC ......... B30B 3/02; B30B 9/205; B30B 9/3035; B30B 9/325; B65F 3/14; B65F 3/20;
(Continued)

(56) References Cited

U.S. PATENT DOCUMENTS 2,730,255 A 1/1956 Gibson et al.
2,836,316 A 5/1958 Schonrock
(Continued)

FOREIGN PATENT DOCUMENTS

CN 104495161 4/2015
CN 106275991 A 1/2017
(Continued)

*Primary Examiner* — James Keenan
(74) *Attorney, Agent, or Firm* — FOLEY & LARDNER LLP

(57) ABSTRACT

A refuse vehicle includes a chassis, a body assembly, and a tailgate. The body assembly is coupled to the chassis and defines a refuse compartment configured to store refuse material. The tailgate comprises a refuse receiving portion, a thresher assembly, and an electrically driven actuation mechanism. The refuse receiving portion is configured to receive refuse material. The thresher assembly includes a compaction thresher including a plurality of tines and a plurality of tine springs configured to bias the plurality of tines in a direction of compaction. The plurality of tine springs are each disposed around a corresponding tine of the plurality of tines. The electrically driven actuation mechanism is configured to selectively actuate the thresher assembly.

20 Claims, 48 Drawing Sheets

Related U.S. Application Data

(60) Provisional application No. 62/842,978, filed on May 3, 2019.

(58) Field of Classification Search
CPC .......... B65F 3/202; B65F 3/203; B65F 3/208; B65F 3/24; B65F 3/28
USPC ...................................................... 100/39, 94
See application file for complete search history.

(56) References Cited

U.S. PATENT DOCUMENTS

| | | | |
|---|---|---|---|
| 3,499,558 | A | 3/1970 | Rey |
| 3,559,825 | A | 2/1971 | Meyer |
| 3,572,526 | A | 3/1971 | Gollnick |
| 3,696,951 | A | 10/1972 | Toppins |
| 3,878,949 | A | 4/1975 | Semat |
| 4,016,988 | A | 4/1977 | Dahlin |
| 4,406,573 | A | 9/1983 | Colin |
| 4,453,879 | A | 6/1984 | Kelley |
| 4,544,320 | A | 10/1985 | Haines |
| 5,857,822 | A | 1/1999 | Christenson |
| 5,919,027 | A | 7/1999 | Christenson |
| 5,934,858 | A | 8/1999 | Christenson |
| 5,934,867 | A | 8/1999 | Christenson |
| 5,938,394 | A | 8/1999 | Christenson |
| 5,951,235 | A | 9/1999 | Young et al. |
| 5,967,731 | A | 10/1999 | Brandt |
| 5,971,694 | A | 10/1999 | McNeilus et al. |
| 5,984,609 | A | 11/1999 | Bartlett |
| 6,033,176 | A | 3/2000 | Bartlett |
| 6,062,803 | A | 5/2000 | Christenson |
| 6,089,813 | A | 7/2000 | McNeilus et al. |
| 6,120,235 | A | 9/2000 | Humphries et al. |
| 6,123,500 | A | 9/2000 | McNeilus et al. |
| 6,210,094 | B1 | 4/2001 | McNeilus et al. |
| 6,213,706 | B1 | 4/2001 | Christenson |
| 6,224,318 | B1 | 5/2001 | McNeilus et al. |
| 6,315,515 | B1 | 11/2001 | Young et al. |
| 6,336,783 | B1 | 1/2002 | Young et al. |
| 6,350,098 | B1 | 2/2002 | Christenson et al. |
| 6,390,758 | B1 | 5/2002 | McNeilus et al. |
| 6,447,239 | B2 | 9/2002 | Young et al. |
| 6,474,928 | B1 | 11/2002 | Christenson |
| 6,565,305 | B2 | 5/2003 | Schrafel |
| 7,070,382 | B2 | 7/2006 | Pruteanu et al. |
| 7,073,620 | B2 | 7/2006 | Braun et al. |
| 7,198,130 | B2 | 4/2007 | Schimke |
| 7,258,194 | B2 | 8/2007 | Braun et al. |
| 7,284,943 | B2 | 10/2007 | Pruteanu et al. |
| 7,357,203 | B2 | 4/2008 | Morrow et al. |
| 7,448,460 | B2 | 11/2008 | Morrow et al. |
| 7,556,468 | B2 | 7/2009 | Grata |
| 7,559,735 | B2 | 7/2009 | Pruteanu et al. |
| 7,824,293 | B2 | 11/2010 | Schimke |
| 7,828,366 | B2 | 11/2010 | Andre et al. |
| 7,878,750 | B2 | 2/2011 | Zhou et al. |
| 7,931,103 | B2 | 4/2011 | Morrow et al. |
| 8,123,645 | B2 | 2/2012 | Schimke |
| 8,132,846 | B2 | 3/2012 | Kitayama et al. |
| 8,182,194 | B2 | 5/2012 | Pruteanu et al. |
| 8,215,892 | B2 | 7/2012 | Calliari |
| 8,337,352 | B2 | 12/2012 | Morrow et al. |
| 8,360,706 | B2 | 1/2013 | Addleman et al. |
| 8,540,475 | B2 | 9/2013 | Kuriakose et al. |
| 8,561,735 | B2 | 10/2013 | Morrow et al. |
| 8,807,613 | B2 | 8/2014 | Howell et al. |
| 8,864,613 | B2 | 10/2014 | Morrow et al. |
| 9,174,686 | B1 | 11/2015 | Messina et al. |
| 9,216,856 | B2 | 12/2015 | Howell et al. |
| 9,387,985 | B2 | 7/2016 | Gillmore et al. |
| 9,428,042 | B2 | 8/2016 | Morrow et al. |
| 9,650,032 | B2 | 5/2017 | Kotloski et al. |
| 9,651,120 | B2 | 5/2017 | Morrow et al. |
| 9,656,659 | B2 | 5/2017 | Shukla et al. |
| 9,707,869 | B1 | 7/2017 | Messina et al. |
| 9,880,581 | B2 | 1/2018 | Kuriakose et al. |
| 9,908,520 | B2 | 3/2018 | Shukla et al. |
| 9,970,515 | B2 | 5/2018 | Morrow et al. |
| 9,981,803 | B2 | 5/2018 | Davis et al. |
| 10,029,555 | B2 | 7/2018 | Kotloski et al. |
| 10,029,556 | B2 | 7/2018 | Morrow et al. |
| 10,160,438 | B2 | 12/2018 | Shukla et al. |
| 10,196,205 | B2 | 2/2019 | Betz et al. |
| 10,267,390 | B2 | 4/2019 | Morrow et al. |
| 10,357,995 | B2 | 7/2019 | Palmer et al. |
| 10,358,854 | B1 | 7/2019 | Guygaew |
| 10,414,067 | B2 | 9/2019 | Datema et al. |
| 10,421,350 | B2 | 9/2019 | Morrow et al. |
| 10,435,026 | B2 | 10/2019 | Shively et al. |
| 10,457,134 | B2 | 10/2019 | Morrow et al. |
| 10,457,533 | B2 | 10/2019 | Puszkiewicz et al. |
| 10,558,234 | B2 | 2/2020 | Kuriakose et al. |
| 10,578,195 | B2 | 3/2020 | Steinberger et al. |
| 10,584,775 | B2 | 3/2020 | Steinberger et al. |
| 10,752,439 | B2 | 8/2020 | Musso et al. |
| 2017/0044815 | A1 | 2/2017 | Watanabe |
| 2018/0250847 | A1 | 9/2018 | Wurtz et al. |
| 2018/0326832 | A1 | 11/2018 | Kotloski et al. |
| 2019/0091890 | A1 | 3/2019 | Rocholl et al. |
| 2019/0111910 | A1 | 4/2019 | Shukla et al. |
| 2019/0121353 | A1 | 4/2019 | Datema et al. |
| 2019/0161272 | A1 | 5/2019 | Betz et al. |
| 2019/0193934 | A1 | 6/2019 | Rocholl et al. |
| 2019/0242460 | A1 | 8/2019 | Morrow et al. |
| 2019/0322321 | A1 | 10/2019 | Schwartz et al. |
| 2019/0325220 | A1 | 10/2019 | Wildgrube et al. |
| 2019/0344475 | A1 | 11/2019 | Datema et al. |
| 2019/0360600 | A1 | 11/2019 | Jax et al. |
| 2019/0366828 | A1 | 12/2019 | Morrow et al. |
| 2020/0039341 | A1 | 2/2020 | Morrow et al. |
| 2020/0078986 | A1 | 3/2020 | Clifton et al. |
| 2020/0102145 | A1 | 4/2020 | Nelson et al. |
| 2020/0200237 | A1 | 6/2020 | Steinberger et al. |
| 2020/0200238 | A1 | 6/2020 | Steinberger et al. |
| 2020/0230841 | A1 | 7/2020 | Datema et al. |
| 2020/0230842 | A1 | 7/2020 | Datema et al. |
| 2020/0262328 | A1 | 8/2020 | Nelson et al. |
| 2020/0262366 | A1 | 8/2020 | Wildgrube et al. |
| 2020/0265656 | A1 | 8/2020 | Koga et al. |
| 2020/0347659 | A1 | 11/2020 | Rocholl et al. |

FOREIGN PATENT DOCUMENTS

| | | | |
|---|---|---|---|
| DE | 42 26 807 | A1 | 2/1994 |
| EP | 0 421 91 | A1 | 12/1981 |
| EP | 0 569 28 | | 8/1982 |
| EP | 0 636 556 | A1 | 8/1997 |
| EP | 1 236 657 | A1 | 9/2002 |
| FR | 2483372 | | 12/1981 |
| GB | 1 065 887 | A | 4/1967 |
| GB | 1 438 135 | A | 6/1976 |
| GB | 2 224 717 | A | 5/1990 |
| GB | 2 412 905 | A | 10/2005 |
| KP | KR100806770 | B1 | 2/2008 |
| KR | 20170096264 | A | 8/2017 |
| WO | WO-2006/010789 | A1 | 2/2006 |
| WO | WO-2012/042826 | A1 | 4/2012 |
| WO | WO-2016/049707 | | 4/2016 |

REAR ELECTRIC LOADER FOR ELECTRIC REFUSE VEHICLE

CROSS-REFERENCE TO RELATED APPLICATION

This application is a continuation of U.S. application Ser. No. 16/851,522, filed Apr. 17, 2020, now U.S. Pat. No. 11,878,861, which claims the benefit of U.S. Provisional Application No. 62/842,978, filed May 3, 2019, each of which is incorporated herein by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One exemplary embodiment relates to a refuse vehicle. The refuse vehicle includes a chassis, a body, a power source, a tailgate, and an electrically driven actuation mechanism. The chassis is coupled to a plurality of wheels. The body assembly is coupled to the chassis and defines a refuse compartment configured to store refuse material. The tailgate comprises a refuse receiving portion, a tailgate compaction assembly, and an electrically driven actuation mechanism. The refuse receiving portion is configured to receive refuse material. The tailgate compaction assembly is selectively actuatable to compact the refuse material received by the refuse receiving portion into the refuse compartment. The electrically driven actuation mechanism is powered by the power source and is configured to selectively actuate the tailgate compaction assembly.

Another exemplary embodiment relates to a refuse vehicle. The refuse vehicle includes a chassis, a body, a power source, a tailgate, an ejector mechanism, and an electrically driven actuation mechanism. The chassis is coupled to a plurality of wheels. The body assembly is coupled to the chassis and defines a refuse compartment configured to store refuse material. The tailgate is moveable between an opened position and a closed position. The ejector mechanism is selectively actuatable to move an ejector between a refuse receiving position and an ejecting position. The electrically driven actuation mechanism is powered by the power source and configured to selectively actuate the ejector mechanism.

Another exemplary embodiment relates to a refuse vehicle. The refuse vehicle includes a chassis, a body, a power source, and a tailgate. The chassis is coupled to a plurality of wheels. The body assembly is coupled to the chassis and defines a refuse compartment configured to store refuse material. The tailgate is moveable between an opened position and a closed position. The tailgate comprises a tailgate lifting mechanism and an electric motor. The tailgate lifting mechanism is selectively actuatable to move the tailgate between the opened position and the closed position. The electric motor is powered by the power source and is configured to selectively actuate the tailgate lifting mechanism.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a rear loader system may incorporate various electrically-powered actuators and the like to effectively load and pack waste into a hopper volume of a refuse vehicle. That is, the electrically-actuated rear loader system may function without the inclusion of high-pressure, leak-prone hydraulic tanks, hydraulic lines, and hydraulic fluid generally. Thus, the electrically-actuated rear loader system may allow for reduced maintenance and upkeep as compared to traditional hydraulically-actuated rear loader and packer systems.

Overall Vehicle

Figure 1:
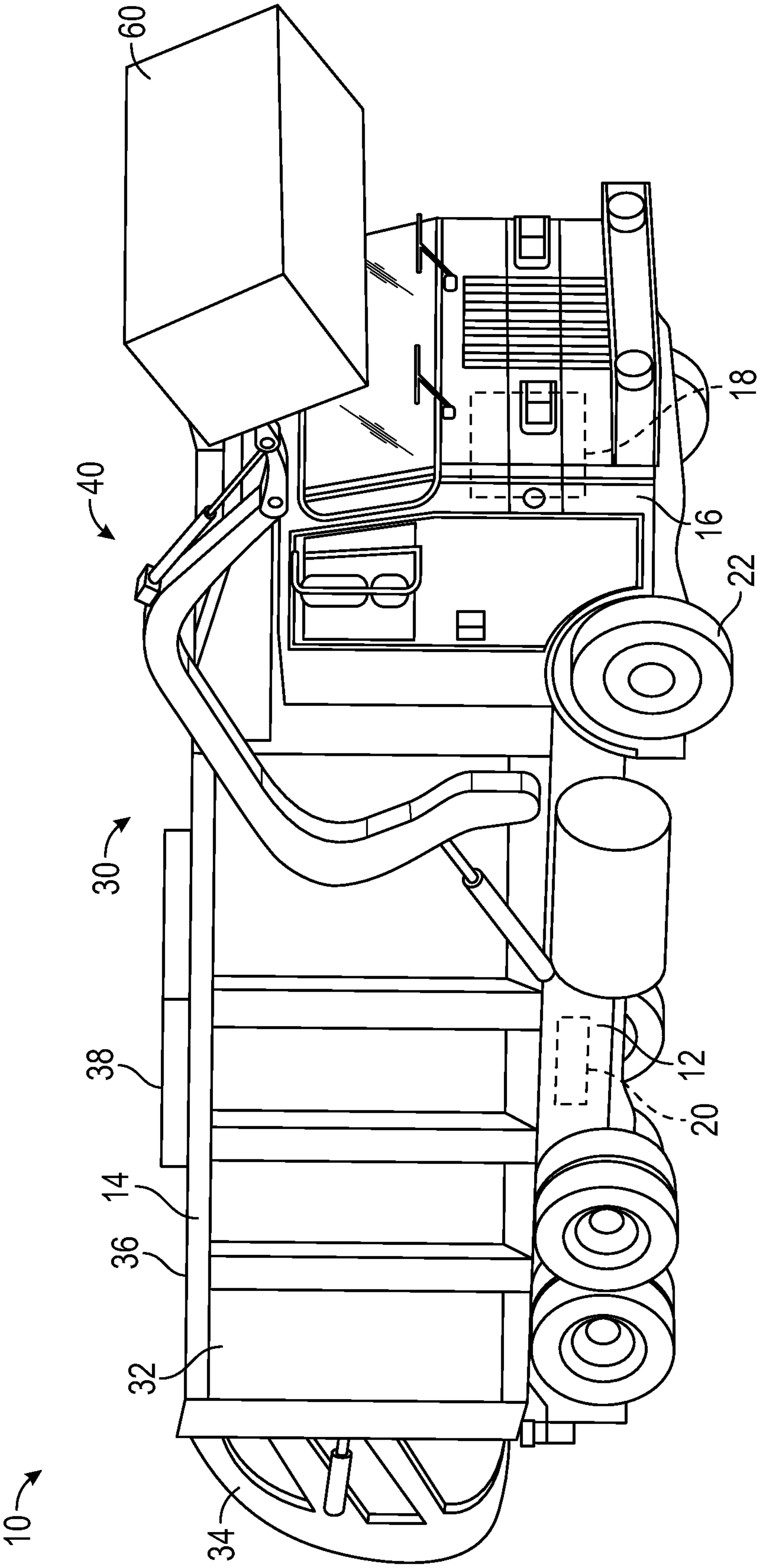
FIG. 1 is a perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck (see, e.g., FIG. 2). In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and a power source, shown as battery system 20. In other embodiments, the prime mover is or includes an internal combustion engine. According to the exemplary embodiment shown in FIG. 1, the electric motor 18 is coupled to the frame 12 at a position beneath the cab 16. In some exemplary embodiments, the electric motor 18 may be coupled to the frame 12 at a position within or behind the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independent driving of one or more of the wheels 22. In still other embodiments, the electric motor 18 or a secondary electric motor is coupled to and configured to drive a hydraulic system that powers hydraulic actuators. According to the exemplary embodiment shown in FIG. 1, the battery system 20 is coupled to the frame 12 beneath the body 14. In other embodiments, the battery system 20 is otherwise positioned (e.g., within a tailgate of the refuse vehicle 10, beneath the cab 16, along the top of the body 14, within the body 14).

According to an exemplary embodiment, the battery system 20 is configured to (a) receive, generate, and/or store power and (b) provide electric power to (i) the electric motor 18 to drive the wheels 22, (ii) electric actuators and/or pumps of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The battery system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the battery system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The battery system 20 may thereby be charged via an on-board electrical energy generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the battery system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility.

According to the embodiment shown in FIG. 1, the body 14 and the refuse compartment 30 are positioned behind the cab 16. In some embodiments, at least a portion of the body 14 and the refuse compartment 30 extend above or in front of the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30). For example, in these instances, the refuse vehicle 10 may be a front-loading refuse vehicle or a side-loading refuse vehicle. In other embodiments, the storage volume is positioned between the hopper volume and the cab 16. For example, in these instances, the refuse vehicle 10 may be a rear-loading refuse vehicle.

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Rear Electric Loader

Figure 2:
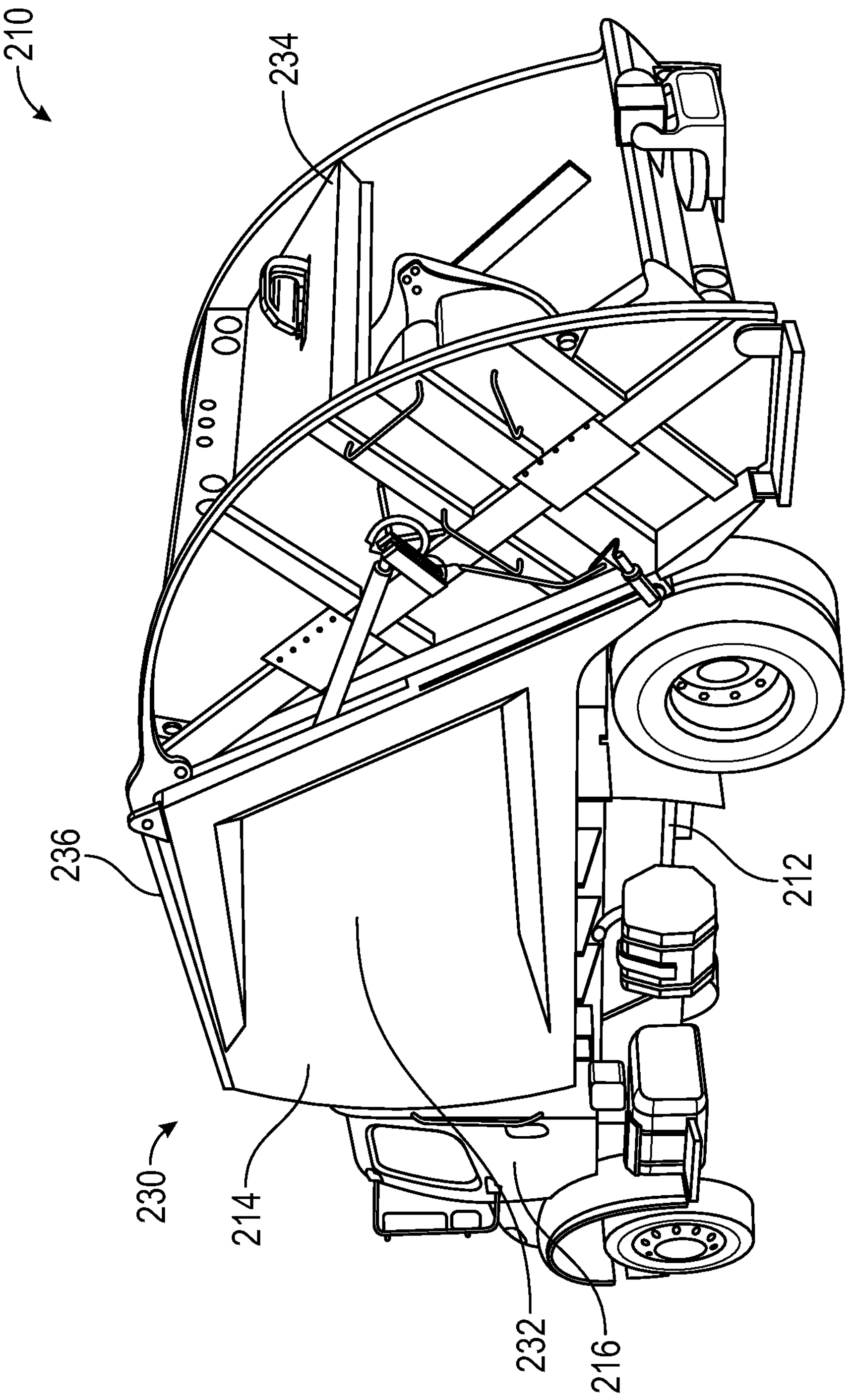
FIG. 2 is a perspective view of another refuse vehicle, according to an exemplary embodiment.

As shown in FIG. 2, a vehicle, shown as refuse vehicle 210, is configured as a rear-loading refuse vehicle. The rear-loading refuse vehicle 210 includes a frame 212, similar to the frame 12; a body assembly, shown as body 214, coupled to the frame 212; and a cab, shown as cab 216. The refuse vehicle 210 also includes an electric motor, similar to the electric motor 18, and a battery system, similar to the battery system 20.

Figure 3:
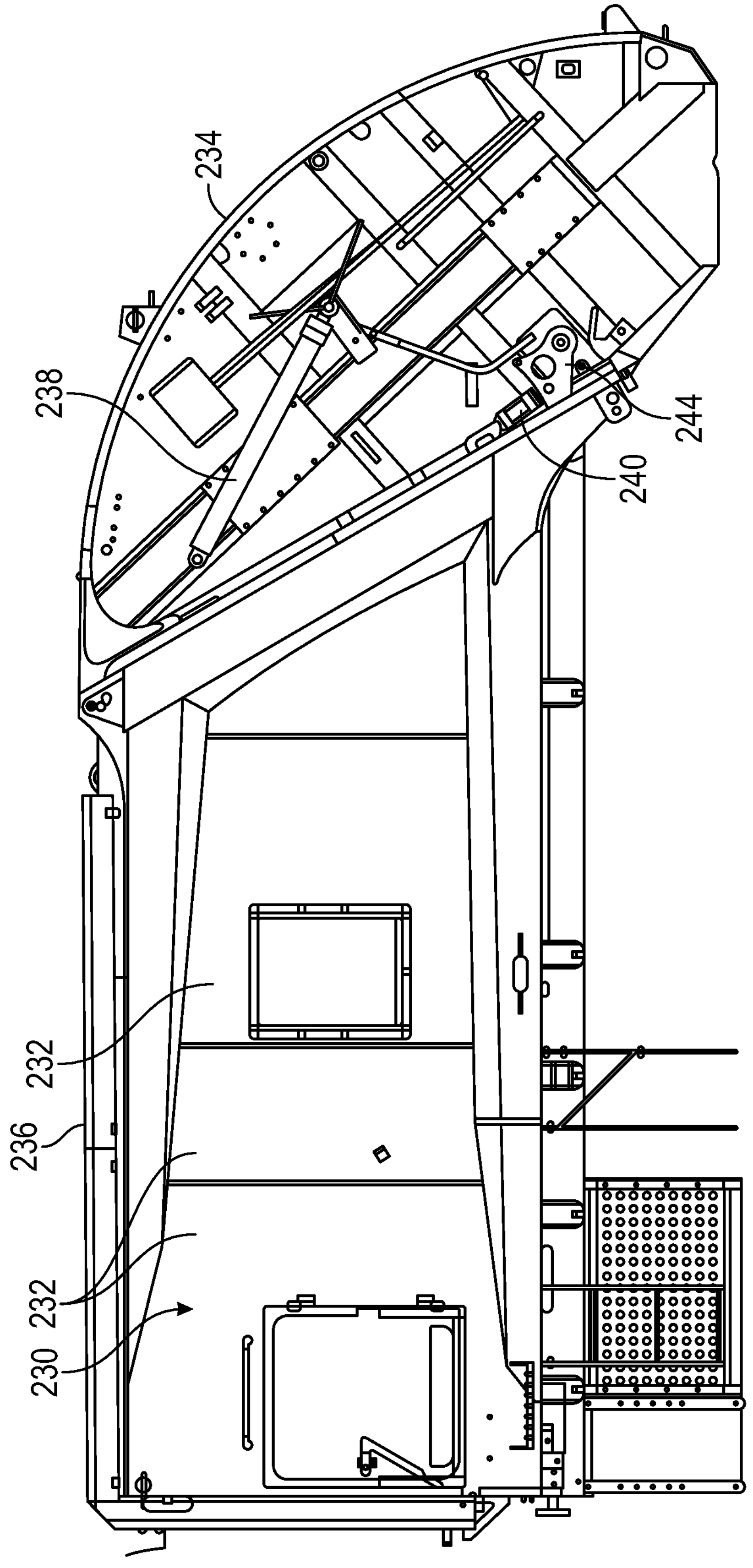
FIG. 3 is a cross-sectional view of a refuse compartment and tailgate of the refuse vehicle of FIG. 2, showing a lift actuator, according to an exemplary embodiment.

As shown in FIG. 3, the body 214 includes a collection chamber (e.g., hopper, etc.), shown as a refuse compartment 230, defined by panels 232, a tailgate 234, and a cover 236. The tailgate 234 is rotatably movable between an open position and a closed position using a lift actuator 238. In some exemplary embodiments, the lift actuator 238 is an electrically driven linear actuator. For example, in some embodiments, the lift actuator 238 is one of a lead screw/lead nut type actuator, a lead screw/ball nut type actuator, a lead screw/roller nut type actuator, a linear motor, or any other suitable type of electrically driven linear actuator.

The tailgate 234 further includes a lock actuator 240. In some embodiments, the lock actuator 240 may be configured to rotate a locking flange 244 to lock the tailgate 234 in the closed position. In some embodiments, the lock actuator 240 is an electrically driven linear actuator. For example, in some embodiments, the lock actuator 240 is one of a lead screw/lead nut type actuator, a lead screw/ball nut type actuator, a lead screw/roller nut type actuator, a linear motor, or any other suitable type of electrically driven linear actuator.

Figure 4:
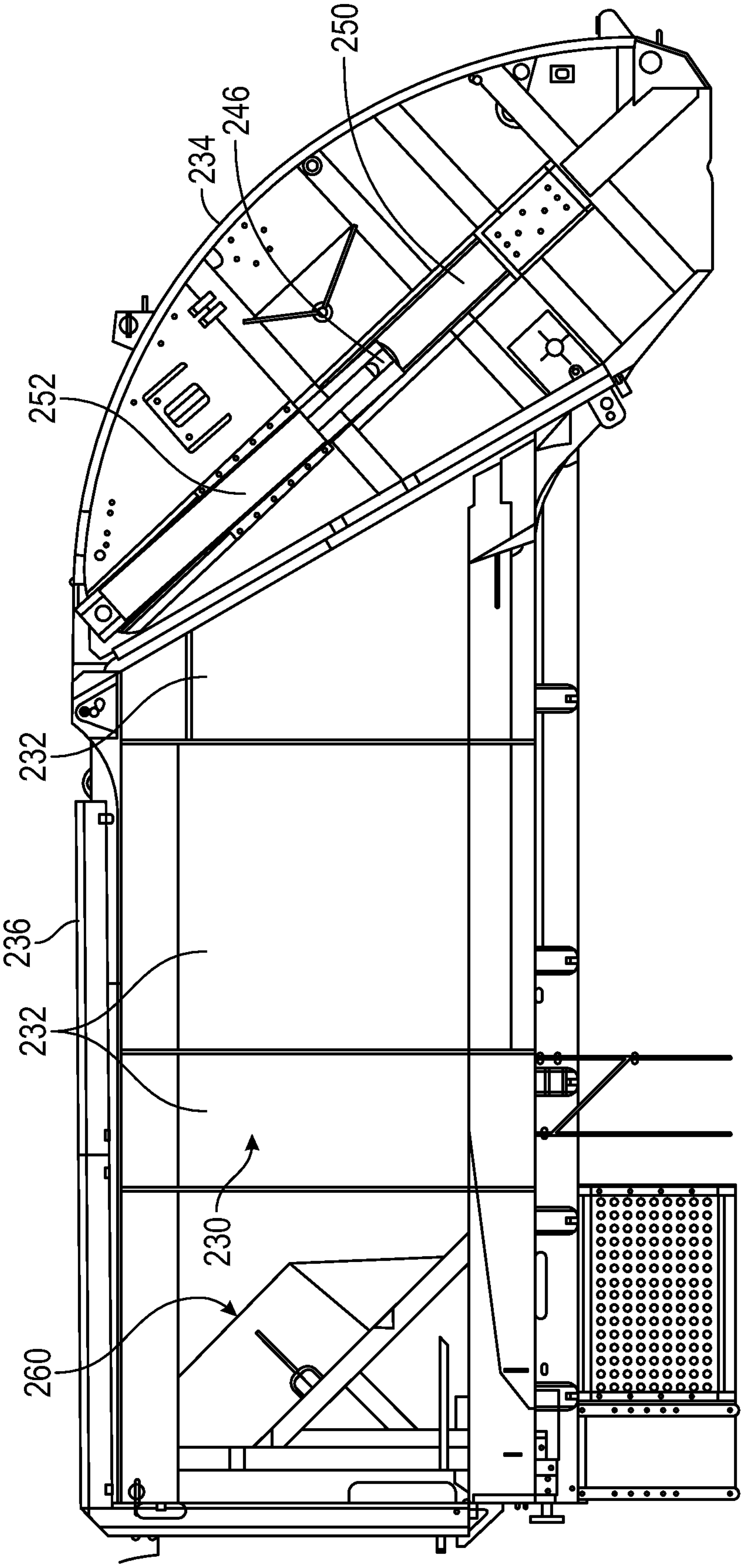
FIG. 4 is a cross-sectional view of the refuse compartment and tailgate of the refuse vehicle of FIG. 2, showing a carriage actuator, according to an exemplary embodiment.

As shown in FIG. 4, the tailgate 234 further includes a tailgate compaction assembly, shown as a blade or sweep compaction assembly 245, including a carriage, shown as a slide 246, a compactor element, shown as a blade or a sweep 248 (shown in FIGS. 5 and 6), a track 250, a carriage actuator 252, and a compactor actuator (e.g., a linear compactor actuator 256 and/or a rotational compactor actuator 258). The slide 246 is coupled to and configured to move the sweep 248, along a track 250 to aid in the loading and/or packing of refuse into the refuse compartment 230. Specifically, the slide 246 is configured to move the sweep 248 along the track 250 between an extended position and a retracted or packing position using a carriage actuator 252. In some embodiments, the carriage actuator 252 is an electrically driven linear actuator. For example, in some embodiments, the carriage actuator 252 is one of a lead screw/lead nut type actuator, a lead screw/ball nut type actuator, a lead screw/roller nut type actuator, a linear motor, or any other suitable type of electrically driven linear actuator.

Figure 5:
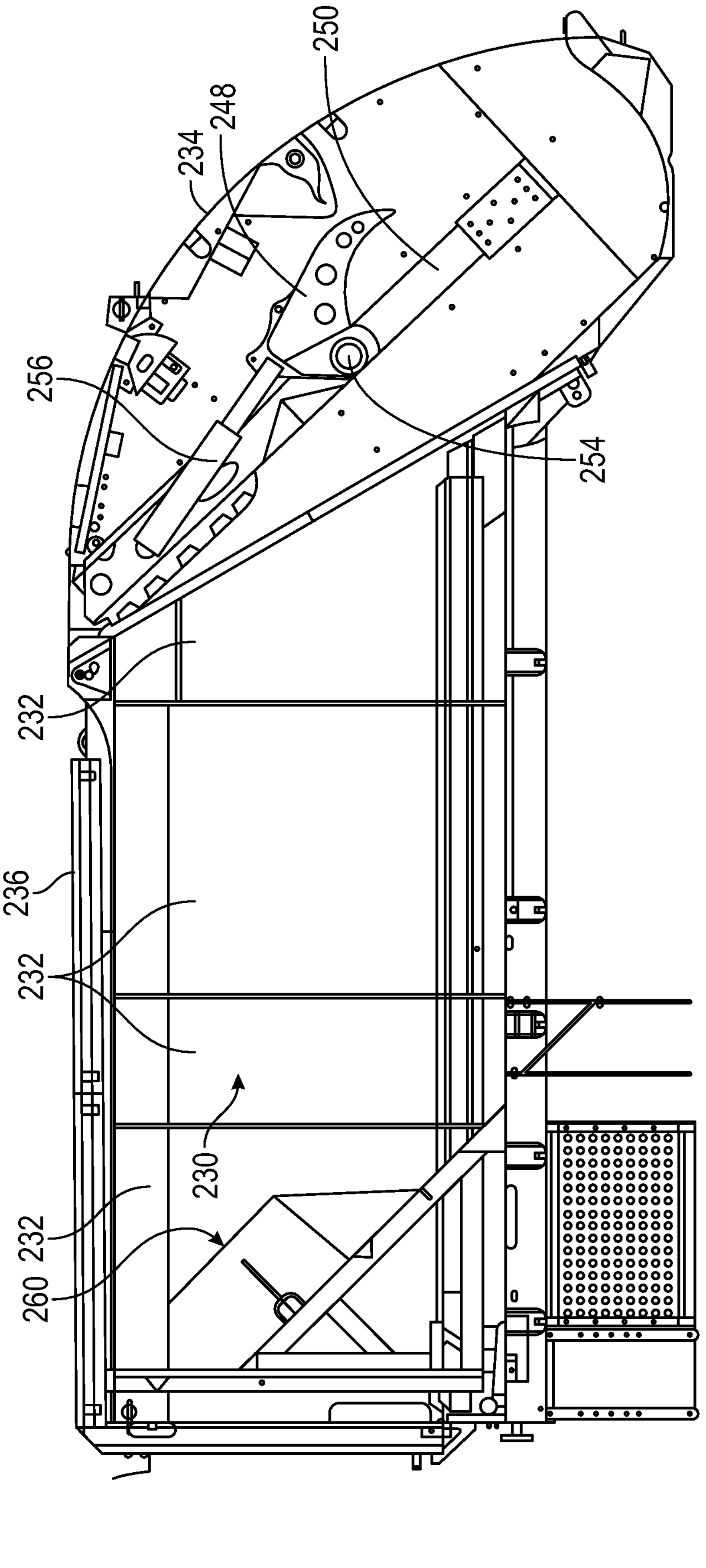
FIG. 5 is a cross-sectional view of a refuse compartment and tailgate of the refuse vehicle of FIG. 2, showing a linear compactor actuator, according to an exemplary embodiment.

As shown in FIG. 5, the sweep 248 is rotatably coupled to the slide 246 at a joint 254. The sweep 248 is rotatable about the joint 254 between a closed position and an opened or receiving position using a linear compactor actuator 256. In the closed position, the sweep 248 is rotated clockwise (with respect to the illustrative embodiment provided in FIG. 5) to angle the sweep 248 toward the refuse compartment 230, such that the sweep 248 is configured to selectively pack refuse into the refuse compartment 230 by moving the sweep 248 from the extending position into the retracted or packing position. In the opened or receiving position, the sweep 248 is rotated counter-clockwise (with respect to the illustrative embodiment provided in FIG. 5) to angle the sweep 248 out of the refuse compartment 230 to provide clearance for inserting refuse into or removing refuse from the refuse compartment 230. In some embodiments, the linear compactor actuator 256 is an electrically driven linear actuator. For example, in some embodiments, the linear compactor actuator 256 is one of a lead screw/lead nut type actuator, a lead screw/ball nut type actuator, a lead screw/roller nut type actuator, a linear motor, or any other suitable type of electrically driven linear actuator.

Figure 6:
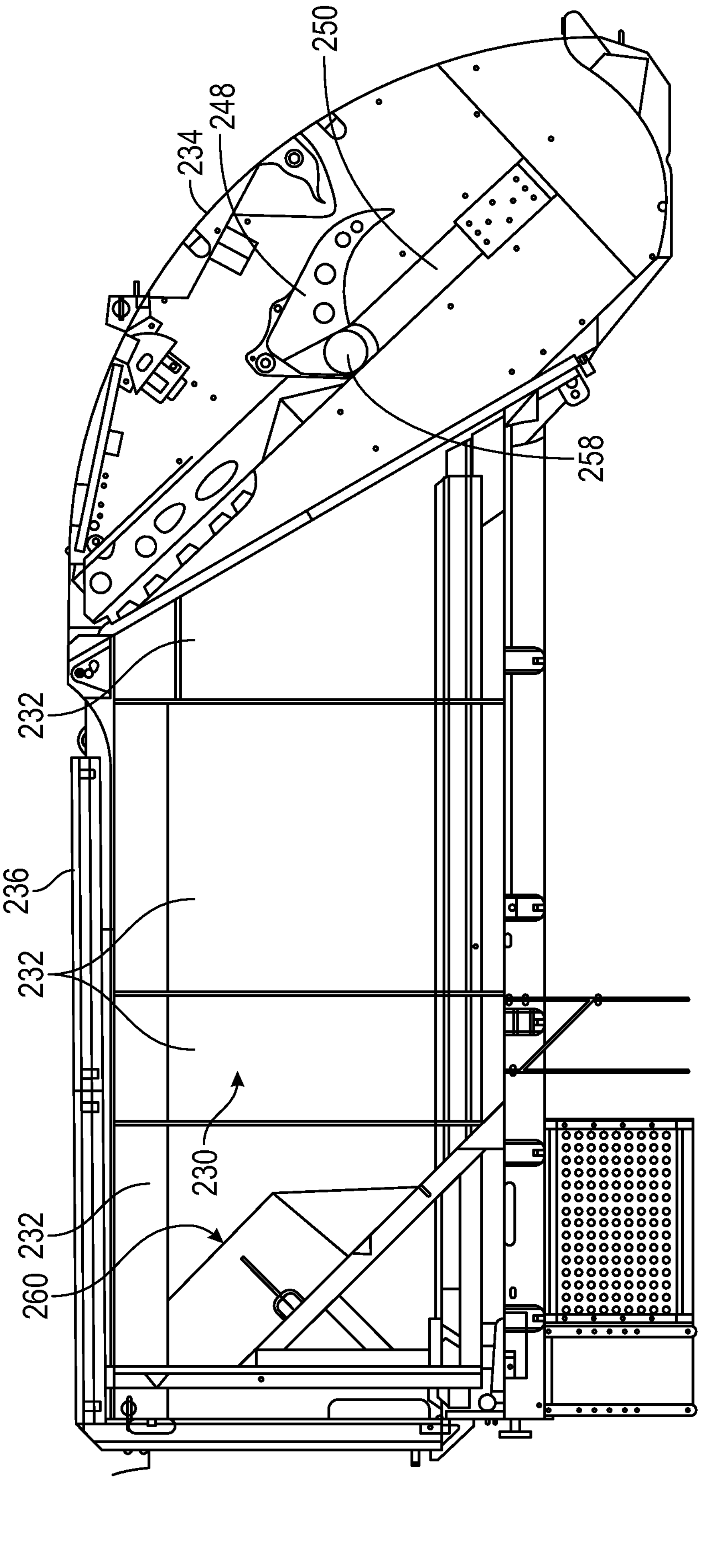
FIG. 6 is a cross-sectional view of the refuse compartment and tailgate of the refuse vehicle of FIG. 2, showing a rotational compactor actuator, according to an exemplary embodiment.

As shown in FIG. 6, in some embodiments, the sweep 248 is additionally or alternatively actuatable about the joint 254 by the rotational compactor actuator 258 (the joint 254 in FIG. 6 is disposed behind the rotational compactor actuator 258). The rotational compactor actuator 258 is rotationally engaged with the sweep 248 to move the sweep between the opened or receiving position and the closed position, as described above. In some embodiments, the rotational compactor actuator 258 is an electric motor configured to selectively rotate the sweep 248 a predetermined amount in either the clockwise or the counter-clockwise direction (with respect to the illustrative embodiment provided in FIG. 6).

As alluded to above, in some embodiments, the tailgate 234 may include only the linear compactor actuator 256. In other embodiments, the tailgate 234 may include only the rotational compactor actuator 258. In still other embodiments, the tailgate 234 may include both the linear compactor actuator 256 and the rotational compactor actuator 258 to provide additional closing force to the sweep 248, as necessary.

Figure 7:
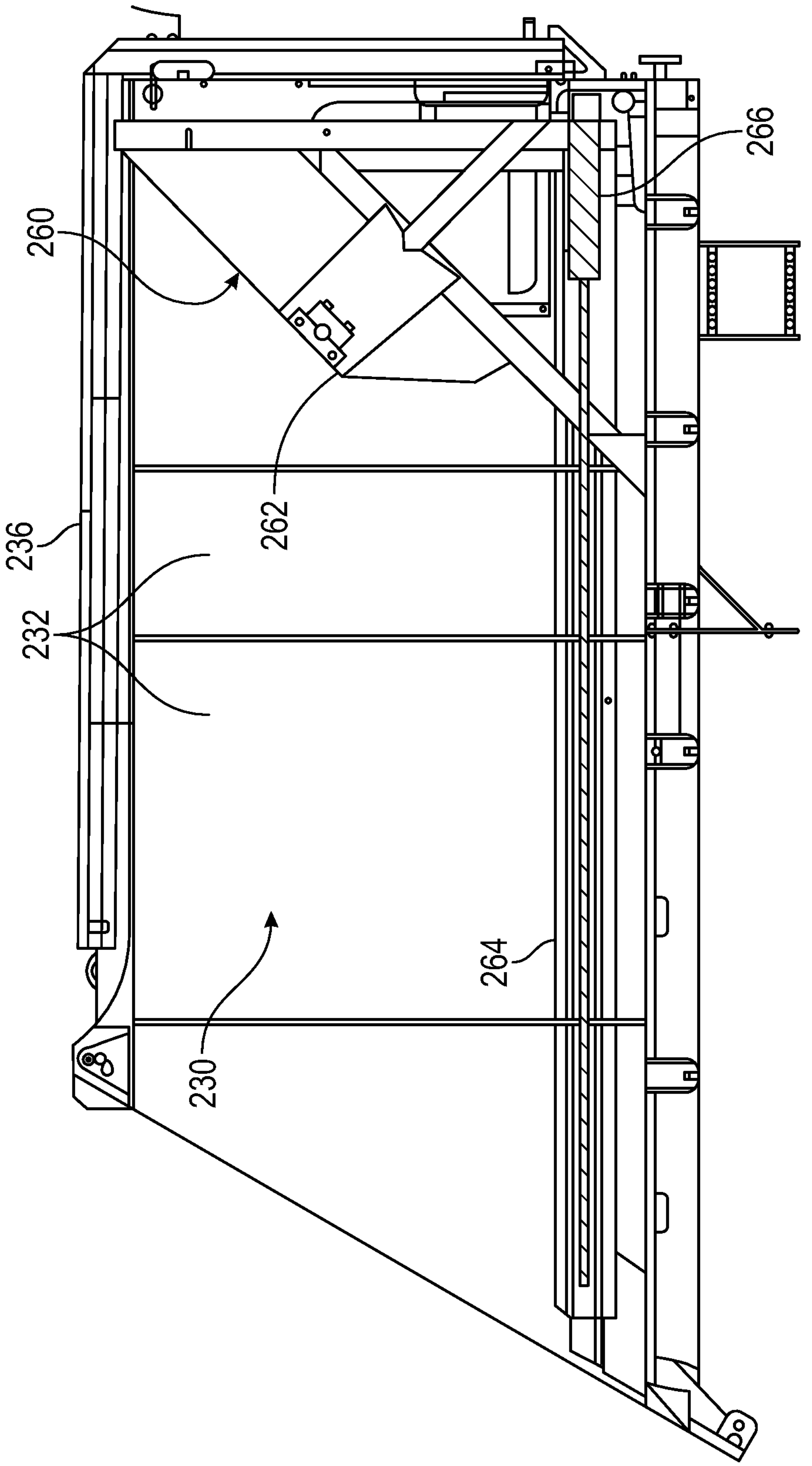
FIG. 7 is a cross-sectional view of the refuse compartment and an ejector mechanism, according to an exemplary embodiment.

As shown in FIG. 7, the refuse compartment 230 includes a refuse ejector mechanism 260. The refuse ejector mechanism 260 includes a refuse ejector 262 configured to move along an ejector track 264 between a receiving position (shown in FIG. 7) and a packing position or an ejecting position. For example, in the packing position, tailgate 234 is in the closed position and the refuse ejector 262 is moved along the ejector track 264 toward the tailgate 234, thereby compacting any refuse contained within the refuse compartment 230. In the ejecting position, the tailgate 234 is in the opened position, and the refuse ejector 262 is moved along the ejector track 264 toward the tailgate 234, thereby ejecting any refuse contained within the refuse compartment 230 out of a rear end of the refuse compartment 230.

The refuse ejector mechanism 260 further includes an ejector actuator 266 configured to selectively move the refuse ejector 262 between the receiving position and the packing or ejecting position. In some embodiments, the ejector actuator 266 is an electrically driven linear actuator. For example, in some embodiments, the ejector actuator 266 is one of a lead screw/lead nut type actuator, a lead screw/ ball nut type actuator, a lead screw/roller nut type actuator, a linear motor, or any other suitable type of electrically driven linear actuator.

Figure 8:
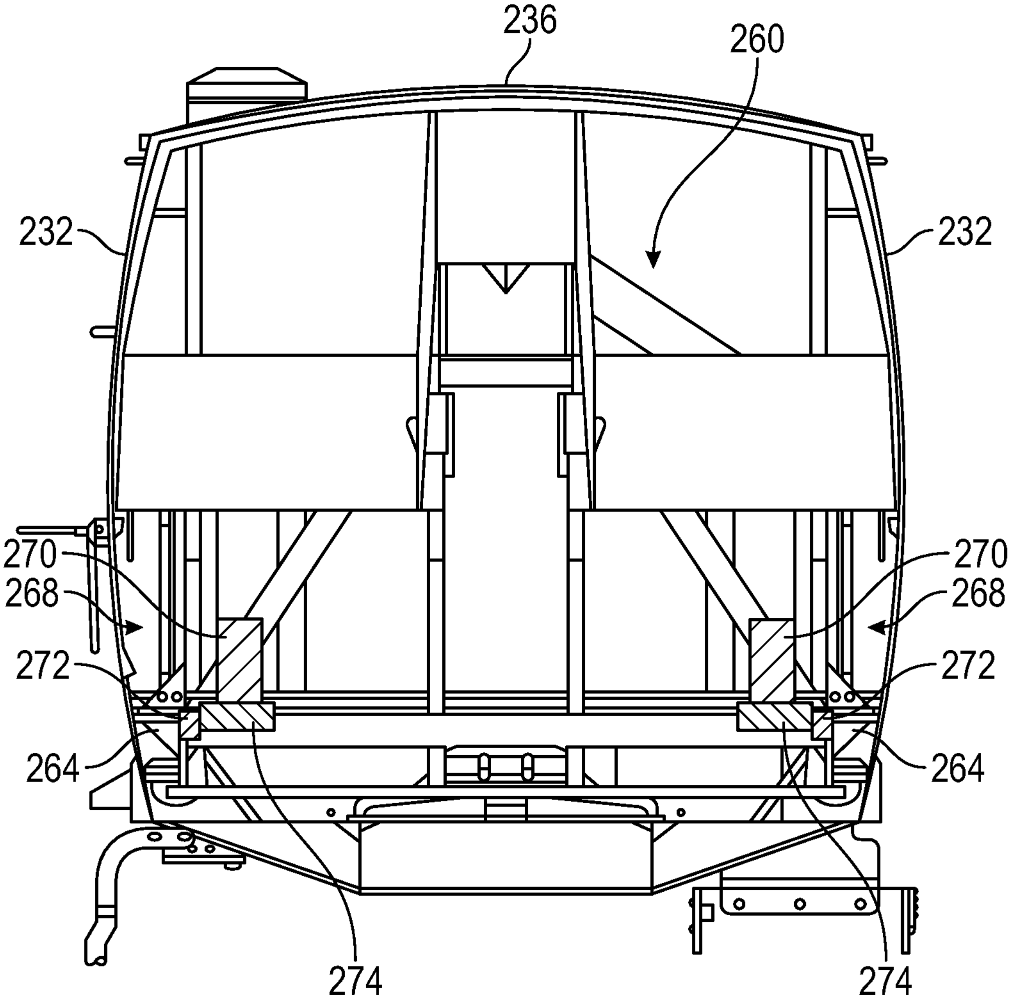
FIG. 8 is a cross-sectional view of the refuse compartment and another ejector mechanism, according to an exemplary embodiment.

As shown in FIG. 8, in some embodiments, the refuse ejector mechanism 260 alternatively includes a rack and pinion type actuator mechanism 268. The rack and pinion type actuator mechanism 268 includes a pair of electric motors 270, a pair of racks 272, and a pair of clutch/brake assemblies 274. The electric motors 270 are configured to provide power through the corresponding clutch/brake assemblies 274 to the corresponding racks 272, which are slidably mounted on the ejector track 264. The racks 272 are further coupled to the refuse ejector 262. Accordingly, the rack and pinion type actuator mechanism 268 is configured to selectively move the refuse ejector 262 between the empty position and the full position.

Each of the various actuators 238, 240, 252, 258, 266 and/or the electric motor 270 described above may be in communication with a controller configured to allow an operator to selectively actuate or otherwise utilize the various actuators 238, 240, 252, 256, 258, 266 and/or the electric motor 270 to effectively load and pack refuse within the refuse compartment 230 of the refuse vehicle 210, and also to effectively eject the refuse from the refuse compartment 230 of the refuse vehicle 210.

Figure 9:
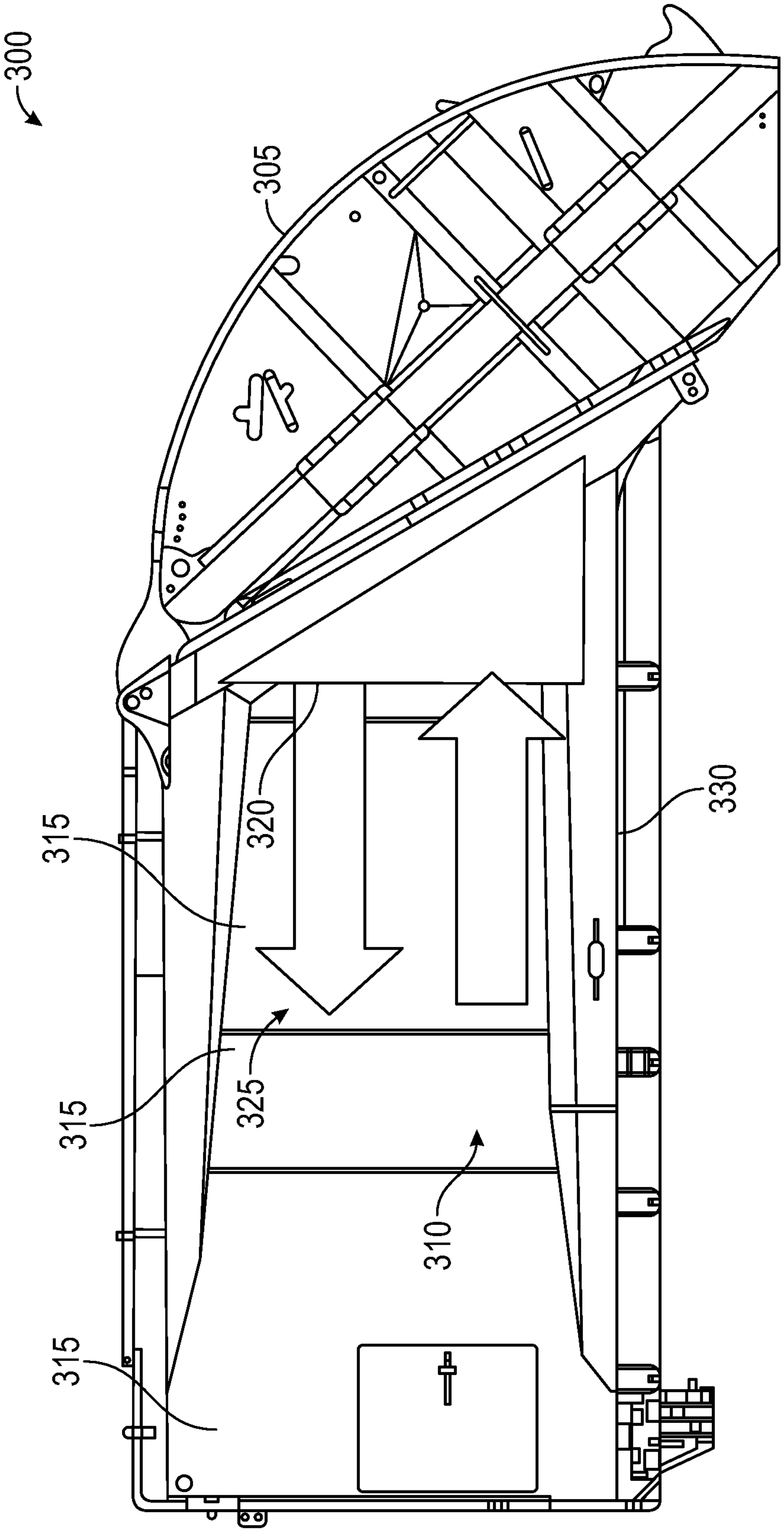
FIG. 9 is a cross-sectional view of a refuse compartment and tailgate with a schematic depiction of an ejector mechanism, according to an exemplary embodiment.

FIG. 9 shows a cross-sectional view of a refuse compartment 310 and tailgate 305 according to an exemplary embodiment. As shown, refuse compartment 310 is formed by panels 315 and includes an ejector mechanism 325 (shown symbolically by the dashed arrows), which is configured to move a refuse ejector 320 along an ejector track 330 between a packing position and an ejecting position. As described herein, the ejector mechanism 325 may comprise a variety of different mechanisms (e.g., one or more actuators and/or other moving assemblies described herein) configured to push, pull, or otherwise cause substantially linear movement of refuse ejector 320 along ejector track 330. As similarly described above, various embodiments of ejector mechanism 325 may include one or more electrically driven linear actuators, a rack and pinion type actuator mechanism, or any other suitable mechanism for selectively moving refuse ejector 320 along ejector track 330.

Figure 10:
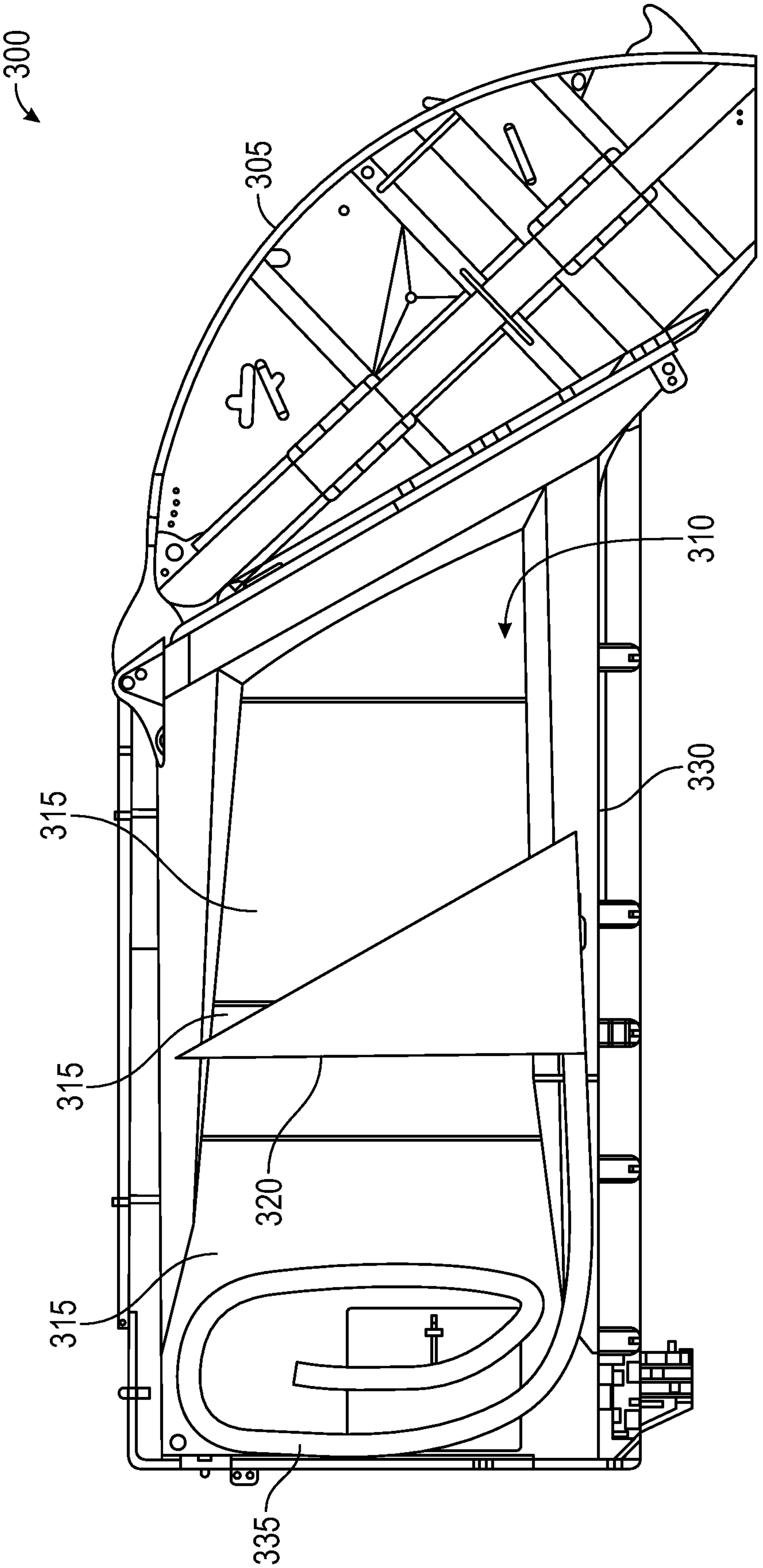
FIG. 10 is a cross-sectional view of a refuse compartment and a push chain type ejector mechanism, according to an exemplary embodiment.

FIG. 10 shows a cross-sectional view of a refuse compartment 310 and tailgate 305 with an ejector mechanism (e.g., ejector mechanism 325), shown as push chain type ejector mechanism 335, according to an exemplary embodiment. As shown, refuse ejector 320 is coupled to a push chain type ejector mechanism 335, which is configured to push the refuse ejector 320 along ejector track 330. The push chain type ejector mechanism 335 includes a system comprising a plurality of interlocking chain links 355 (shown in FIG. 12), which are configured to become rigid (e.g., to form a rigid column) when deployed, thereby enabling the application of a thrust load onto the refuse ejector 320 to push the refuse ejector 320 along the ejector track 330 between a refuse receiving position (e.g., when the refuse ejector 320 is disposed at an opposite end from the tailgate 305) and an ejecting position (when tailgate 305 is moved into an opened position and the refuse ejector 320 is moved toward the opened tailgate to eject refuse from within the refuse compartment 310).

Figure 11:
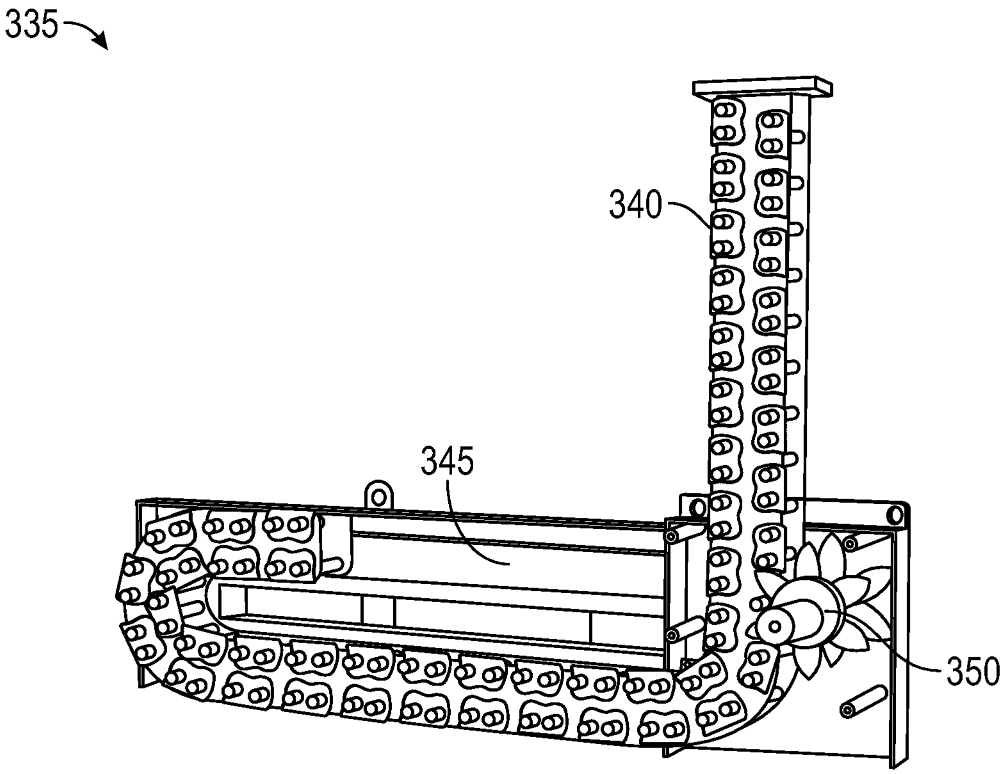
FIG. 11 is a perspective view the push chain type ejector mechanism of FIG. 10 near a gear driver, according to an exemplary embodiment.
Figure 12:
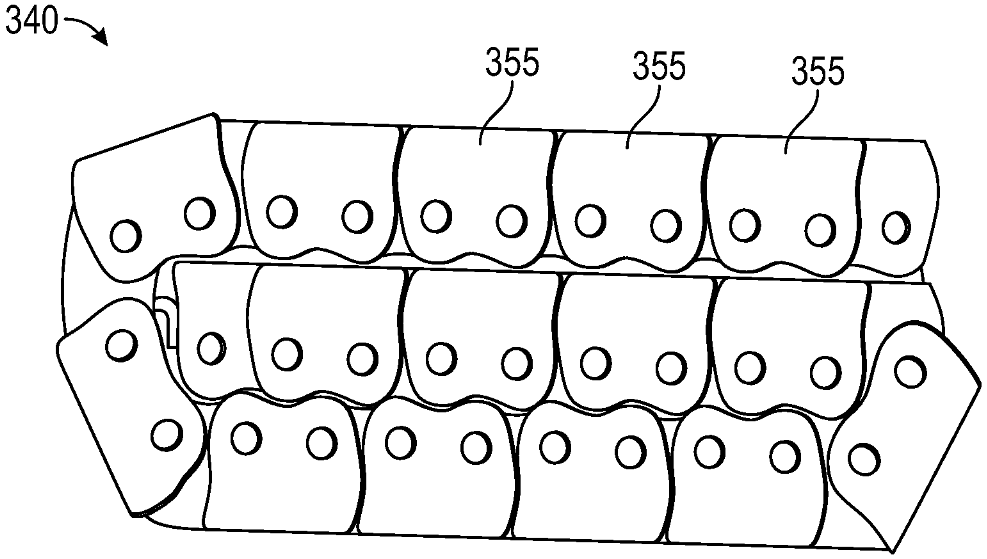
FIG. 12 is a side view of an example coiled linked system of the push chain type ejector mechanism of FIG. 10, according to an exemplary embodiment.

FIG. 11 shows a side perspective view of the push chain type ejector mechanism 335, according to an exemplary embodiment. As shown, the push chain type ejector mechanism 335 includes a link system 340, which is driven by a gear system 350. In various embodiments, gear system 350 may include one or more worm gears and/or sprockets, one or more spur gears, or any other gear configured to selectively deploy and/or retract the link system 340. The link system 340 is further configured to move along a guide track 345 (in response to deployment and/or retraction driven by the gear system 350), which facilitates deployment of the link system 340, as well as coiling and storage of the link system 340 when not applying thrust loads (e.g., when not pushing refuse ejector 320). FIG. 12 shows a side view of the exemplary link system 340, shown in a compact, coiled configuration. Coiling of the link system 340 enables ejector mechanism 335 to have a smaller footprint within the refuse compartment 310 when not in use.

Figure 13:
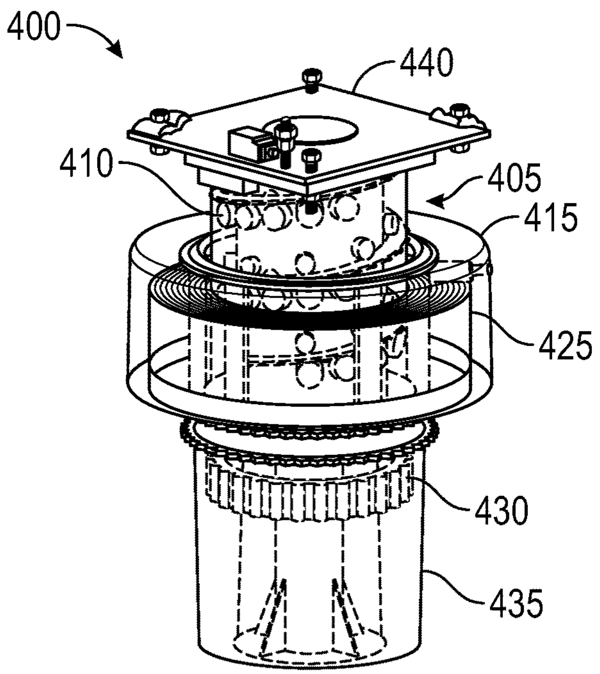
FIG. 13 is a side perspective view of a helical band type ejector mechanism of a refuse compartment, according to an exemplary embodiment.

In various other embodiments, other compact type actuators may be implemented within an ejector mechanism (e.g., mechanism 325). FIG. 13 shows a side perspective view of a helical band actuator 400, according to an exemplary embodiment. As shown, a helical band actuator 400 includes two interlocking helical bands that form a telescoping column 405, which enables the application of thrust loads. Helical band actuator 400 includes a vertical band 425 and a horizontal band 430, which are stored in a vertical band storage region 415 and a horizontal band storage region 435, respectively. Extension of telescoping column 405 is facilitated by one or more cam rollers 410, which are arranged in a helical configuration and enable the interlocking of vertical and horizontal bands 425 and 430, respectively. Extension of telescoping column 405 (formed by bands 425 and 430) enables application of thrust loads at an interface 440. In various embodiments, helical band actuator 400 may be implemented within an ejector mechanism (e.g., mechanism 325) contained in a refuse compartment and configured to apply a thrust load to a refuse ejector (e.g., ejector 320). In various embodiments, helical band actuator 400 may be driven by an electric motor (e.g., the electric motor 18) or other power source.

Figure 14:
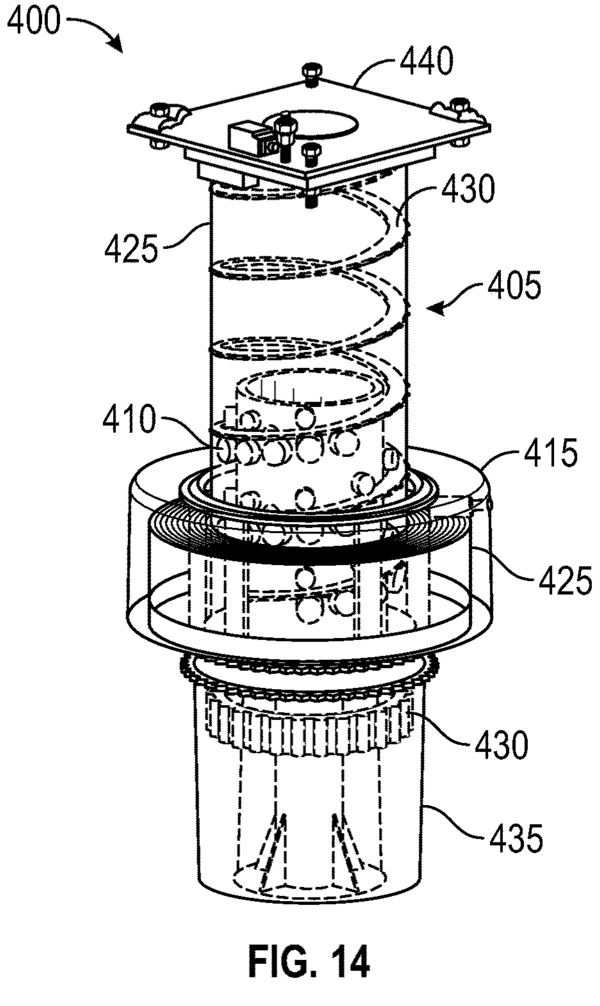
FIG. 14 is alternate side perspective view of the helical band type ejector mechanism of FIG. 13, showing a moderately expanded configuration of a helical band actuator according to an exemplary embodiment.
Figure 15:
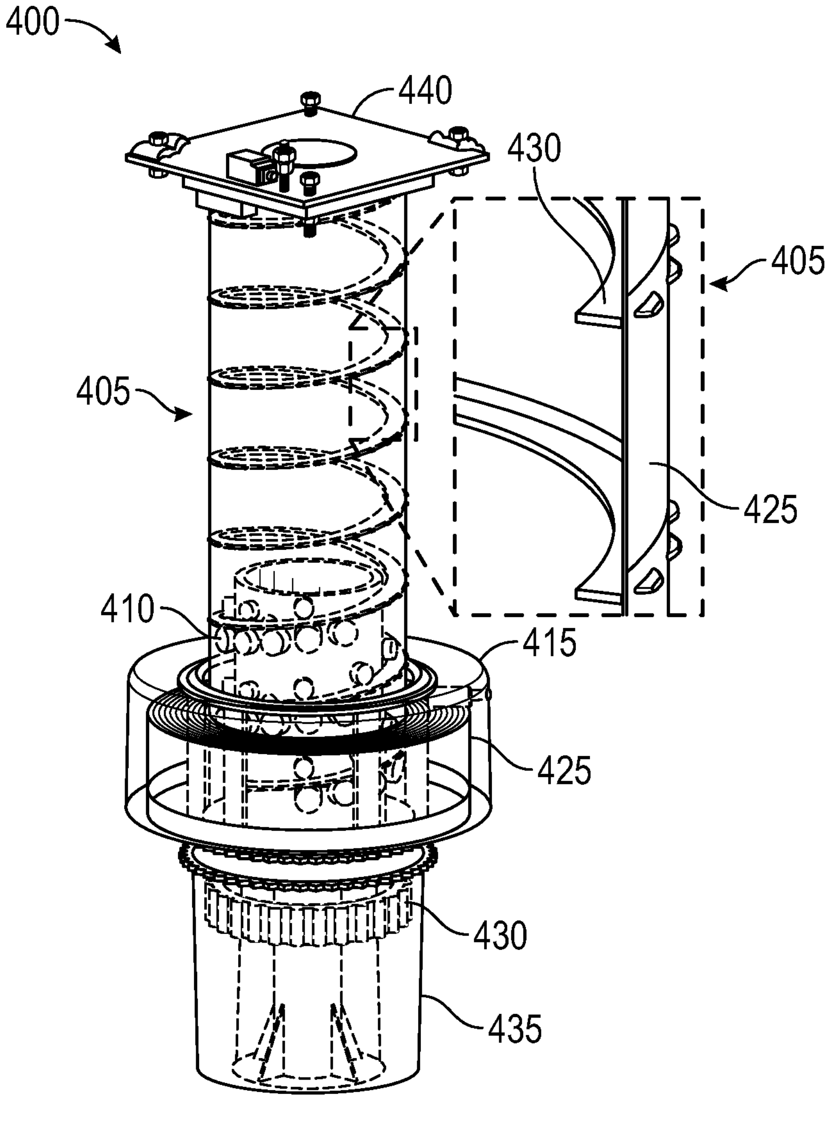
FIG. 15 is an alternate side perspective view of a helical band type ejector mechanism of FIG. 13, showing a maximally expanded configuration of the helical band actuator according to an exemplary embodiment.

FIGS. 14 and 15 show side perspective views of the helical band actuator 400, according to various embodiments. FIG. 14 shows an expanded configuration of the helical band actuator 400. FIG. 15 shows a further expanded configuration of the helical band actuator 400 and illustrates the interlocked vertical and horizontal bands 425 and 430, respectively, which form telescoping column 405. In various embodiments, an ejector mechanism (e.g., mechanism 325) including a helical band actuator 400 may also incorporate one or more springs to enable application of tension loads and facilitate retraction of the coupled refuse ejector (e.g., ejector 320).

Figure 16:
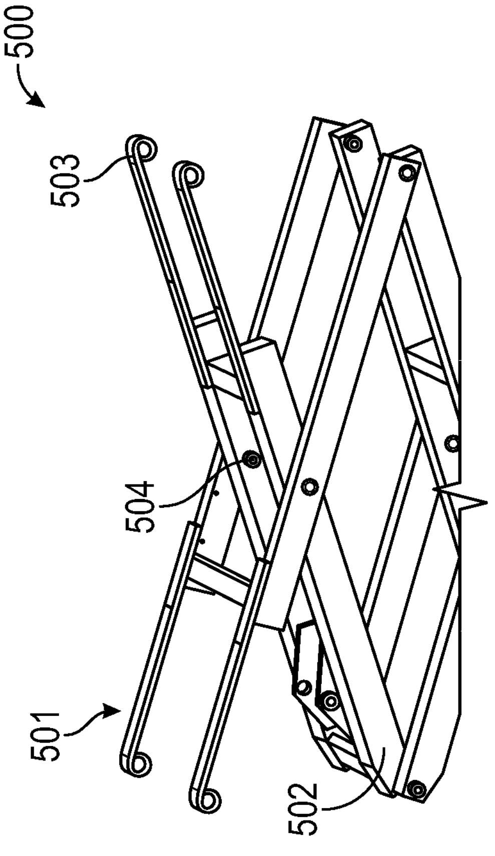
FIG. 16 is a side perspective view of a scissor mechanism for an ejector mechanism in a refuse compartment, according to an exemplary embodiment.
Figure 17:
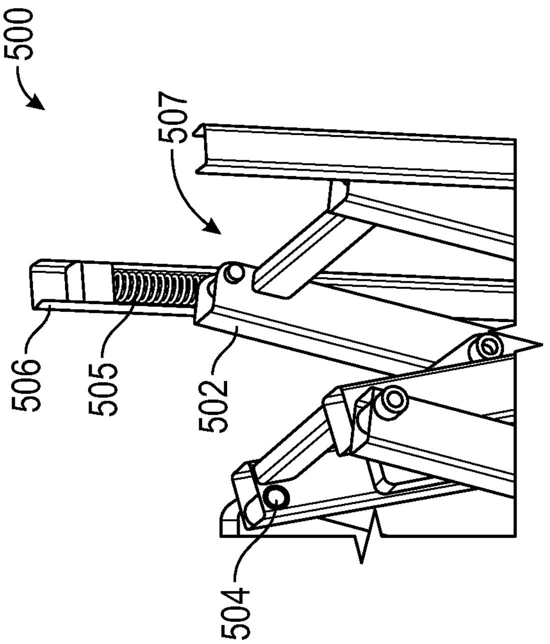
FIG. 17 is another side perspective view of the scissor mechanism of FIG. 16, according to an exemplary embodiment.
Figure 18:
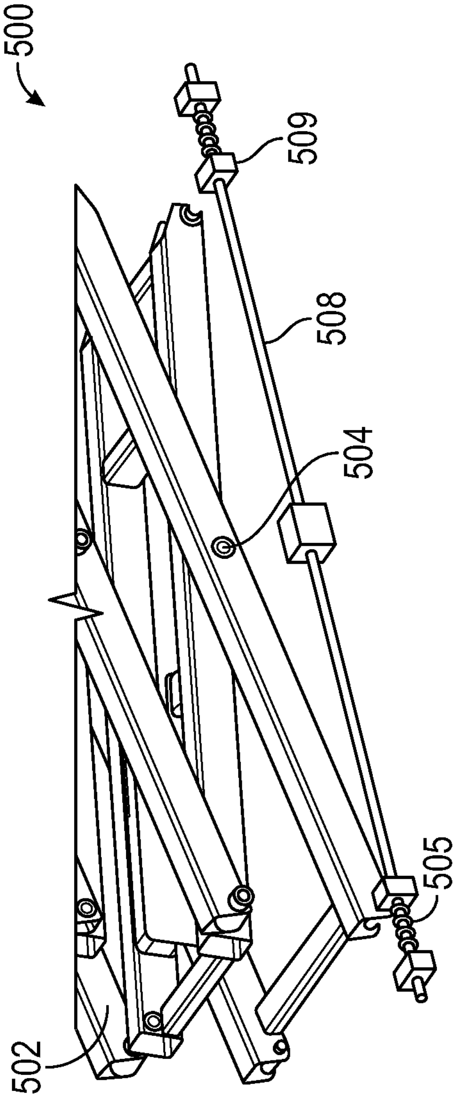
FIG. 18 is another side perspective view of the scissor mechanism of FIG. 16, according to an exemplary embodiment.

Other embodiments of a refuse ejector mechanism (e.g., mechanism 325) may incorporate a scissor mechanism selectively actuatable between an extended position and a retracted position to move a refuse ejector (e.g., ejector 320) via application of thrust and/or tension loads thereto. For example, FIGS. 16-18 show alternate side perspective views of a scissor mechanism 500 that may be implemented within a refuse ejector mechanism (e.g., mechanism 325), according to various exemplary embodiments. As shown in FIG. 16, scissor mechanism 500 includes a plurality of folding supports 502, which are coupled at joints 504. As shown in FIG. 17, scissor mechanism 500 also includes a terminal end 501 that may be coupled to a surface and/or receiving fixture via sliding pin joint connections 503. In various embodiments, terminal end 501 may be coupled to a refuse ejector (e.g., ejector 320) to enable actuation. Scissor mechanism 500 also has a fixed end 507, which is slidably coupled to a track 506 to limit movement of folding supports 502. Movement of folding supports 502 may be further constrained and/or controlled by a spring 505 disposed within track 506. Folding supports 502 may be coupled to sliding bodies 509, which may be configured to slide along a rod 508 within track 506 to facilitate movement of folding supports 502. Movement of folding supports 502 causes scissor mechanism 500 to expand or contract, enabling application of thrust or tension loads to a surface (e.g., a surface of ejector 320). In various embodiments, movement of folding supports 502 may be driven by on more linear actuators which include, but are not limited to, a ball screw, winch system, a rack and pinion, or any other suitable actuator. In various embodiments, the linear actuators may be electrically driven. In various embodiments, scissor mechanism 500 may also be coupled to one or more springs to augment application of thrust and/or tension loads.

Figure 19:
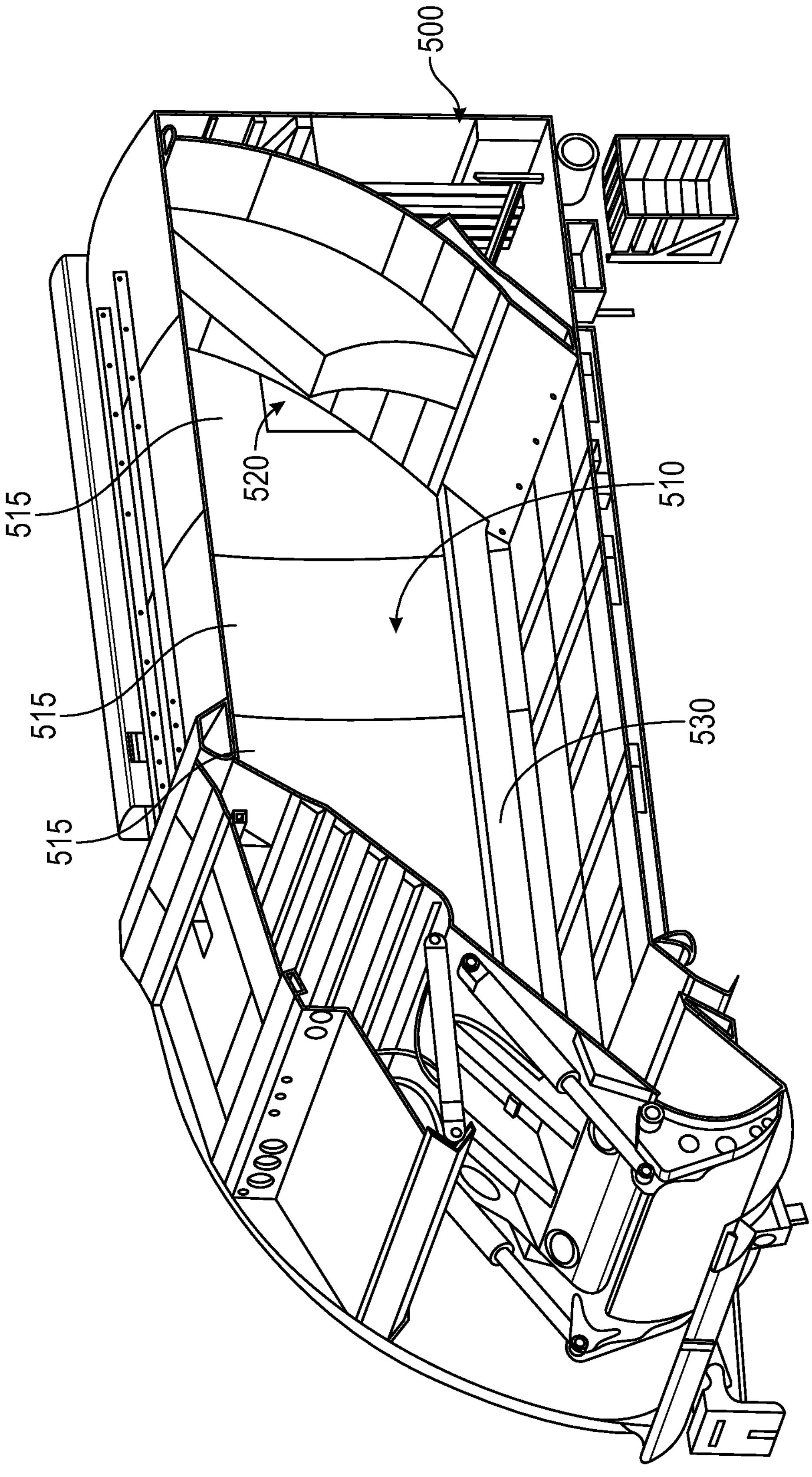
FIG. 19 is a side perspective cross-sectional view of a refuse compartment and a scissor type ejector mechanism in a vertical configuration, according to an exemplary embodiment.
Figure 20:
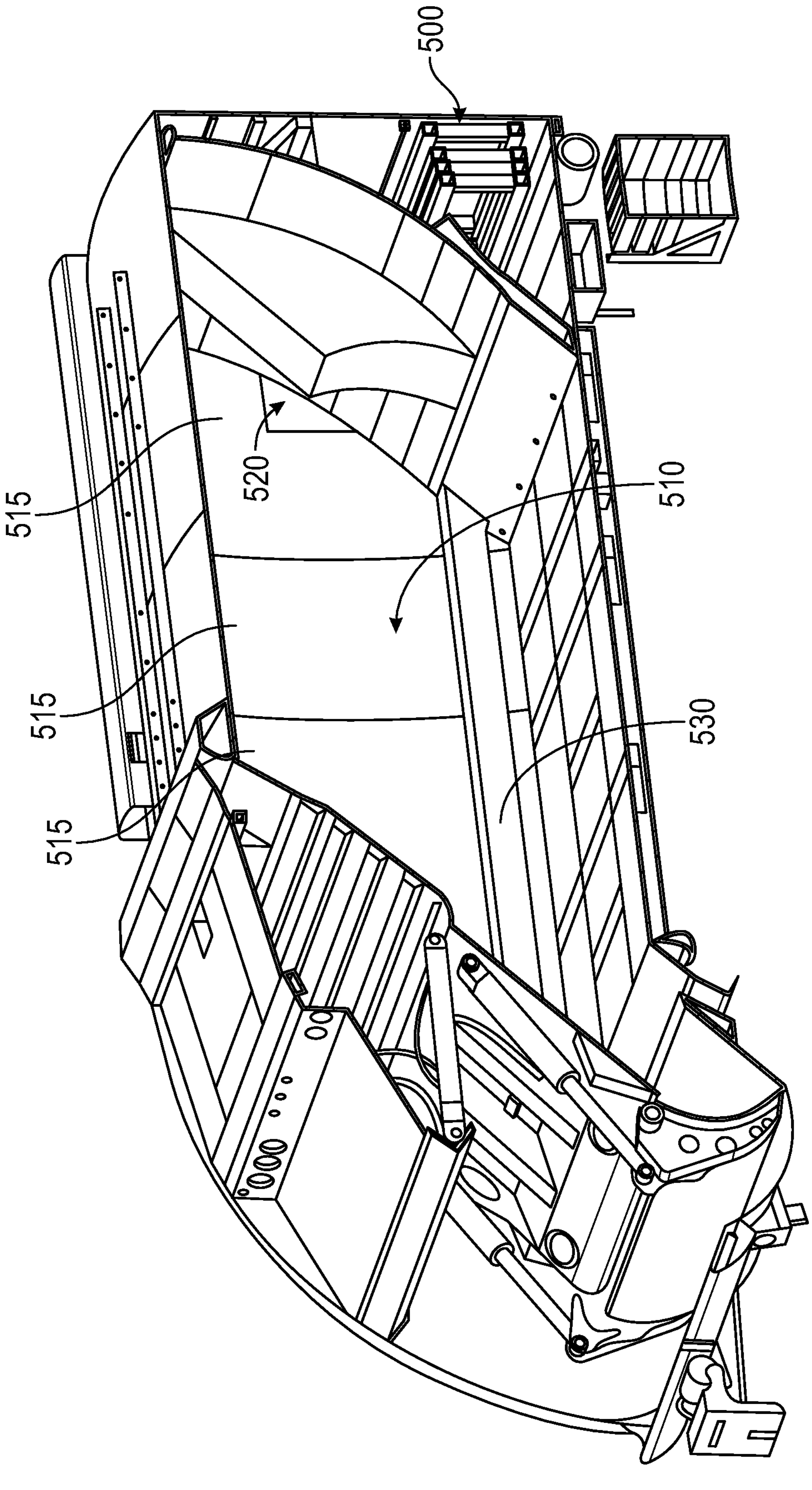
FIG. 20 is a side perspective cross-sectional view of a refuse compartment and a scissor type ejector mechanism in a horizontal configuration, according to an exemplary embodiment.

FIG. 19 shows a scissor mechanism 500 disposed within a refuse compartment 510 formed by panels 515, according to an exemplary embodiment. As shown, scissor mechanism 500 is coupled to a refuse ejector 520 and positioned in a vertical configuration such that the scissor mechanism 500 applies a thrust and/or tension load to the refuse ejector 520 along a substantially vertical axis relative to a length of the refuse compartment 510. FIG. 20 shows a scissor mechanism 500 disposed within a refuse compartment 510 formed by panels 515, according to another exemplary embodiment. As shown, scissor mechanism 500 is coupled to a refuse ejector 520 and positioned in a horizontal configuration such that the scissor mechanism 500 applies a thrust and/or tension load to the refuse ejector 520 along a substantially horizontal axis relative to a length of the refuse compartment 510.

Figure 21:
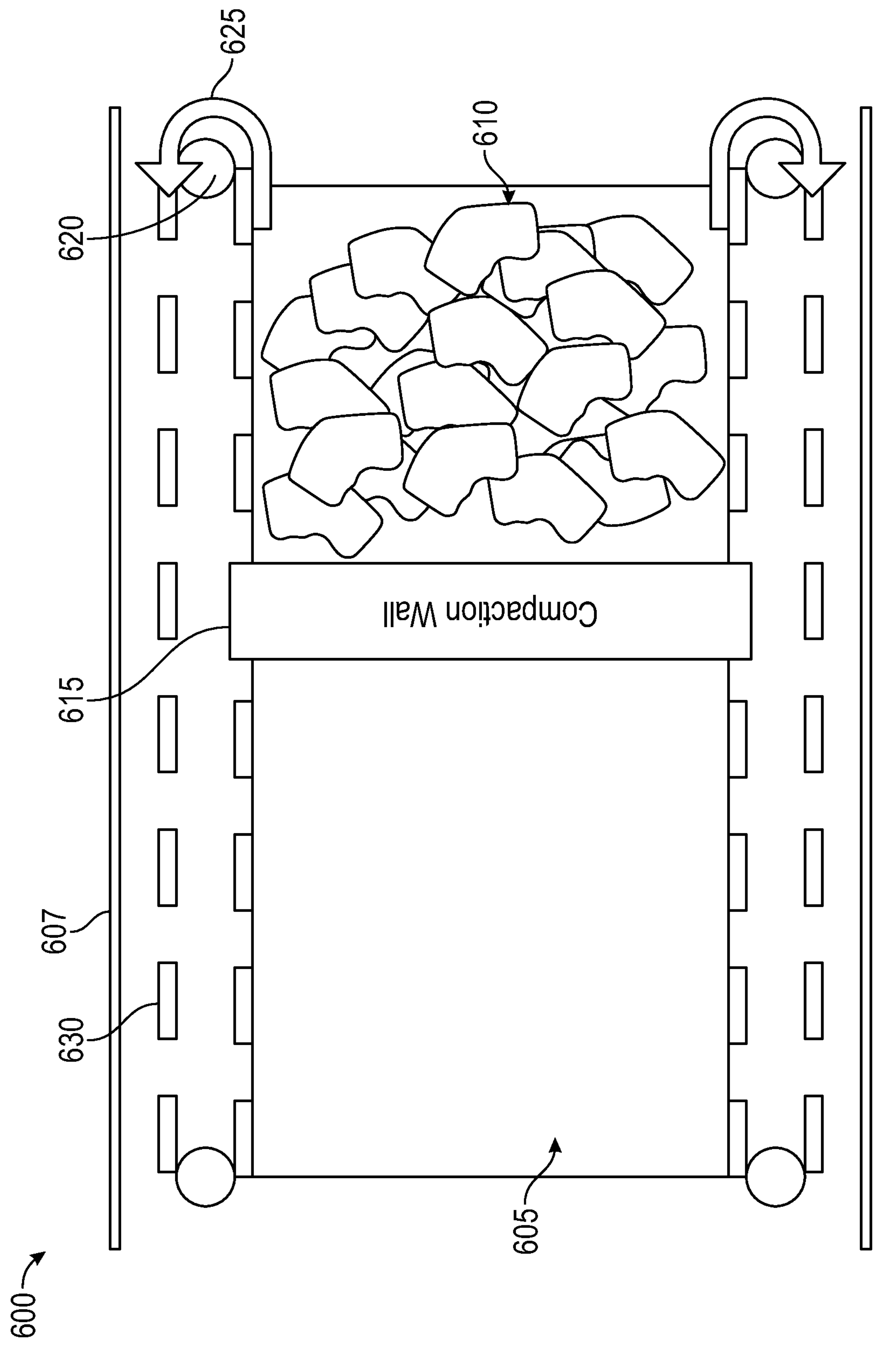
FIG. 21 is a schematic top view of a refuse compartment implementing an ejector mechanism including sliding side panels, according to an exemplary embodiment.

FIG. 21 shows a schematic top cross-sectional view of a refuse ejector mechanism, shown as a belt drive system 600, within a refuse containing vehicle, according to an exemplary embodiment. As shown in FIG. 21, a refuse compartment 605 may be formed by panels 607. As shown, belt drive system 600 includes belts 630, which are coupled to rotating elements 620 adjacent to panels 607. The rotating elements 620 may, for example, be selectively rotated by one or more electric motors (e.g., electric motor 18). Rotating elements 620 drive the belts 630 to move in a direction 625 relative to rotating elements 620 and panels 607. As shown, belts 630 are also coupled to a refuse ejector 615. Rotation of belts 630 about rotating elements 620 cause movement of refuse ejector 615 between a packing or ejecting position, which enables packing or ejecting of refuse 610 contained within refuse compartment 605. In various embodiments, belts 630 and rotating elements 620 may include a belt drive, one or more pulleys, etc. In various embodiments, belts 630 may be comprised of one material. In other embodiments, belts 630 may be chain. In yet other embodiments, belts 630 may be any suitable flexible material for transmitting power among rotating components. In various embodiments, belt drive system 600 may also include one or more rolling elements to reduce disadvantageous forces applied within refuse compartment 605 and/or to refuse ejector 615.

Figure 22:
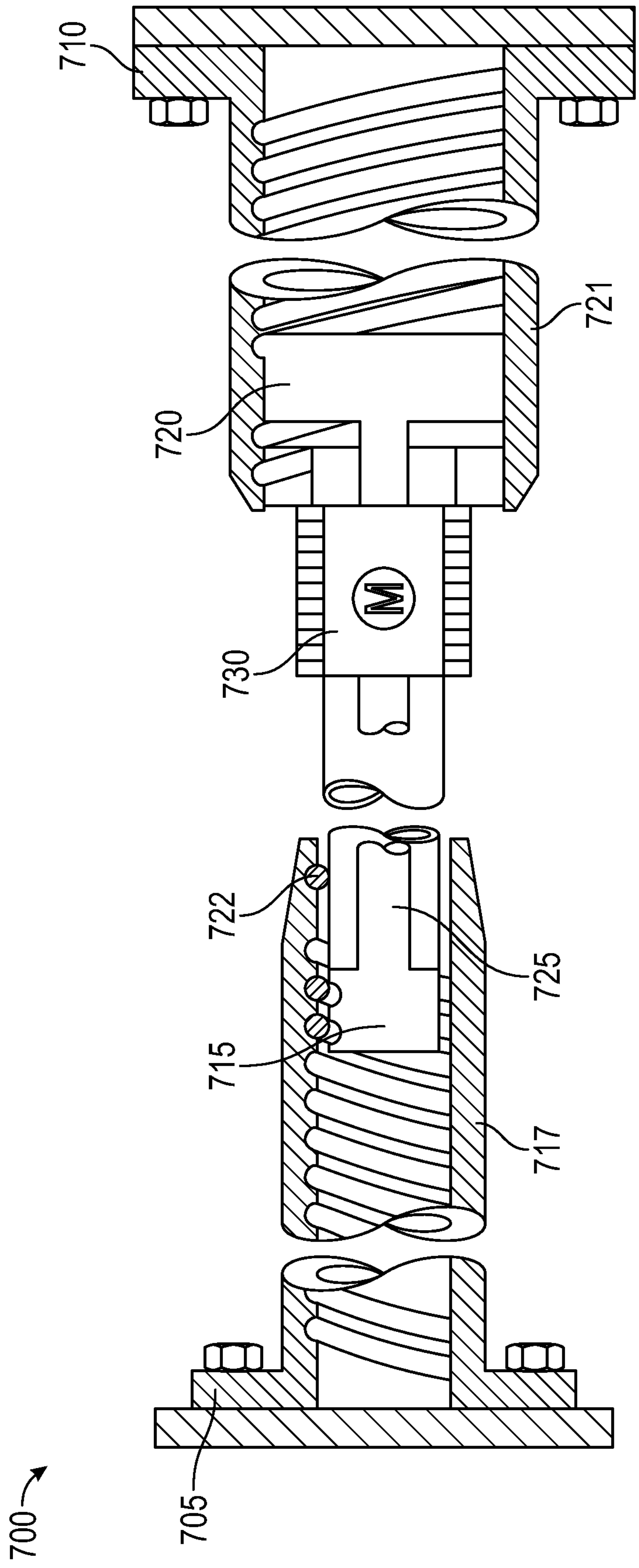
FIG. 22 is a partially exploded side view of a double acting lead screw for an ejector mechanism in a refuse compartment, according to an exemplary embodiment.
Figure 23A:
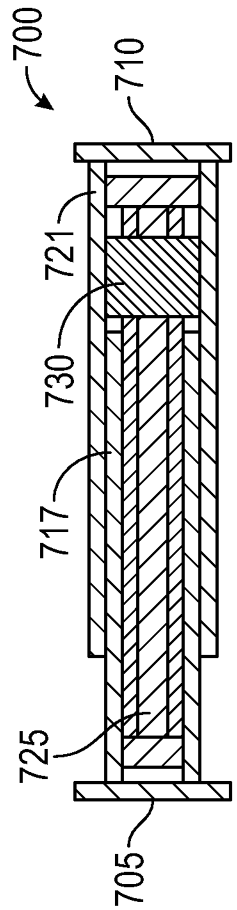
FIGS. 23A-23C are schematic side views of various configurations of the double acting lead screw of FIG. 22, according to an exemplary embodiment.
Figure 23B:
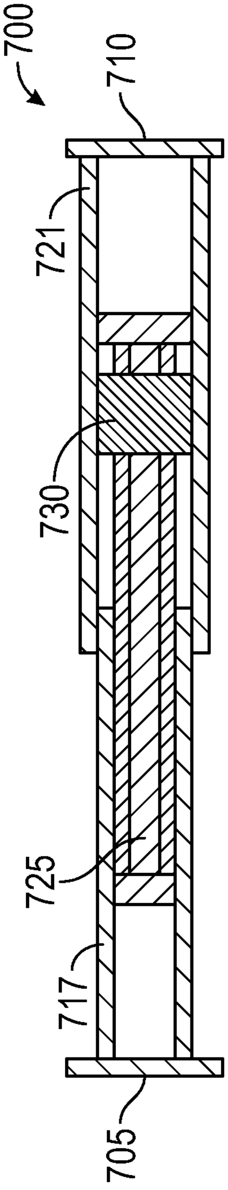
Figure 23C:
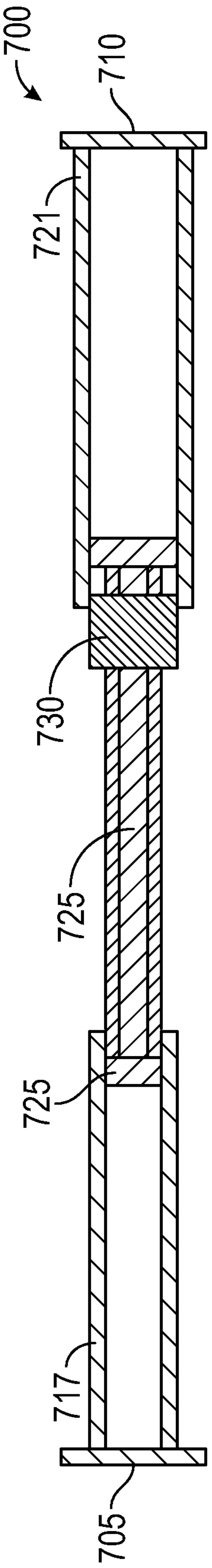
Figures 24A, 24B, 24C, 24D, 24E:
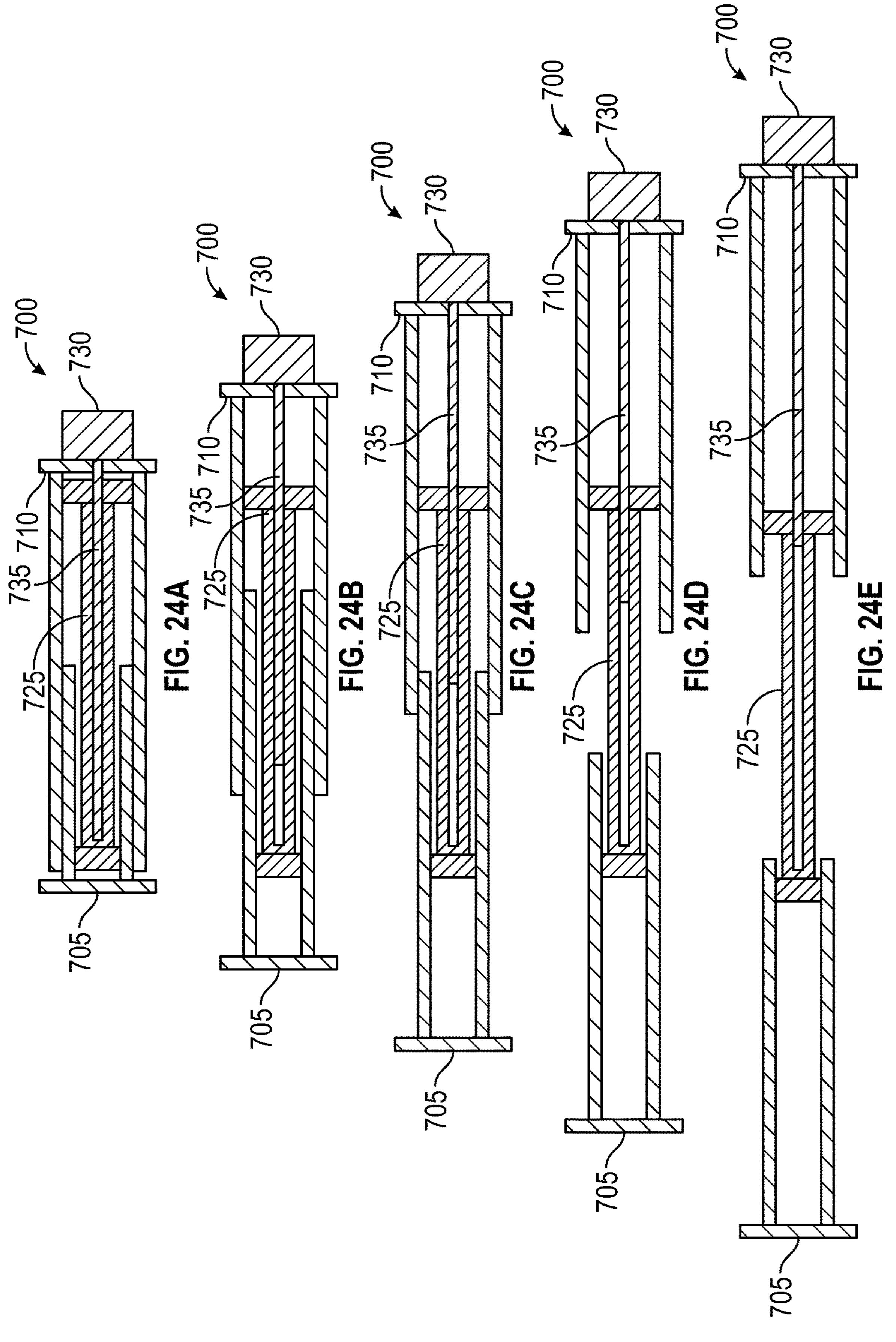
FIGS. 24A-24E are schematic side views of various configurations of a double acting lead screw with an exterior motor for an ejector mechanism in a refuse compartment, according to an exemplary embodiment.

FIG. 22 shows a side exploded view of a double acting lead screw 700 for a refuse ejector mechanism, according to an exemplary embodiment. The double acting lead screw 700 includes two terminal ends 705 and 710, which may be coupled to a refuse ejector and a surface within a refuse compartment, respectively. The double acting lead screw 700 may apply a thrust or tension force when it expands or retracts as driven by a motor 730. Motor 730 drives rotation of drive shaft 725 which is rotationally fixed to a left-hand thread engaging nut 715 and a right-hand thread engaging nut 720, which are configured to engage a left-hand threaded screw 717 and a right-hand threaded screw 721, respectively. The left-hand threaded screw 717 and the right-hand threaded screw 718 may further be coupled to various surfaces at terminal ends 705 and 710, respectively. In some instances, the double acting lead screw 700 may further include a torque reaction pin 722. In the exemplary embodiment provided in FIG. 22, the torque reaction pin 722 is disposed proximate the left-hand engaging nut 715 and is configured to engage the left-hand threaded screw 717. In other embodiments, the torque reaction pin 722 may be disposed proximate the right-hand engaging nut 720 and may be configured to engage the right-hand threaded screw 721. FIGS. 23A-23C shows schematic side views of various expanded configurations of the double acting lead screw 700, according to an exemplary embodiment. Expansion and retraction of double acting lead screw 700 is driven by motor 730. In various embodiments, motor 730 may be disposed within and positioned along a central axis of the double acting lead screw 700. In other embodiments, motor 730 may be positioned externally to the double acting lead screw 700. FIGS. 24A-24E shows side schematic views of various expanded configurations of a double acting lead screw 700 with the motor 730 positioned external to the double acting lead screw 700, according to an exemplary embodiment. In these cases, the motor 730 is configured to rotated an inner drive shaft 735 that is rotationally fixed to the drive shaft 725.

Figure 25:
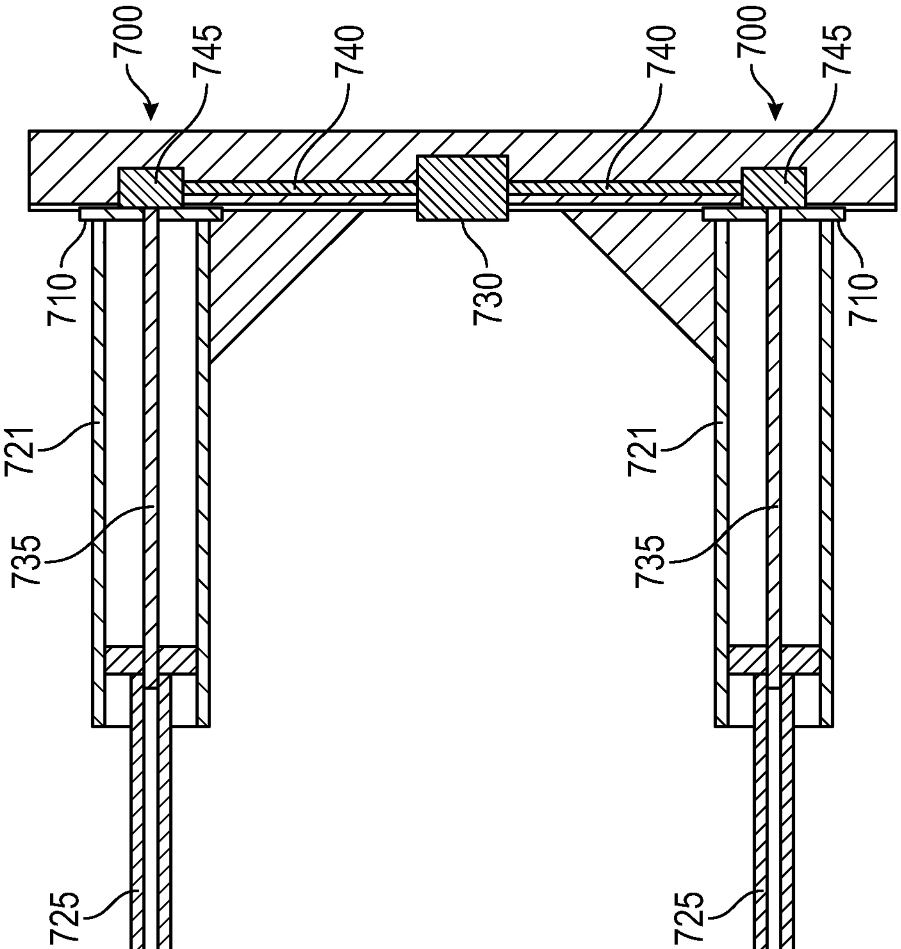
FIG. 25 a schematic top view of an ejector mechanism for a refuse compartment implementing a double acting lead screw, according to an exemplary embodiment.

In various embodiments, one or more double acting lead screws 700 may be implemented in parallel within a refuse ejector mechanism to actuate a refuse ejector. FIG. 25 shows a top schematic view of a refuse ejector mechanism that implements two double acting lead screws 700, according to an exemplary embodiment. As shown, two double acting lead screws 700 may be coupled to a refuse ejector and a surface within a refuse compartment via terminal ends 705 and 710, respectively. The motor 730 in the exemplary embodiment provided in FIG. 25 is configured to drive both double acting lead screws 700 simultaneously via external drive shafts 740, which apply rotational motion through gearboxes 745 to the inner drive shafts 735 to apply a thrust or tension load from each of the double acting lead screws 700 to a refuse ejector 750 (e.g., similar to the ejector 320).

Figure 26:
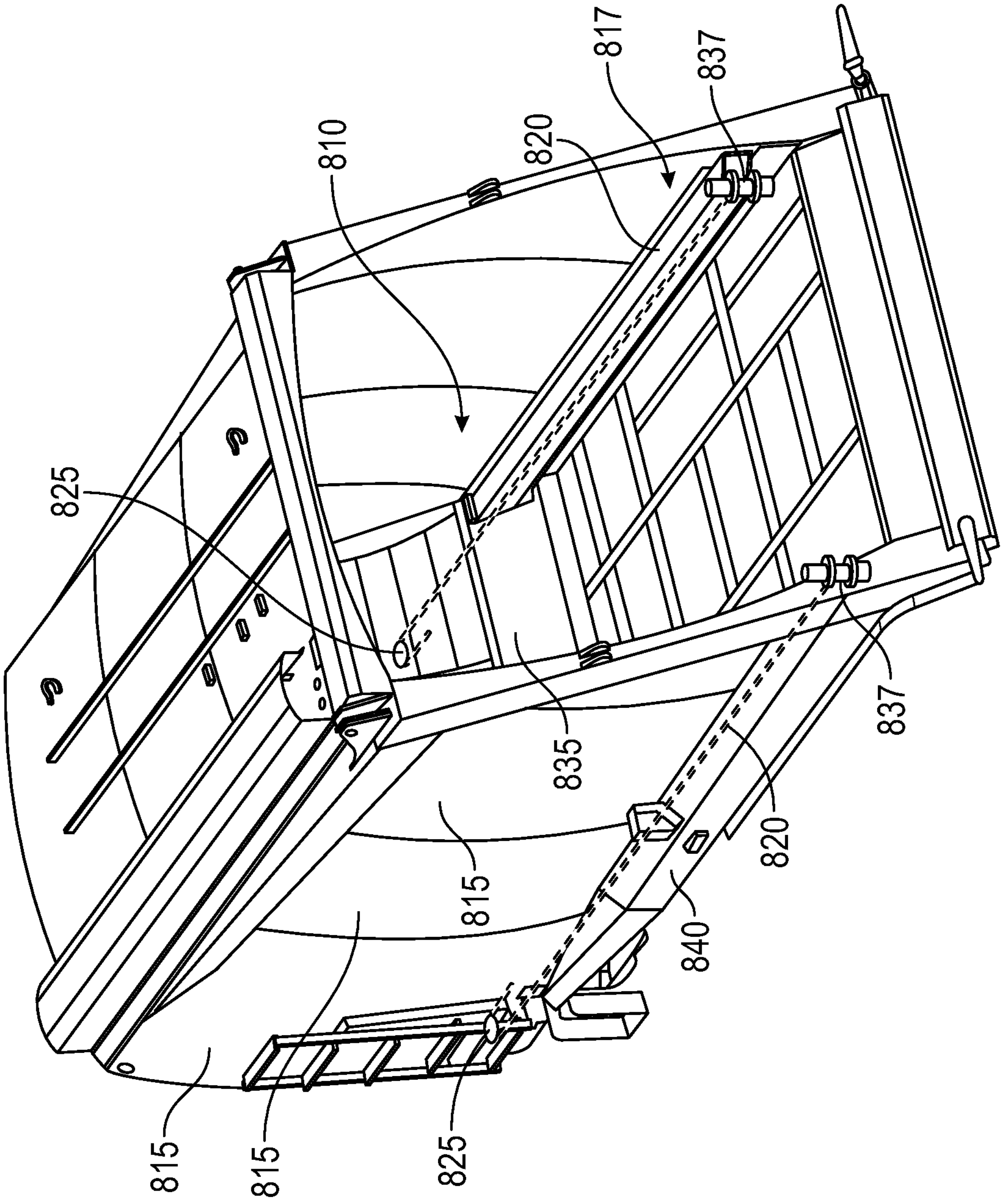
FIG. 26 is an end perspective view of a refuse compartment implementing an ejector mechanism including a recirculating cable winch, according to an exemplary embodiment.

In yet other embodiments, a refuse ejector mechanism may include one or more circulating cables to apply tension loads to a coupled refuse ejector for selective movement within a refuse compartment. FIG. 26 shows an end perspective view of a refuse compartment 810 (formed by panels 815), which contains a refuse ejector mechanism comprising a recirculating cable winch system 817, according to an exemplary embodiment. As shown, winches 825 are coupled to a refuse ejector 835 near panels 815. Reciprocating winches 837 are correspondingly disposed near an end of the refuse compartment opposite winches 825. As shown, a cable 820 is recirculated between winches 825 and winches 837. In various embodiments, winches 825 and/or winches 837 may be coupled to one or more electric motors (e.g., electric motor 18) to facilitate circulation of cable 820. During operation, cable 820 may be circulated between 825 and 837 to selectively move refuse ejector 835 along a track 840 within refuse compartment 810.

Figure 27:
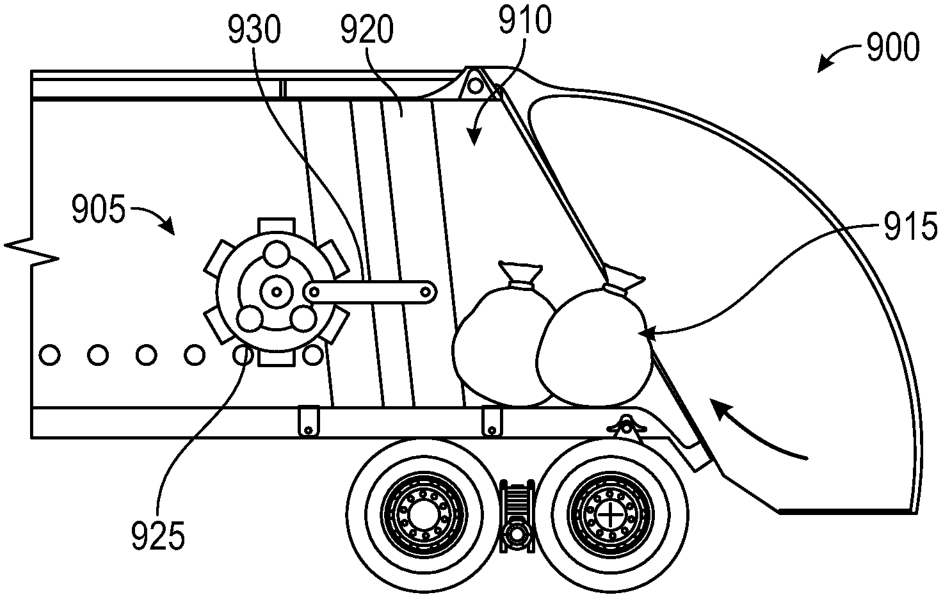
FIG. 27 is a schematic side view of a refuse compartment implementing an ejector mechanism including an epicyclic rack and pinion, according to an exemplary embodiment.

In various embodiments, a refuse ejector mechanism may implement an epicyclic gear system to improve compressive efficiency when compressing refuse contained within a refuse compartment. FIG. 27 shows a schematic side cross-sectional view of a refuse vehicle 900, implementing an epicyclic ejector mechanism 905, according to an exemplary embodiment. As shown, epicyclic ejector mechanism 905 is disposed within a refuse compartment 910 containing refuse

915. The epicyclic ejector mechanism 905 is coupled to a refuse ejector or refuse packer 920. Epicyclic ejector mechanism 905 includes an epicyclic gear system 925, which is coupled to a link 930. Rotational movement within epicyclic gear system 925 causes translation of link 930, which consequently applies a thrust or tension load on the refuse ejector or refuse packer 920. The applied load by link 930 (caused by the epicyclic gear system 925) enables selective movement of refuse ejector 920.

Figure 28:
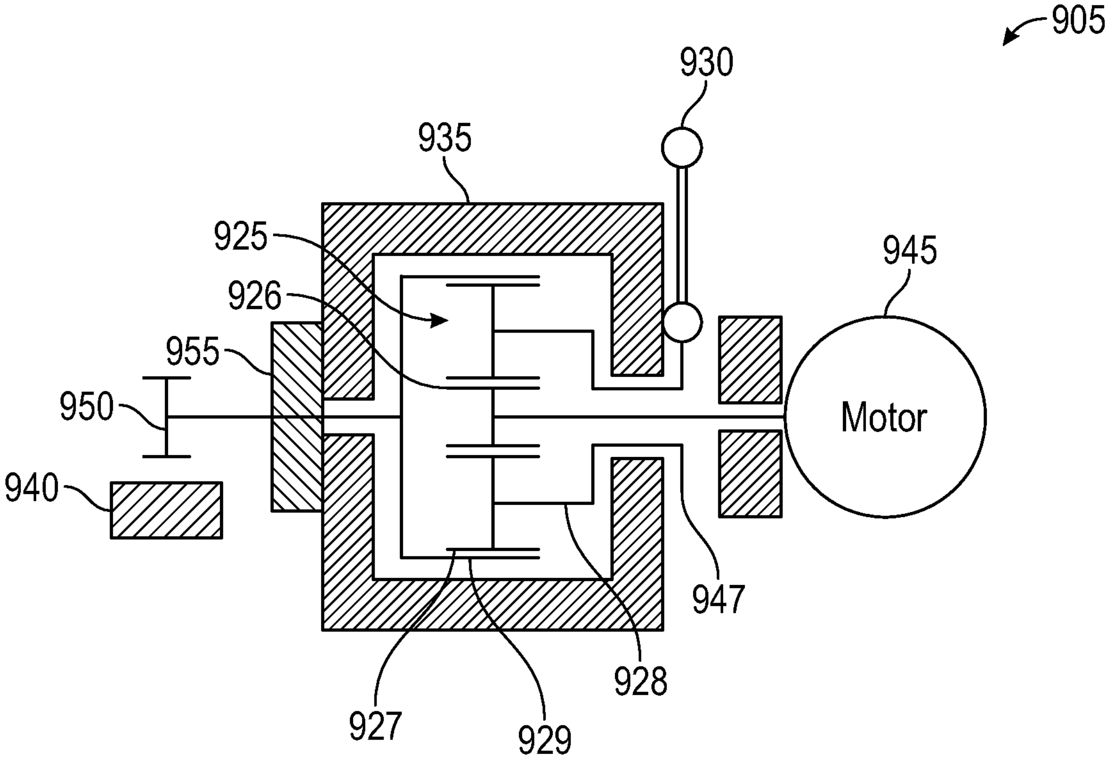
FIG. 28 is a schematic view of the ejector mechanism of FIG. 27 that includes an epicyclic rack and pinion, according to an exemplary embodiment.

FIG. 28 shows a more detailed schematic view of an epicyclic ejector mechanism 905, according to an exemplary embodiment. As shown, epicyclic ejector mechanism 905 includes a housing 935 and rack 940, which may be coupled to interior regions within refuse compartment 910. Housing 935 includes epicyclic gear system 925 having a sun gear 926, planetary gears 927, a carrier 928, and a ring gear 929. Epicyclic gear system 925 is further rotatably coupled to a carrier-engaging gear 947 and a ring-engaging gear 950. For example, as illustrated, the motor 945 is configured to apply rotational input to the sun gear 926 of the epicyclic gear system 925. The carrier 928 is rotatably coupled to the carrier-engaging gear 947, which is coupled to the link 930, which is further coupled to the refuse ejector or refuse packer 920. The coupling between the carrier-engaging gear 947 and the refuse ejector 920 substantially inhibits the carrier-engaging gear 947, and thus the carrier 928 from rotating. Accordingly, the rotational input from the motor is transmitted from the sun gear 926, through the planetary gears 927, to the ring gear 929, which, in turn, rotates the ring-engaging gear 950, ultimately pulling the epicyclic ejector mechanism 905, and thus the refuse ejector 920, along the rack 940 within the refuse compartment 910.

In some instances, a brake 955 may be engaged to inhibit rotation of the ring-engaging gear 950, and thus the ring gear 929. By inhibiting rotation of the ring gear, the rotational output of the motor 945 is applied solely to the carrier 928, which may, due to the gear ratio between the sun gear and the carrier 928, result in an increased torque or pulling force being applied to the refuse ejector or refuse packer 920. Accordingly, in summary, torque applied by the motor 945 may be transmitted via the epicyclic gear system 925 within epicyclic ejector mechanism 905 to selectively move refuse ejector 920 within refuse compartment 910.

Figure 29:
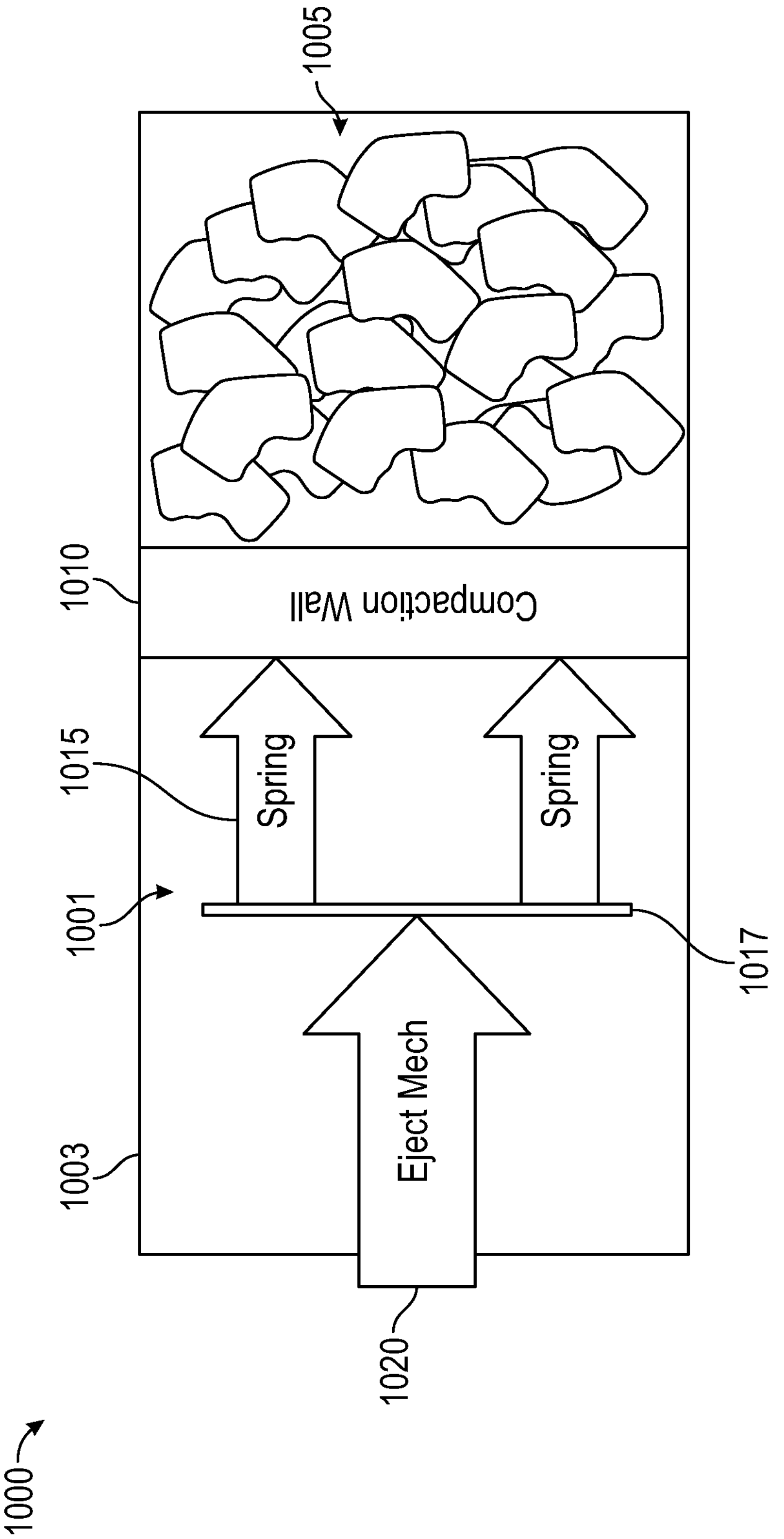
FIG. 29 is a schematic view of an ejector mechanism for a refuse compartment implementing a spring compliant refuse ejector, according to an exemplary embodiment.

In various embodiments, a rear ejector mechanism may include one or more springs to provide refuse ejector compliance. FIG. 29 shows a top schematic view of a spring compliant refuse ejector mechanism 1000 within a refuse compartment 1001 formed by frame or panels 1003, according to an exemplary embodiment. As shown, refuse compartment 1001 includes refuse 1005, which is moved and/or compacted within refuse compartment 1001 via a refuse ejector 1010. Refuse ejector 1010 is coupled to one or more springs 1015, which are mounted to an intermediate wall 1017. Springs 1015 may apply a mechanical load to refuse ejector 1010 based on movement and subsequent load application by wall 1017. Wall 1017 may be coupled to an actuating mechanism 1020. Actuating mechanism 1020 many include, but is not limited to, one or more linear actuators, rotational actuators, gear systems, motors, scissor mechanisms, or a combination thereof. Inclusion of intermediate wall 1017 and coupled springs 1015 between actuating mechanism 1020 and refuse ejector 1010 facilitates improved load distribution. In addition, implementation of a spring compliant refuse ejector mechanism reduces or eliminates a need for continuous control of refuse ejector 1010.

Various embodiments of a rear ejector mechanism may include any one or combination of the previously described rear ejector mechanisms (such as 325, 400, 500, 600, 700, 817, 905, and 1000).

Figure 30:
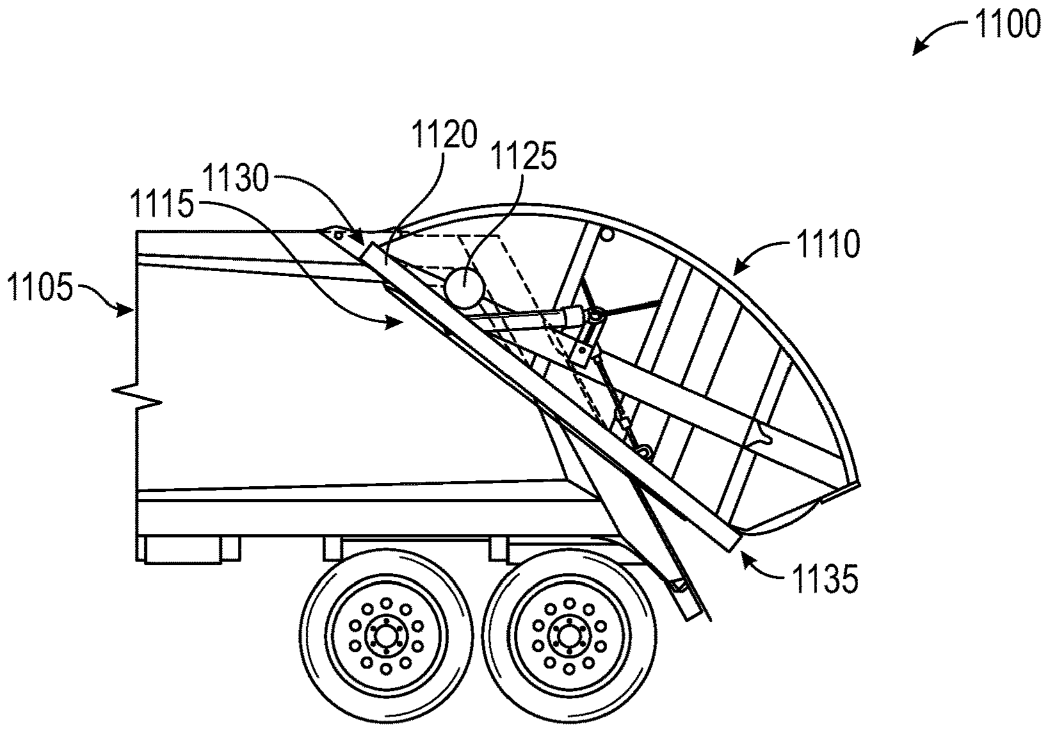
FIG. 30 is a side view of a refuse vehicle with a sliding tailgate lift, showing a tailgate in a substantially closed position, according to an exemplary embodiment.
Figure 31:
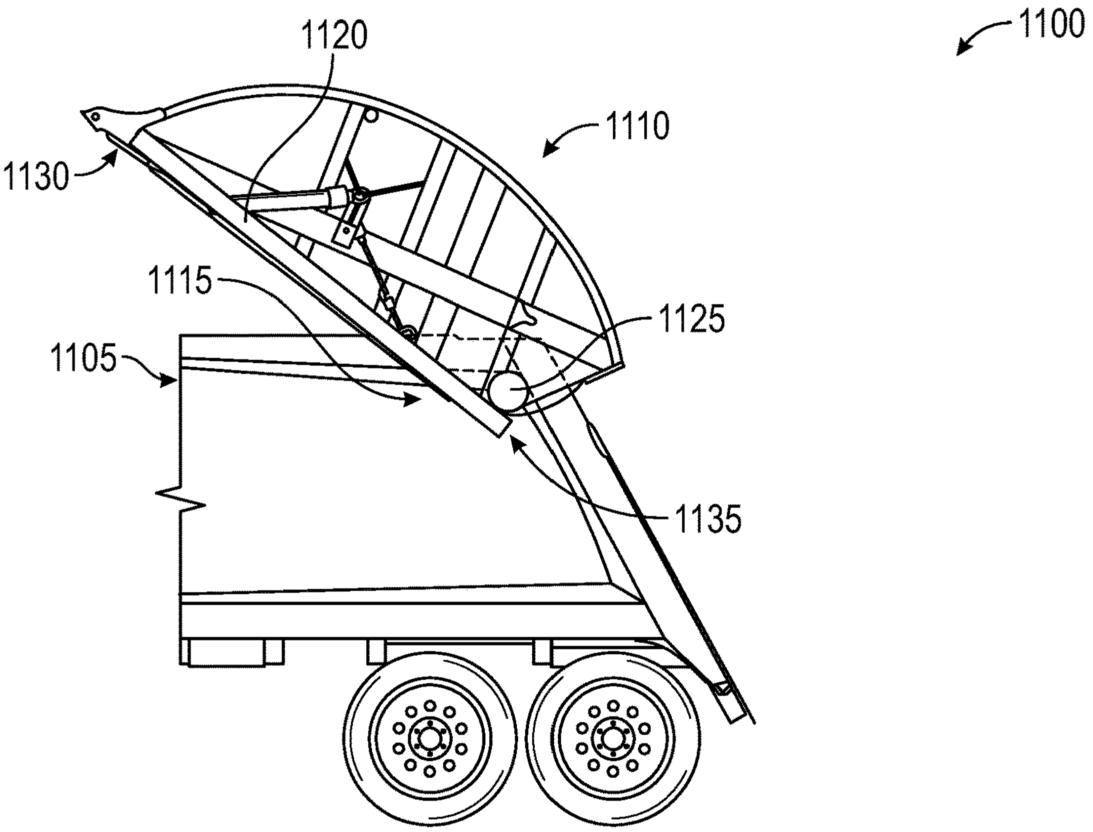
FIG. 31 is a side view of the refuse vehicle of FIG. 30, showing the tailgate in a maximally lifted position, according to an exemplary embodiment.

Referring now to FIGS. 30 and 31, a vehicle, shown as a refuse vehicle 1100, is configured as a rear-loading refuse vehicle and includes a sliding tailgate lift, according to an exemplary embodiment. As shown, refuse vehicle 1100 includes a main body 1105 and a tailgate 1110, which is configured to be controllably or selectively moved relative to the main body 1105 between an opened position (e.g., show in FIG. 31) and a closed position (e.g., shown in FIG. 30). Movement of tailgate 1110 relative to main body 1105 (e.g., to the opened position) enables placement and removal of refuse from the main body 1105.

Refuse vehicle 1100 includes a tailgate lift mechanism 1115, which is configured as a sliding lift, to facilitate movement of the tailgate 1110, while reducing overhung load and required lift forces. Tailgate lift mechanism 1115 is configured to control movement of tailgate 1110, such that tailgate 1110 slides along a constricted movement pathway 1120. The range of movement of the tailgate 1110 is determined by an electric motor 1125, which is coupled to tailgate 1110 and main body 1105. In various embodiments, movement pathway 1120 may include or be a track or groove configured to constrict movement of tailgate 1110 beyond a predetermined movement path. In various embodiments electric motor 1125 may be configured to engage the track within the movement pathway 1120 to slide the tailgate 1110 with respect to the main body 1105.

In some instances, tailgate lift mechanism 1115 may additionally or alternatively include one or more actuators configured to controllably move the tailgate 1110 relative to main body 1105. In various embodiments, tailgate lift mechanism 1115 may include one or more manual, pneumatic, hydraulic, electric, spring type, linear, rotational, or gear type actuators, an electric motor (e.g., the electric motor 1125), or a combination thereof. Tailgate lift mechanism 1115 is configured to controllably move tailgate 1110 (via one or more actuators and/or motors) reversibly between the closed position, wherein electric motor 1125 is proximate to a top region 1130 on tailgate 1110, and a maximally lifted position (e.g., the opened position), wherein the electric motor 1125 is proximate to a bottom region 1135 on tailgate 1110. In various embodiments, tailgate lift mechanism 1115 is additionally configured to controllably move tailgate 1110 to any position along movement pathway 1120 (e.g., not limited to the closed position and the opened). As alluded to above, FIG. 30 shows tailgate 1110 in a substantially closed position wherein the electric motor 1125 is proximate to a top region 1130 on tailgate 1110. FIG. 31 shows tailgate 1110 in a opened position wherein the electric motor 1125 is proximate to a bottom region 1135 on tailgate 1110.

FIGS. 30 and 31 show the movement pathway 1120 as a substantially unidirectional, linear pathway. In various embodiments, movement pathway 1120 may include one or more linear portions, one or more curved portions, or a combination thereof. In various embodiments, movement pathway 1120 may include one or more springs, dampers, notches, or other suitable mechanisms to additionally meter movement of tailgate 1110 relative to main body 1105.

Figure 32:
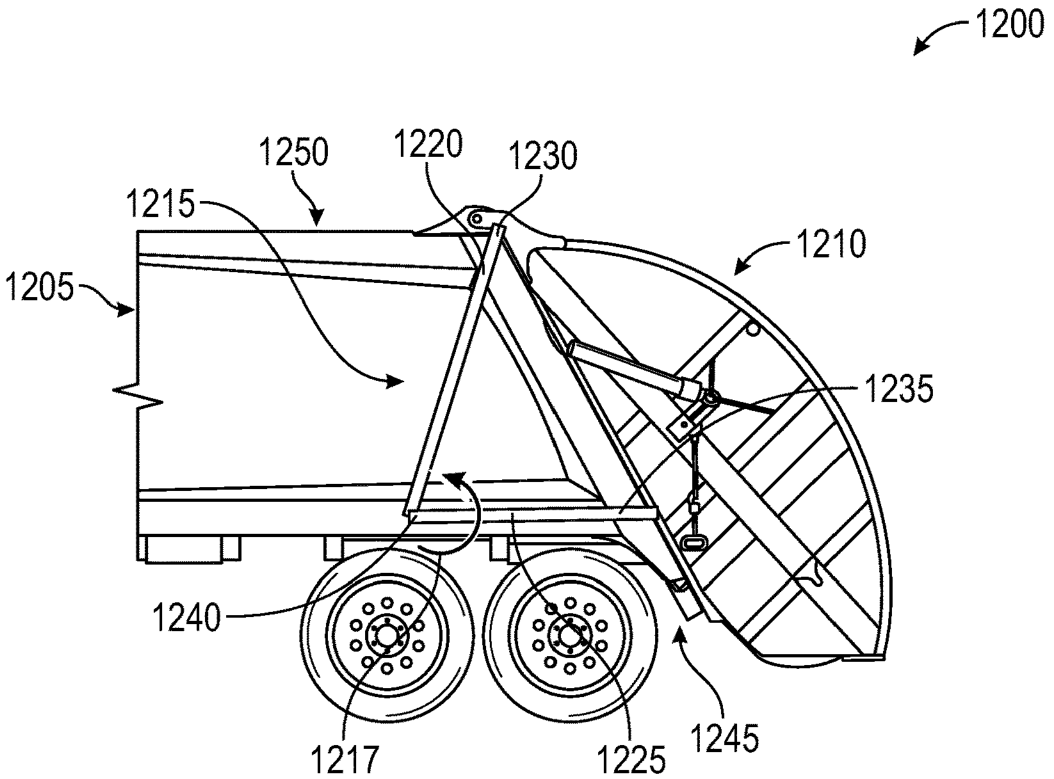
FIG. 32 is a side view of a refuse vehicle with a fixed distance pivot tailgate lift, showing a tailgate in a substantially closed position, according to an exemplary embodiment.
Figure 33:
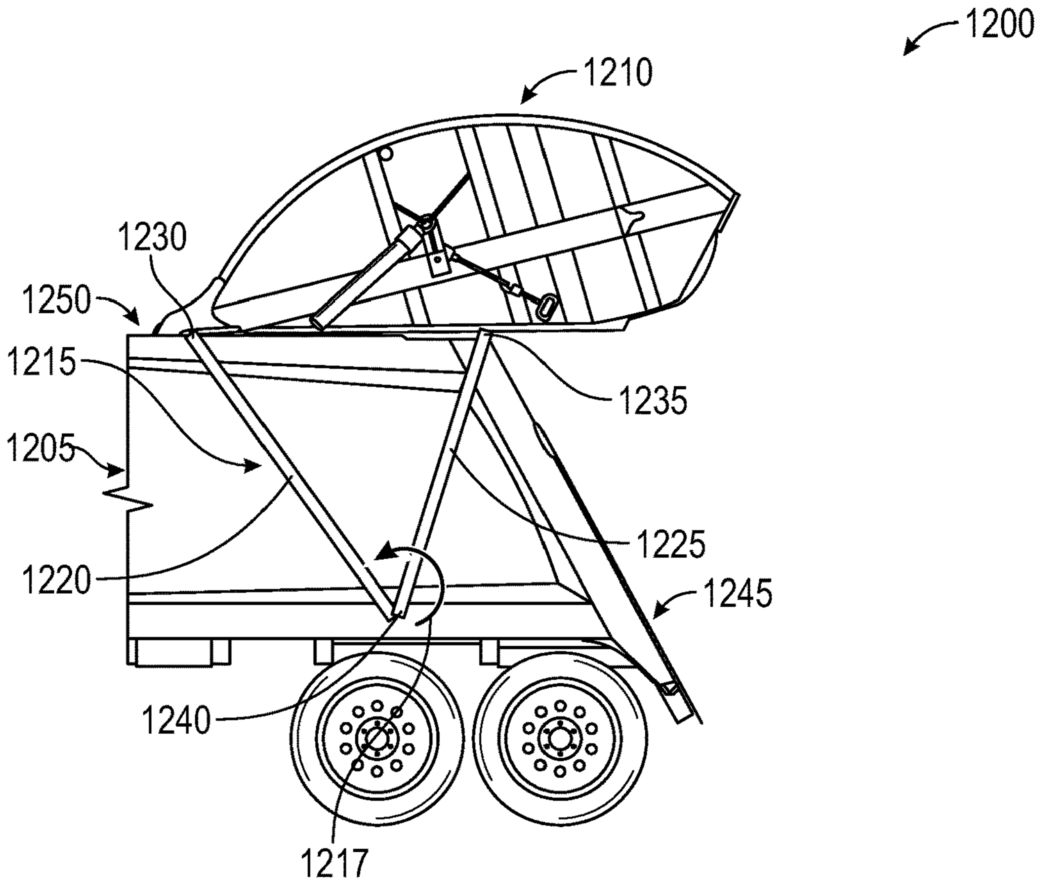
FIG. 33 is a side view of the refuse vehicle of FIG. 32, showing the tailgate in a maximally lifted position, according to an exemplary embodiment.

Referring now to FIGS. 32 and 33, a vehicle, shown as a refuse vehicle 1200, is configured as a rear-loading refuse vehicle and includes a fixed distance pivot tailgate lift, according to an exemplary embodiment. As shown, refuse vehicle 1200 includes a main body 1205 and a tailgate 1210, which is configured to controllably move relative to the main body 1205 between an opened position (shown in FIG. 33) and a closed position (shown in FIG. 32). Movement of tailgate 1210 relative to main body 1205 (e.g., into the opened position) enables placement and removal of refuse from the main body 1205.

Refuse vehicle 1200 includes a tailgate lift mechanism 1215, which is configured as a fixed distance pivot lift, to facilitate movement of tailgate 1210 while minimizing overhung load and maintaining overall vertical clearance. Tailgate lift mechanism 1215 is configured to control movement of tailgate 1210 such that tailgate 1210 pivots or rotates relative to main body 1205 in a direction 1217 (e.g., a counter clockwise direction with respect to the illustrative example provided by FIGS. 32 and 33).

As shown, tailgate 1210 is coupled to pivot arms 1220 and 1225, via corresponding joints 1230 and 1235. Each of the pivot arms 1220 and 1225 are further hingedly coupled to the main body 1205 via a pin joint 1240. That is, both of the pivot arms 1220 and 1224 are coupled to the main body 1205 at a single rotational location. Accordingly, during operation, the tailgate lift mechanism 1215 may rotate the tailgate 1210 about the joint 1240 (e.g., in the direction 1217 or in a direction opposite the direction 1217).

The tailgate lift mechanism 1215 may include one or more electrically driven actuation mechanisms configured to controllably move the tailgate 1210 relative to the main body 1205. In various embodiments, the tailgate lift mechanism 1215 may include one or more manual, pneumatic, hydraulic, electric, spring type, linear, rotational, or gear type actuators, one or more electric motors, or a combination thereof. Tailgate lift mechanism 1215 is configured to controllably move tailgate 1210 (via the one or more comprising actuation mechanisms) reversibly between a closed position (shown in FIG. 0.32), wherein joints 1230 and 1235 are both proximate to a side region 1245 of the main body 1205, and an opened position (shown in FIG. 33), wherein joints 1230 and 1235 are both proximate to a top region 1250 of main body 1205. In various embodiments, tailgate lift mechanism 1215 is additionally configured to controllably move tailgate 1210 to any position in between the closed position and the opened position.

In various embodiments, the tailgate lift mechanism 1215 may include one or more springs, dampers, notches, or other suitable mechanisms to additionally meter movement of tailgate 1210 relative to main body 1205. FIG. 32 shows tailgate 1210 in the closed position wherein joints 1230 and 1235 are proximate to the side region 1245 of main body 1205. FIG. 33 shows tailgate 1210 in the opened position wherein joints 1230 and 1235 are proximate to the top region 1250 of main body 1205.

Figure 34:
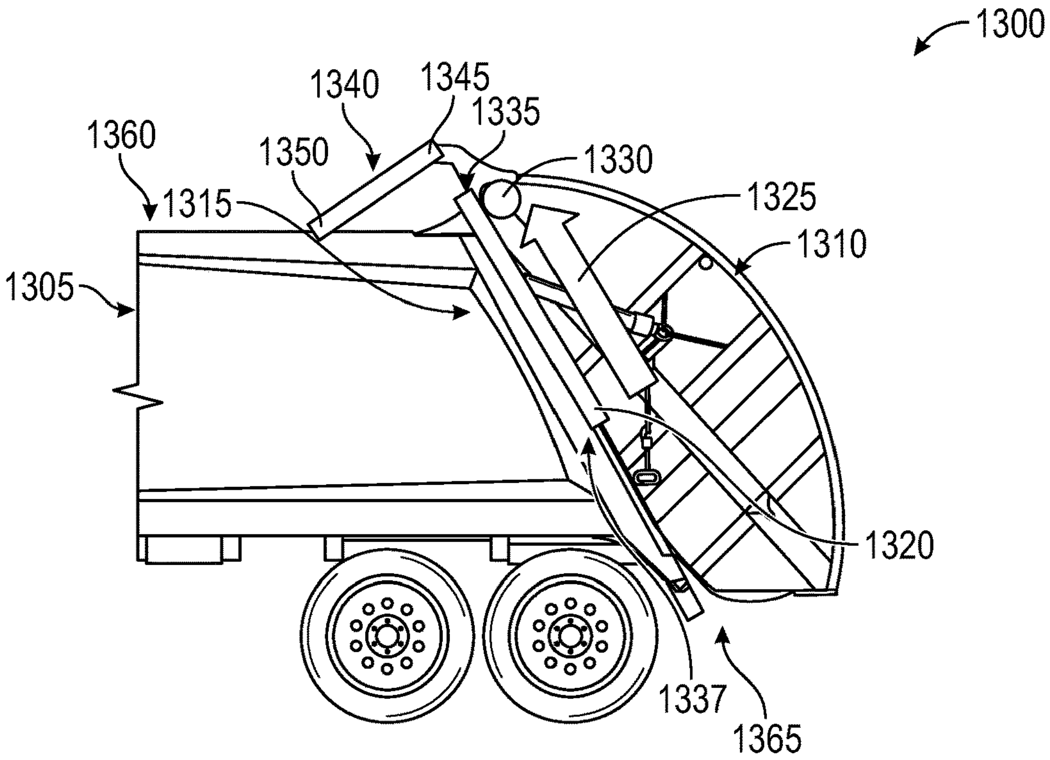
FIG. 34 is a side view of a refuse vehicle with a slide and high pivot tailgate lift, showing a tailgate in a substantially closed position, according to an exemplary embodiment.
Figure 35:
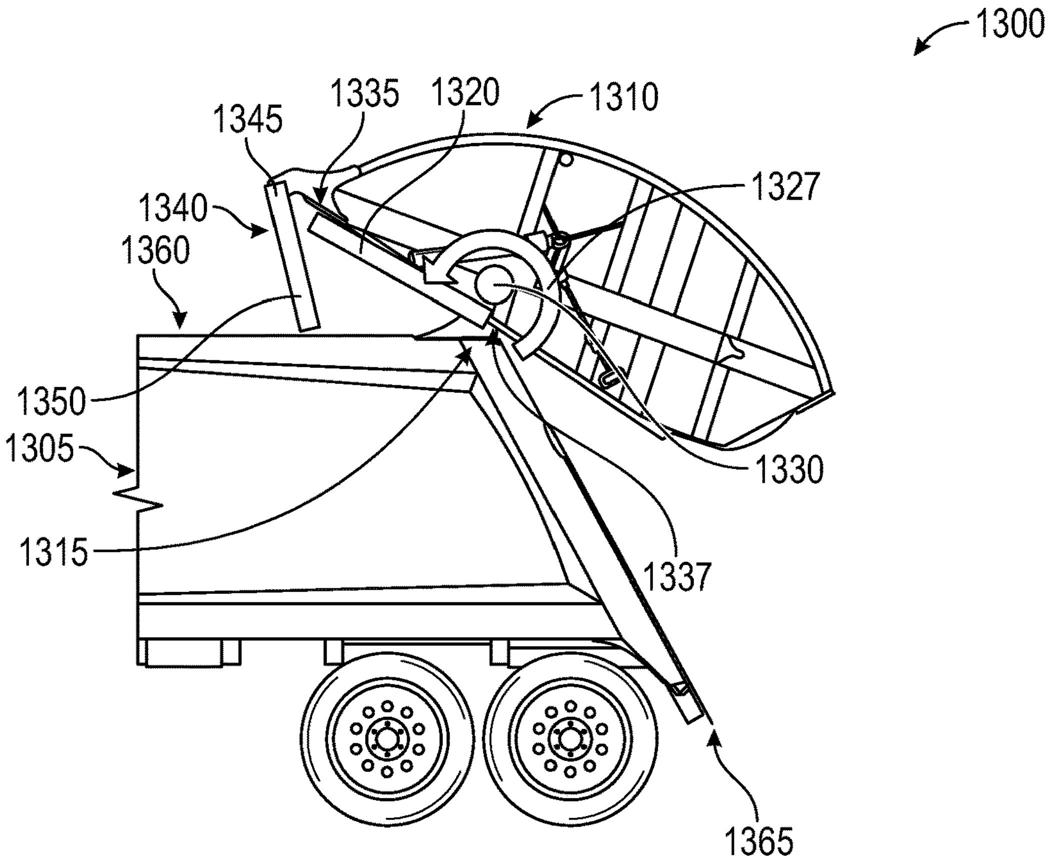
FIG. 35 is a side view of the refuse vehicle of FIG. 34, showing the tailgate in a raised position after sliding, according to an exemplary embodiment.
Figure 36:
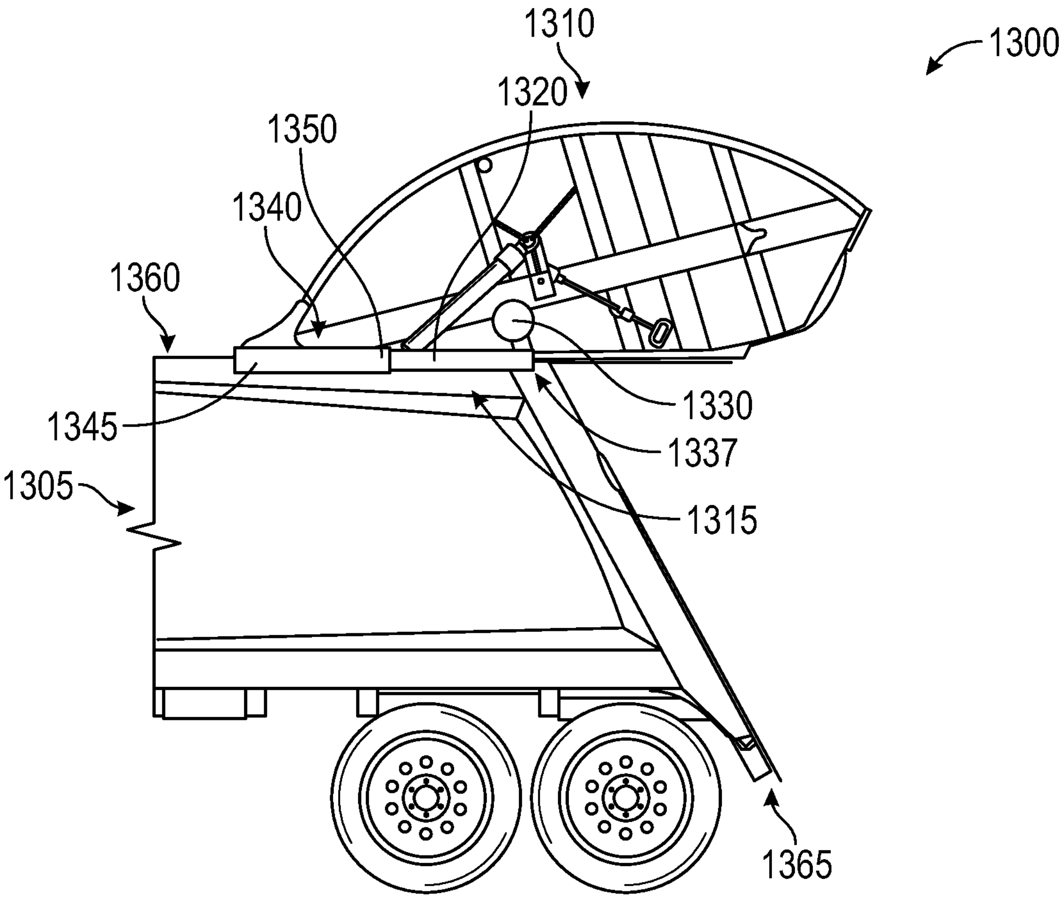
FIG. 36 is a side view of the refuse vehicle of FIGS. 34-35, showing the tailgate in a maximally lifted position after pivoting, according to an exemplary embodiment.

Referring now to FIGS. 34-36, a vehicle, shown as a refuse vehicle 1300, is configured as a rear-loading refuse vehicle and includes a slide and high pivot tailgate lift, according to an exemplary embodiment. As shown, refuse vehicle 1300 includes a main body 1305 and a tailgate 1310, which is configured to controllably move relative to the main body 1305 between an opened position (shown in FIG. 36) and a closed position (shown in FIG. 34). Movement of tailgate 1310 relative to main body 1305 enables placement and removal of refuse from the main body 1305 (e.g., when the tailgate 1310 is in the opened position). Refuse vehicle 1300 includes a tailgate lift mechanism 1315, which is configured as a slide and high pivot tailgate lift. The high pivot tailgate lift mechanism 1315 facilitates movement of tailgate 1310 while retaining a substantially flat interface between tailgate 1310 and main body 1305, maintaining a substantially consistent vertical clearance, and minimizing overhung load. Tailgate lift mechanism 1315 is configured to control movement of tailgate 1310, such that tailgate 1310 controllably slides and/or pivots relative to main body 1305. In various embodiments, tailgate lift mechanism 1315 may include one or more manual, pneumatic, hydraulic, electric, spring type, linear, rotational, or gear type actuators, one or more electric motors, or a combination thereof.

During operation, tailgate lift mechanism 1315 is configured to move tailgate 1310 such that tailgate 1310 slides along a sliding pathway 1320 in a direction 1325, wherein a range of sliding movement of tailgate 1310 is determined by a position of a roller joint 1330 relative to sliding pathway 1320. Roller joint 1330 is configured to rotatably engage the tailgate 1310 and the main body 1305. In various embodiments roller joint 1330 may be a bearing, a roller, a rod, or any other suitable mechanical assembly to form a roller joint.

In various embodiments, sliding pathway 1320 may include or be a track or groove configured to constrict movement of tailgate 1310 beyond a predetermined movement path. FIG. 34 shows the tailgate 1310 in a substantially closed position, wherein the roller joint 1330 is proximate to a first end 1335 of sliding pathway 1320. As shown in FIG. 35, tailgate lift mechanism 1315 may move tailgate 1310 to a raised position, wherein roller joint 1330 is proximate to a second end 1337 of sliding pathway 1320. Once in a raised position, tailgate 1310 may rotate relative to main body 1305 in a rotational direction 1327, caused by tailgate lift mechanism 1315. As shown in FIG. 35, the tailgate 1310 is coupled to an arm 1340 at a joint 1345. The arm 1340 is also coupled to a top region 1360 of main body 1305 at joint 1350.

When roller joint 1330 is positioned near the second end 1337 of sliding pathway 1320, tailgate lift mechanism 1315 will cause tailgate 1310 to rotate relative to main body 1305 about joints 1345 and 1350, thereby causing tailgate 1310 to be in a maximally lifted or opened position, which is shown in FIG. 36. When tailgate 1310 is maximally lifted, joint 1345 is proximate to the top region 1360 of main body 1305 and roller joint 1330 is positioned proximate to the second end 1337 of sliding pathway 1320. During operation, if the tailgate 1310 is in a closed position, tailgate lift mechanism 1315 may move tailgate 1310 (e.g., via one or more actuators) by causing tailgate 1310 to first slide relative to main body 1305 based on sliding pathway 1320 and subsequently pivot about joints 1350 and 1345. Alternatively, if tailgate 1310 is in the maximally lifted or opened position, tailgate lift mechanism 1315 may first cause tailgate 1310 to pivot about joints 1350 and 1345 and subsequently slide relative to main body 1305 via sliding pathway 1320. Tailgate lift mechanism 1315 is thus configured to facilitate positioning of tailgate 1310 among a substantially closed position (as shown in FIG. 34), a raised or intermediate position (as shown in FIG. 35), and a maximally lifted or opened position (as shown in FIG. 36). In various embodiments, tailgate lift mechanism 1315 may include one or more springs, dampers, notches, or other suitable mechanisms to additionally meter movement of tailgate 1310 relative to main body 1305.

Figure 37:
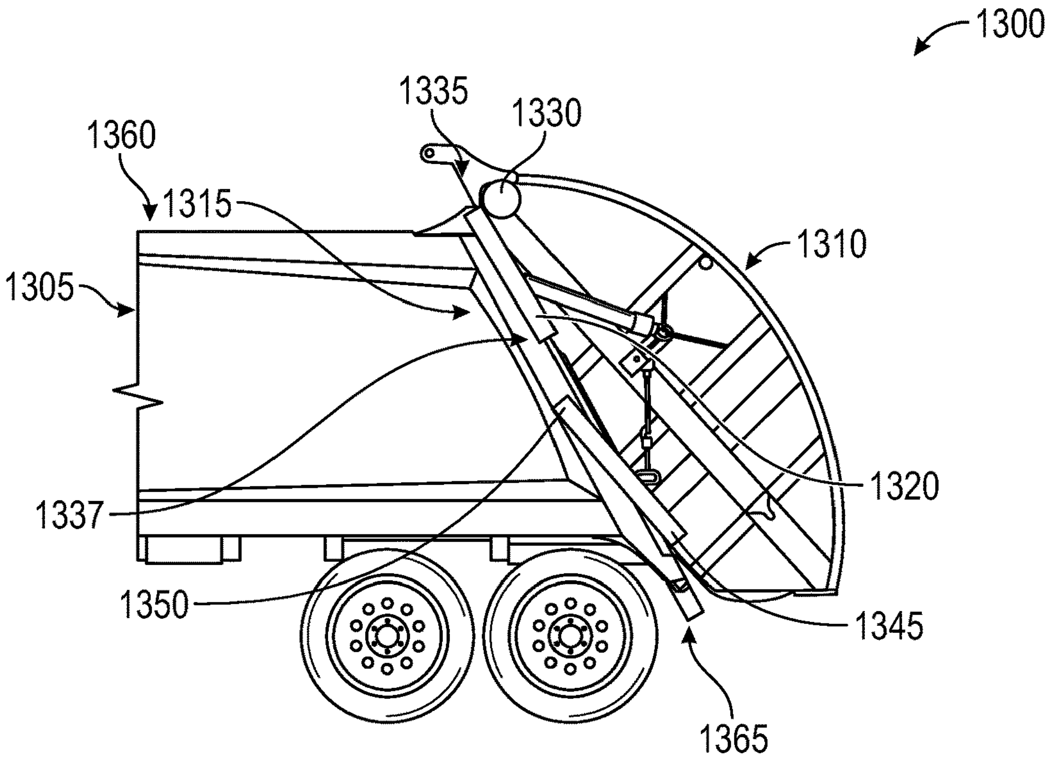
FIG. 37 is a side view of a refuse vehicle with a slide and low pivot tailgate lift, showing a tailgate in a substantially closed position, according to an exemplary embodiment.
Figure 38:
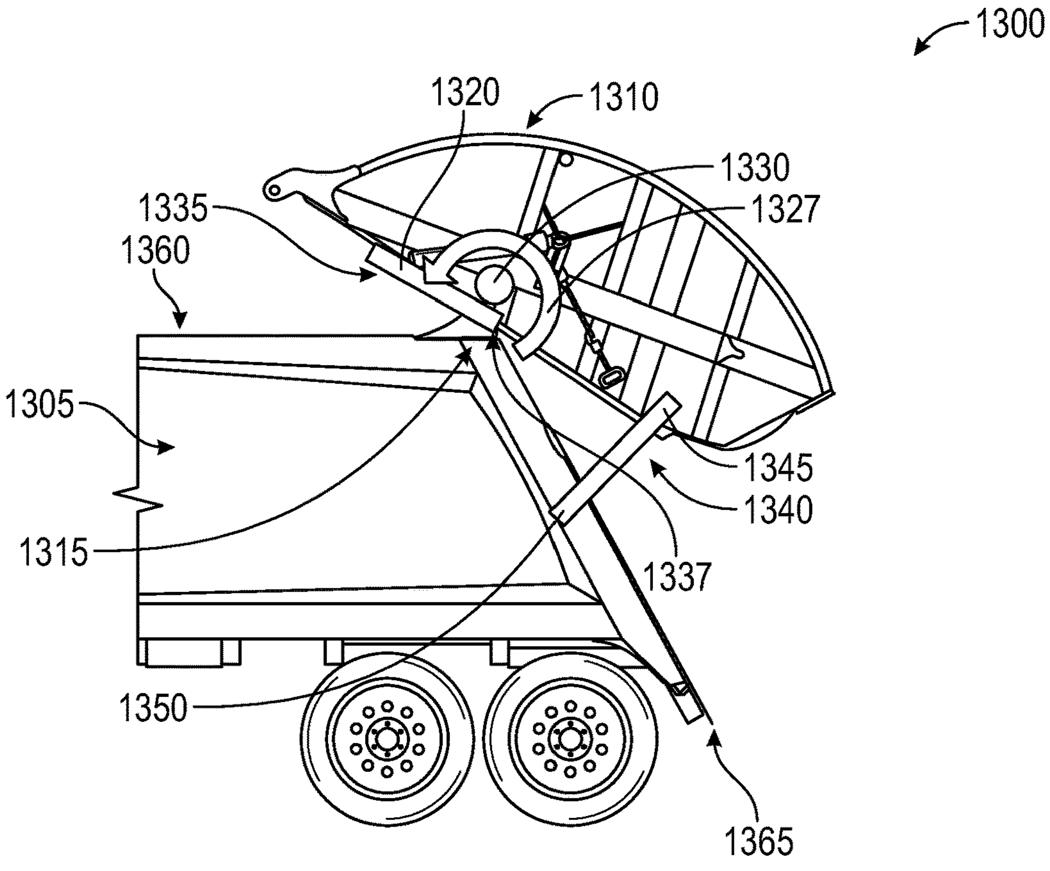
FIG. 38 is a side view of the refuse vehicle of FIG. 38, showing the tailgate in a raised position after sliding, according to an exemplary embodiment.
Figure 39:
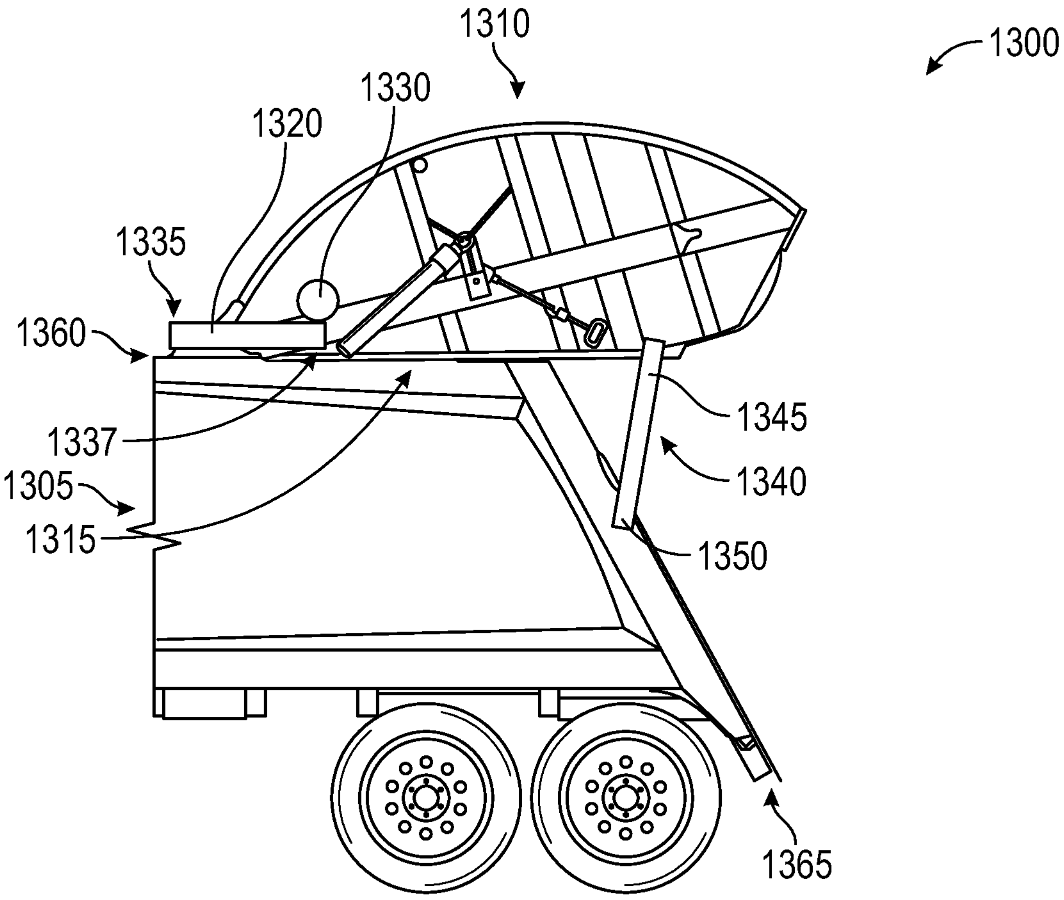
FIG. 39 is a side view of the refuse vehicle of FIGS. 37-38, showing the tailgate in a maximally lifted position, according to an exemplary embodiment.

FIGS. 37-39 show an alternate configuration for tailgate lift mechanism 1315 within a refuse vehicle 1300, according to various exemplary embodiments. As shown, refuse vehicle 1300 may contain a tailgate lift mechanism 1315 configured as a slide and low pivot tailgate lift, wherein tailgate 1310 pivots at a point near a bottom region 1365 of main body 1305.

As previously described, tailgate lift mechanism 1315 is configured to move tailgate 1310 such that tailgate 1310 slides along a sliding pathway 1320, wherein a range of sliding movement of tailgate 1310 is determined by a position of roller joint 1330 relative to sliding pathway 1320. Roller joint 1330 is configured to rotatably engage the tailgate 1310 and the main body 1305. FIG. 37 shows a tailgate 1310 in a substantially closed position, wherein roller joint 1330 is proximate to a first end 1335 of sliding pathway 1320. As shown in FIG. 38, tailgate lift mechanism 1315 may move tailgate 1310 to a raised or intermediate position, wherein roller joint 1330 is proximate to a second end 1337 of sliding pathway 1320. Once in the raised or intermediate position, tailgate 1310 may rotate relative to main body 1305 in a rotational direction 1327, caused by tailgate lift mechanism 1315. As shown in FIG. 38, tailgate 1310 is coupled to an arm 1340 at a joint 1345, which is coupled near a bottom region 1365 of main body 1305 at joint 1350. As previously described, when roller joint 1330 is positioned near the second end 1337 of sliding pathway 1320, the tailgate lift mechanism 1315 causes the tailgate 1310 to rotate relative to the main body 1305 about joints 1345 and 1350, thereby causing the tailgate 1310 to move into the maximally lifted or opened position, which is shown in FIG. 39. Given the low pivot configuration of tailgate lift mechanism 1315, when tailgate 1310 is maximally lifted (e.g., is in the opened position), first end 1335 of sliding pathway 1320 is proximate to a top region 1360 of main body 1305 and the roller joint 1330 is positioned proximate to the second end 1337 of sliding pathway 1137.

Figure 40:
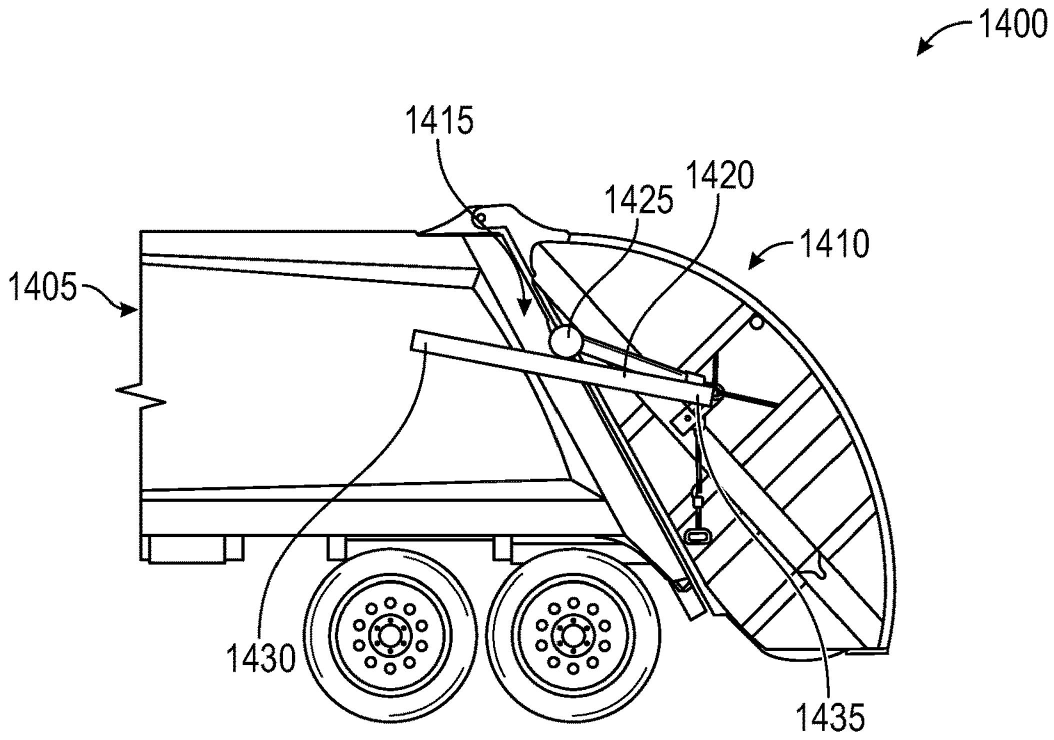
FIG. 40 is a side view of a refuse vehicle with a rack and pinion tailgate lift, showing a tailgate in a substantially closed position, according to an exemplary embodiment.
Figure 41:
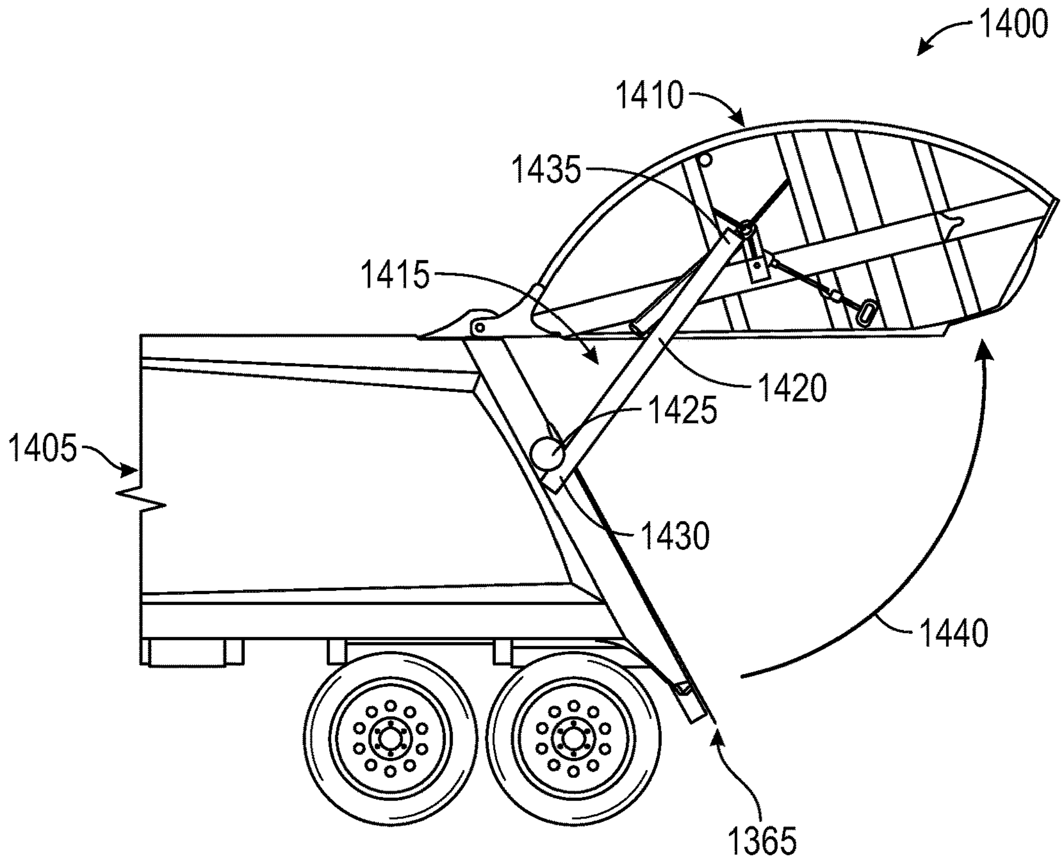
FIG. 41 is a side view of the refuse vehicle of FIG. 40, showing the tailgate in a maximally lifted position, according to an exemplary embodiment.

Referring now to FIGS. 40 and 41, a vehicle, shown as a refuse vehicle 1400, is configured as a rear-loading refuse vehicle and includes a rack and pinion tailgate lift, according to an exemplary embodiment. As shown, refuse vehicle 1400 includes a main body 1405 and a tailgate 1410, which is configured to be controllably moved relative to the main body 1405 between an opened position (shown in FIG. 41) and a closed position (FIG. 40). Movement of the tailgate 1410 relative to the main body 1405 (e.g., into the opened position) enables placement and removal of refuse from the main body 1405.

Refuse vehicle 1400 includes a tailgate lift mechanism 1415, which is configured as a rack and pinion lift, to facilitate movement of tailgate 1410. Tailgate lift mechanism 1415 is configured to control movement of tailgate 1410 such that tailgate 1410 translates along a constricted movement pathway defined by a substantially linear rack 1420. Movement of tailgate 1410 is facilitated by a pinion drive gear 1425, which engages with linear rack 1420. The rack 1420 is coupled to the main body 1405 and the tailgate 1410 at joints 1430 and 1435, respectively. In various embodiments the pinion drive gear 1425 may be a circular or helical gear, or any other suitable gear type for converting rotational motion to translational motion. In various embodiments, rack 1420 may include one or more linear gears.

Accordingly, the tailgate lift mechanism 1415 is configured to controllably move tailgate 1410 (via the rack 1420 and pinion drive gear 1425) reversibly between a non-lifted position or closed position, wherein pinion drive gear 1425 not positioned proximately to joint 1430, and a maximally lifted or opened position, wherein pinion drive gear 1425 is positioned proximate to joint 1430. In various embodiments, tailgate lift mechanism 1415 is configured to controllably move tailgate 1410 such that pinion drive gear 1425 may be positioned anywhere along rack 1420. FIG. 40 shows the tailgate 1410 in a non-lifted position or closed position, wherein the pinion drive gear 1425 is positioned along the rack 1420 a distance between joints 1430 and 1435. FIG. 41 shows the tailgate 1410 in a maximally lifted or opened position, wherein the pinion drive gear 1425 is proximate to the joint 1430 and the tailgate 1410 has been rotated about joints 1430 and 1435 in a direction 1440. In various embodiments, the tailgate lift mechanism 1415 may be configured to include one or more springs, dampers, notches, features, or other suitable mechanisms to additionally meter movement of tailgate 1410 relative to main body 1405 and/or a movement of pinion drive gear 1425 relative to rack 1420.

Figure 42:
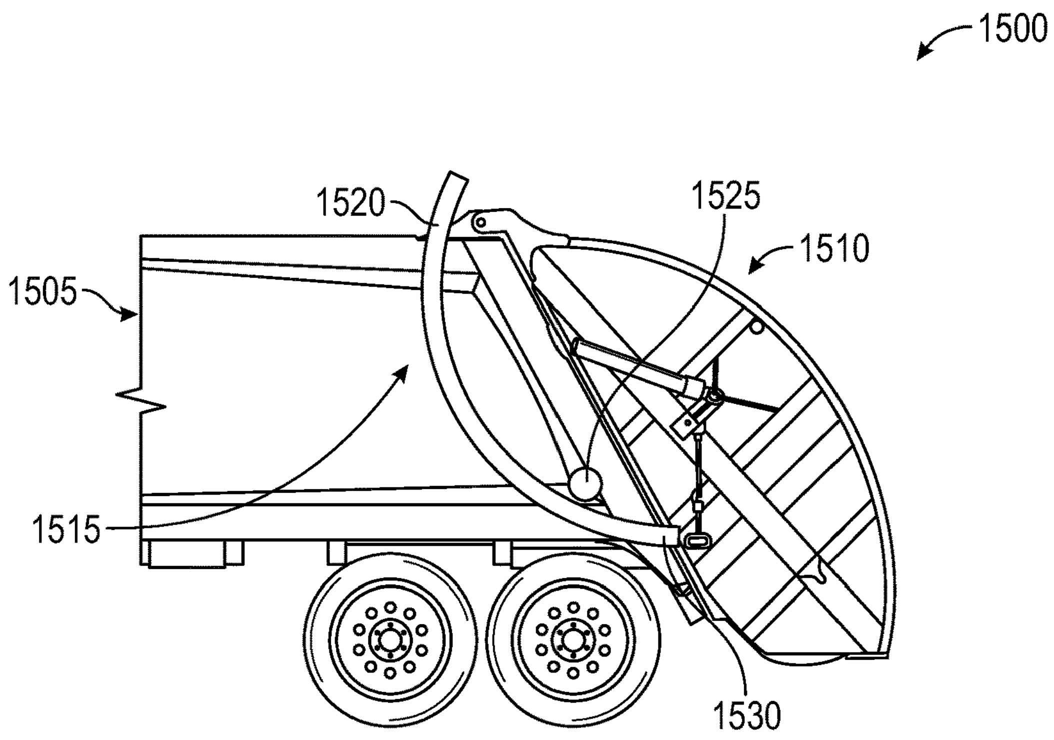
FIG. 42 is a side view of a refuse vehicle with a curved rack and pinion tailgate lift, showing a tailgate in a substantially closed position, according to an exemplary embodiment.
Figure 43:
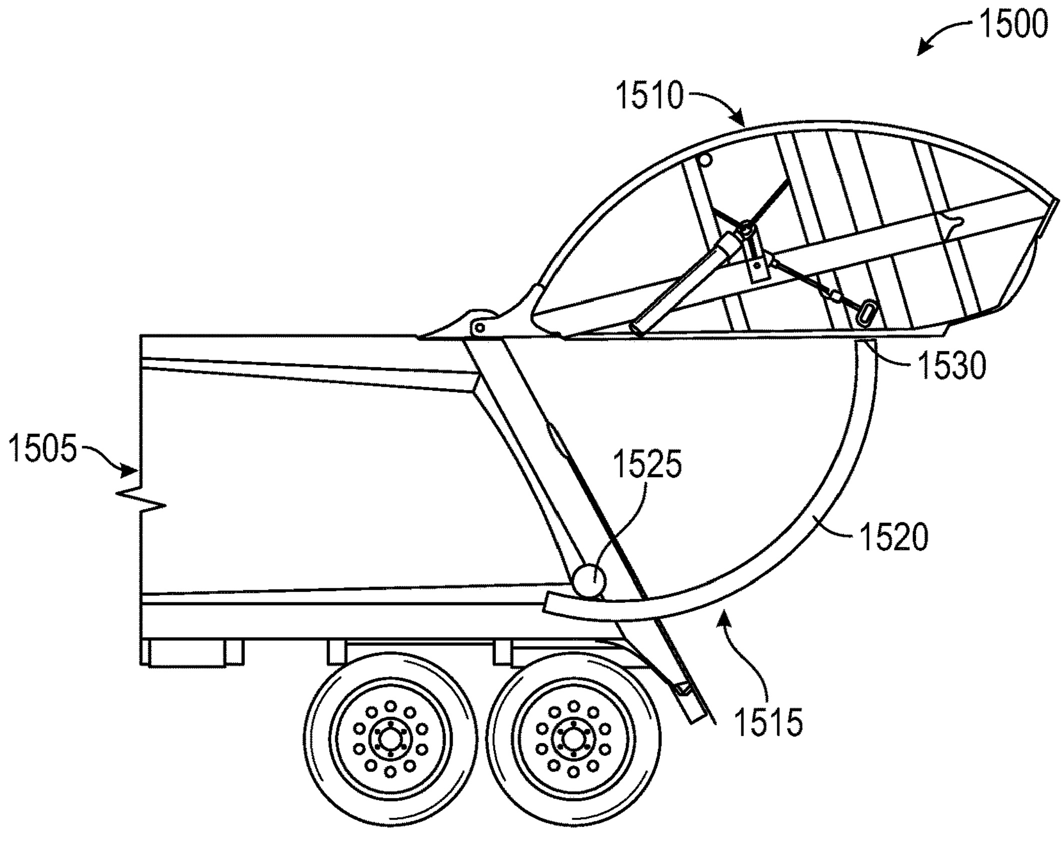
FIG. 43 is a side view of the refuse vehicle of FIG. 42, showing the tailgate in a maximally lifted position, according to an exemplary embodiment.

Referring now to FIGS. 42 and 43, a vehicle, shown as a refuse vehicle 1500, is configured as a rear-loading refuse vehicle and includes a sliding tailgate lift, according to an exemplary embodiment. As shown, refuse vehicle 1500 includes a main body 1505 and a tailgate 1510, which is configured to be controllably or selectively moved relative to the main body 1505 between an opened position (e.g., show in FIG. 43) and a closed position (e.g., shown in FIG. 42). Movement of tailgate 1510 relative to main body 1505 (e.g., to the opened position) enables placement and removal of refuse from the main body 1505. Refuse vehicle 1500 includes a tailgate lift mechanism 1515, which is configured as a curved rack and pinion mechanism, to facilitate movement of the tailgate 1510. The tailgate lift mechanism 1515 includes a curved rack 1520 and a pinion drive gear 1525.

As shown in FIGS. 42 and 43, the curved rack 1520 is coupled to a lower portion of the tailgate 1510 at a distal end 1530 of the curved rack 1520. The pinion drive gear 1525 is engaged with the curved rack 1520, such that rotation of the pinion drive gear 1525 results in articulation of the curved rack 1520 between an extended position (as shown in FIG. 43) and a retracted position (as shown in FIG. 42), which moves the tailgate 1510 between the opened and closed positions. Furthermore, the curved rack 1520 is maintained in engagement with the pinion drive gear 1525 throughout the entire articulation between the retracted position and the extended position. In some instances, the pinion drive gear 1525 is further configured to be driven by an electric motor (e.g., electric motor 18).

Figure 44:
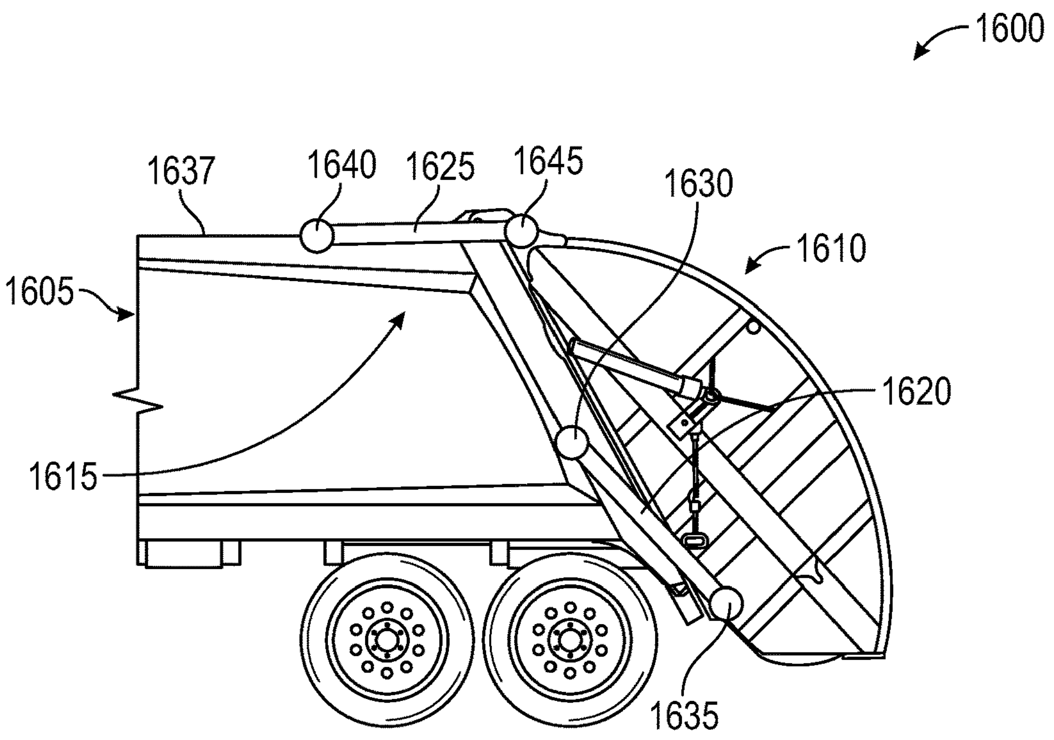
FIG. 44 is a side view of a refuse vehicle with a dual pivot tailgate lift, showing a tailgate in a substantially closed position, according to an exemplary embodiment.
Figure 45:
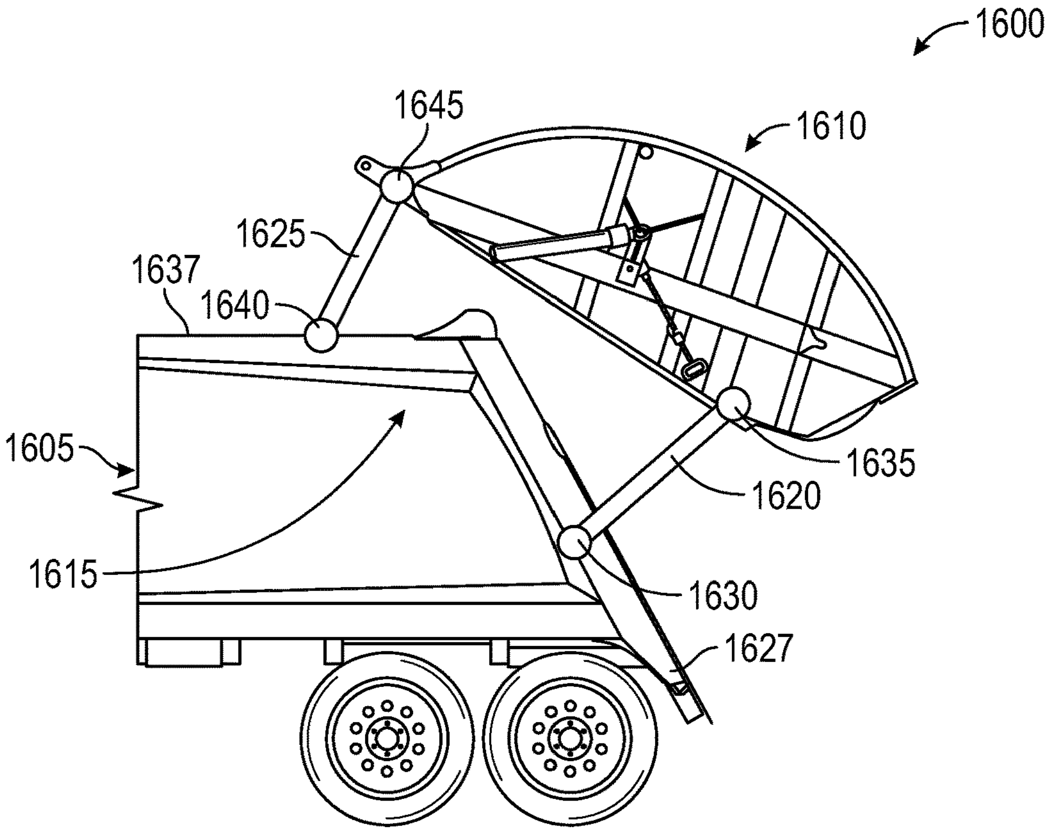
FIG. 45 is a side view of the refuse vehicle of FIG. 44, showing the tailgate in a raised position, according to an exemplary embodiment.
Figure 46:
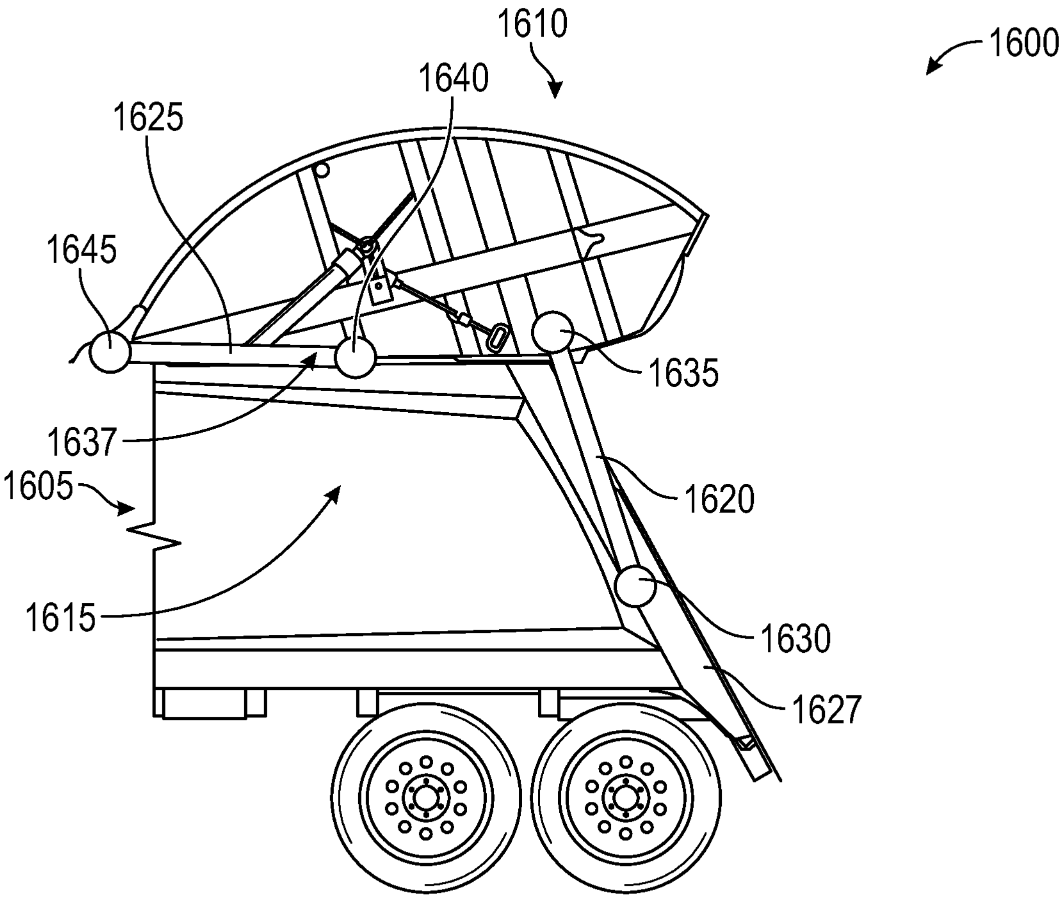
FIG. 46 is a side view of the refuse vehicle of FIGS. 44-45, showing the tailgate in a maximally lifted position, according to an exemplary embodiment.

Referring now to FIGS. 44-46, a vehicle, shown as a refuse vehicle 1600, is configured as a rear-loading refuse vehicle and includes a sliding tailgate lift, according to an exemplary embodiment. As shown, refuse vehicle 1600 includes a main body 1605 and a tailgate 1610, which is configured to be controllably or selectively moved relative to the main body 1605 between an opened position (e.g., show in FIG. 46) and a closed position (e.g., shown in FIG. 44). Movement of tailgate 1610 relative to main body 1605 (e.g., to the opened position) enables placement and removal of refuse from the main body 1605.

Refuse vehicle 1600 includes a tailgate lift mechanism 1615, which is configured as a four bar lift, to facilitate movement of the tailgate 1610, while reducing overhung load and required lift forces. The tailgate lift mechanism 1615 includes a pair of first articulation arms 1620 (one of which being shown in each of FIGS. 44-46) and a pair of second articulation arms 1625 (one of which being shown in each of FIGS. 44-46).

As shown in FIGS. 44-46, a first end of a first articulation arm 1620 is rotatably coupled to a lower portion of the main body 1605, proximate a rear end 1627 of the refuse vehicle 1600. A second end of the first articulation arm 1620 is rotatably coupled to a lower portion of the tailgate 1610. A first electric motor 1630 is rotatably coupled to the first end of the first articulation arm 1620, and is configured to selectively rotate the first articulation arm 1620 about a first rotation axis of the first electric motor 1630. A second electric motor 1635 is rotatably coupled to the second end of the first articulation arm 1620, and is configured to selectively rotate the first articulation arm 1620 about a second rotation axis of the second electric motor 1635.

Similarly, a first end of a second articulation arm 1625 is rotatably coupled to or proximate to an upper surface 1637 (shown in FIGS. 44 and 45) of the main body 1605, proximate the rear end 1627 of the refuse vehicle 1600. A second end of the second articulation arm 1625 is rotatably coupled to an upper end 1638 of the tailgate 1610. A third electric motor 1640 is rotatably coupled to the first end of the second articulation arm 1625, and is configured to selectively rotate the second articulation arm 1625 about a rotation axis of the third electric motor 1640. A fourth electric motor 1645 is rotatably coupled to the second end of the second articulation arm 1625, and is configured to selectively rotate the second articulation arm 1625 about a rotation axis of the fourth electric motor 1645. It should be appreciated that, although FIGS. 44-46 only show one first articulation arm 1620 and one second articulation arm 1625, an identical first articulation arm 1620 and second articulation arm 1625 are present on the opposite lateral side of the main body 1605, thereby providing a total of four articulation arms (i.e., the pair of first articulation arms 1620 and the pair of second articulations arms 1625).

As shown in FIGS. 44-46, the first electric motor 1630, the second electric motor 1635, the third electric motor 1640, and the fourth electric motor 1645 of the tailgate lift mechanism 1615 are collectively configured to selectively move the tailgate 1610 between the closed position (shown in FIG. 44), an intermediate position (shown in FIG. 45), and the opened position (shown in FIG. 46). As illustrated in FIG. 44, in the closed position, the tailgate 1610 is disposed adjacent to the rear end 1627 of the refuse vehicle 1600. As illustrated in FIG. 45, in the intermediate position, the tailgate 1610 is swung out away from the main body 1605, thereby providing clearance between the main body 1605 and the tailgate 1610, thus allowing for the tailgate 1610 to be moved between the closed position and the opened position without inadvertently contacting the main body 1605. As illustrated in FIG. 46, in the opened position, the tailgate 1610 is disposed adjacent to and is supported by the upper surface 1637 of the main body 1605.

It should be understood that, in any of the various refuse vehicles described above, any of the various actuators and/or motors may be electrical in nature instead of hydraulic. For example, in some instances, each of the various actuators may be an electrically driven ball screw actuator. In some instances, by including electrical components instead of hydraulic components, the various components of the refuse vehicles described herein may be able to more easily maintain sufficiently low temperature, thereby reducing the need for coolant onboard the various refuse vehicles.

Figure 47:
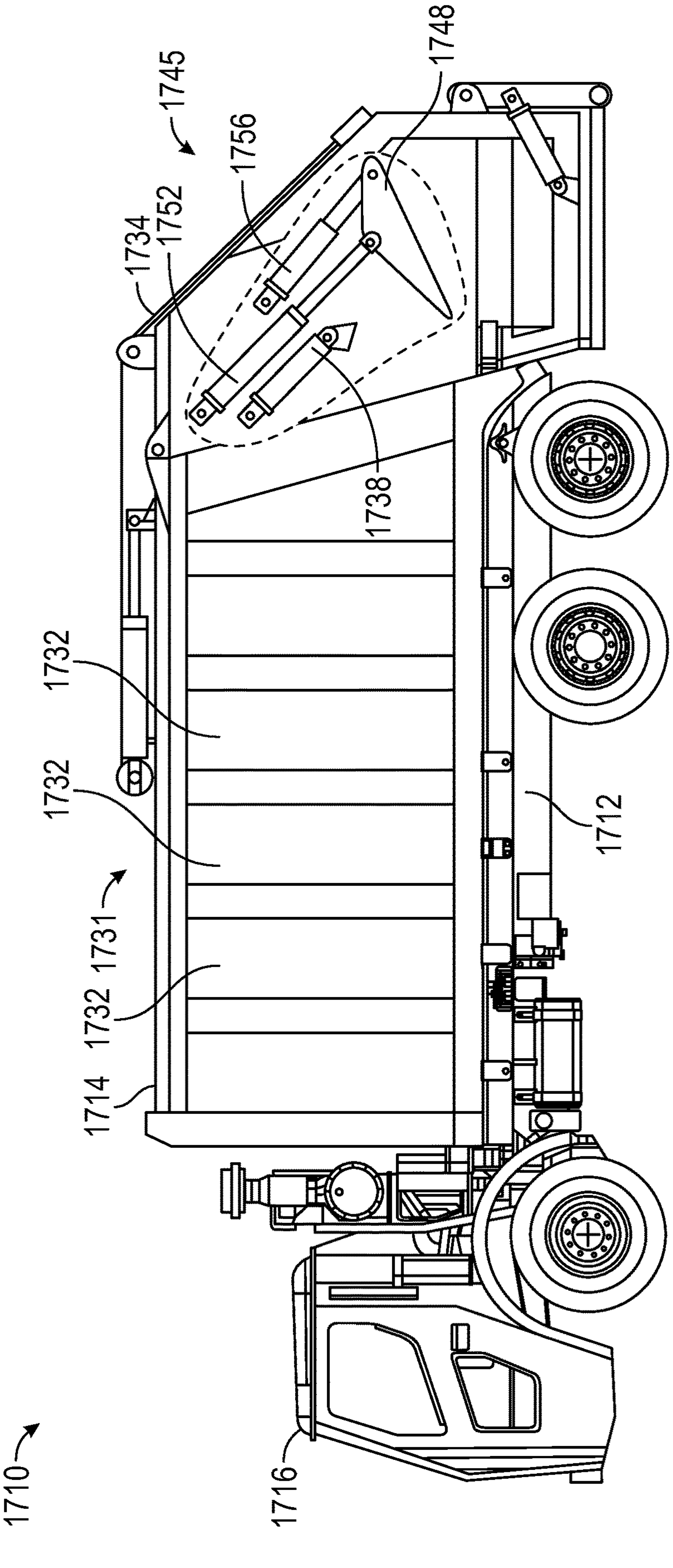
FIG. 47 is a side view of another refuse vehicle, according to an exemplary embodiment.

Referring now to FIG. 47, a vehicle, shown as refuse vehicle 1710, is configured as a rear-loading refuse vehicle. The rear-loading refuse vehicle 1710 includes a frame 1712, similar to the frame 12; a body assembly, shown as body 1714, coupled to the frame 1712; and a cab, shown as cab 1716. The refuse vehicle 1710 may also include an electric motor, similar to the electric motor 18, and a power source, similar to the battery system 20.

The body 1714 similarly includes a collection chamber (e.g., hopper, etc.), shown as a refuse compartment 1730, defined by panels 1732, and a tailgate 1734. The tailgate 1734 is rotatably movable between an opened position (similar to the opened position of the tailgate 1410 shown in FIG. 41) and a closed position (similar to the closed position of the tailgate 1410 shown in FIG. 40) using a tailgate lift actuator 1738.

Similar to the tailgate 234 discussed above, the tailgate 1734 includes tailgate compaction assembly, shown as a sweep compaction assembly 1745, including a sweep 1748 that is coupled to a carriage or slide (similar to the slide 246) and is moveable along a track (similar to the track 250) between an extended position and a retracted or packing position. The sweep 1748 is similarly configured to be moved along the track by a carriage actuator 1752.

The sweep 1748 is further similarly rotatably coupled to the carriage or slide, such that the sweep 1748 is rotatable between a closed position and an opened or receiving position using a compactor actuator, shown as linear compactor actuator 1756. Specifically, in the closed or packing position, the sweep 1748 is rotated clockwise (with respect to the illustrative embodiment provided in FIG. 47) to angle the sweep 1748 toward the refuse compartment 1730, such that the sweep 1748 is configured to selectively pack refuse into the refuse compartment 1730 by moving the sweep 1748 from the extended position into the retracted or packing position. In the opened or receiving position, the sweep 1748 is rotated counter-clockwise (with respect to the illustrative embodiment provided in FIG. 47) to angle the sweep 1748 out of the refuse compartment 1730 to provide clearance for inserting or removing refuse into the refuse compartment 1730.

Figure 48:
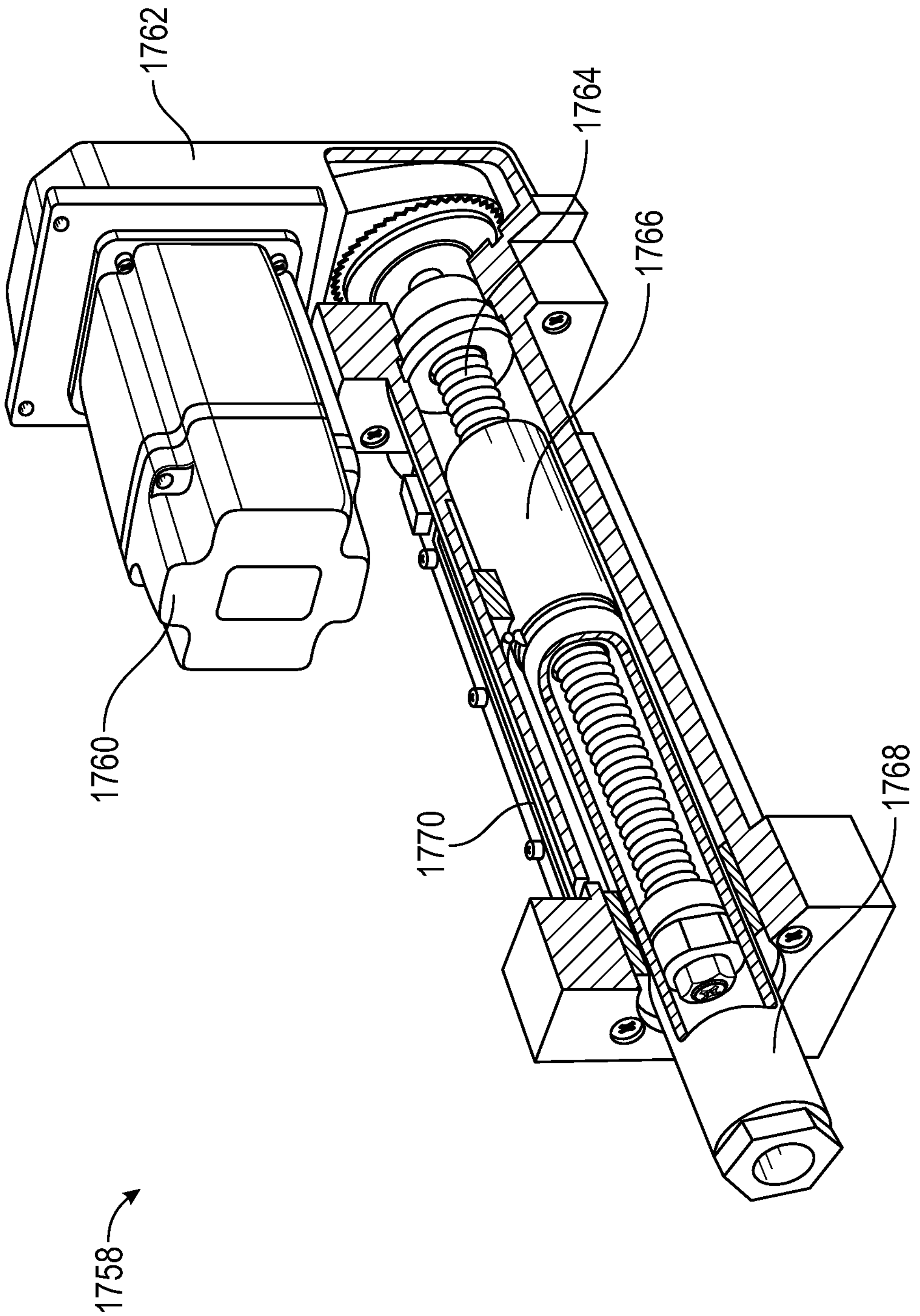
FIG. 48 is a perspective partial cross-sectional view of a ball-screw linear actuator, according to an exemplary embodiment.

Referring now to FIG. 48, a ball-screw linear actuator 1758 is shown, according to an exemplary embodiment. The ball-screw linear actuator 1758 may be incorporated within the refuse vehicle 1710, discussed above, and used in place of any of the various actuators of the refuse vehicle 1710 (e.g., the tailgate lift actuator 1738, the carriage actuator 1752, the linear compactor actuator 1756). The ball-screw linear actuator 1758 includes an electric motor 1760, a gearbox 1762, a central screw rod 1764, a ball-screw nut 1766, an inner rod 1768, and an outer cylinder 1770.

The electric motor 1760 is configured to selectively apply rotational actuation to the gearbox 1762. The gearbox 1762 is configured to transfer the rotational actuation from the electric motor 1760 to the central screw rod 1764. In some instances, the gearbox 1762 may be configured to apply a selective gear ratio between the input from the electric motor 1760 and the output to the central screw rod 1764 to provide an appropriate amount of force and/or actuation speed of the ball-screw linear actuator 1758, as desired for a given scenario.

The central screw rod 1764 is engaged with and is configured to selectively translate the ball-screw nut 1766 in an axial direction with respect to the central screw rod 1764. The ball-screw nut 1766 is disposed and configured to slide axially within the outer cylinder 1770. The ball-screw nut 1766 is also rigidly coupled to the inner rod 1768. The ball-screw nut 1766 is further configured to translate the rotational motion of the central screw rod 1764 into translational motion on the inner rod 1768 to selectively actuate the inner rod 1768 in an axial direction, with respect to the central screw rod 1764, between an extended position and a retracted position. Accordingly, the electric motor 1760 may be used to selectively actuate the inner rod 1768 between the extended and retracted positions.

As such, as alluded to above, the ball-screw linear actuator 1758 may be used in place of any of the various actuators of the refuse vehicle 1710 (e.g., the tailgate lift actuator 1738, the carriage actuator 1752, the linear compactor actuator 1756), or any other linear actuators described herein, to provide selective actuation to the various components of the refuse vehicle 1710 (e.g., the tailgate 1734, the sweep 1748), or any of the other refuse vehicles described herein.

Figure 49:
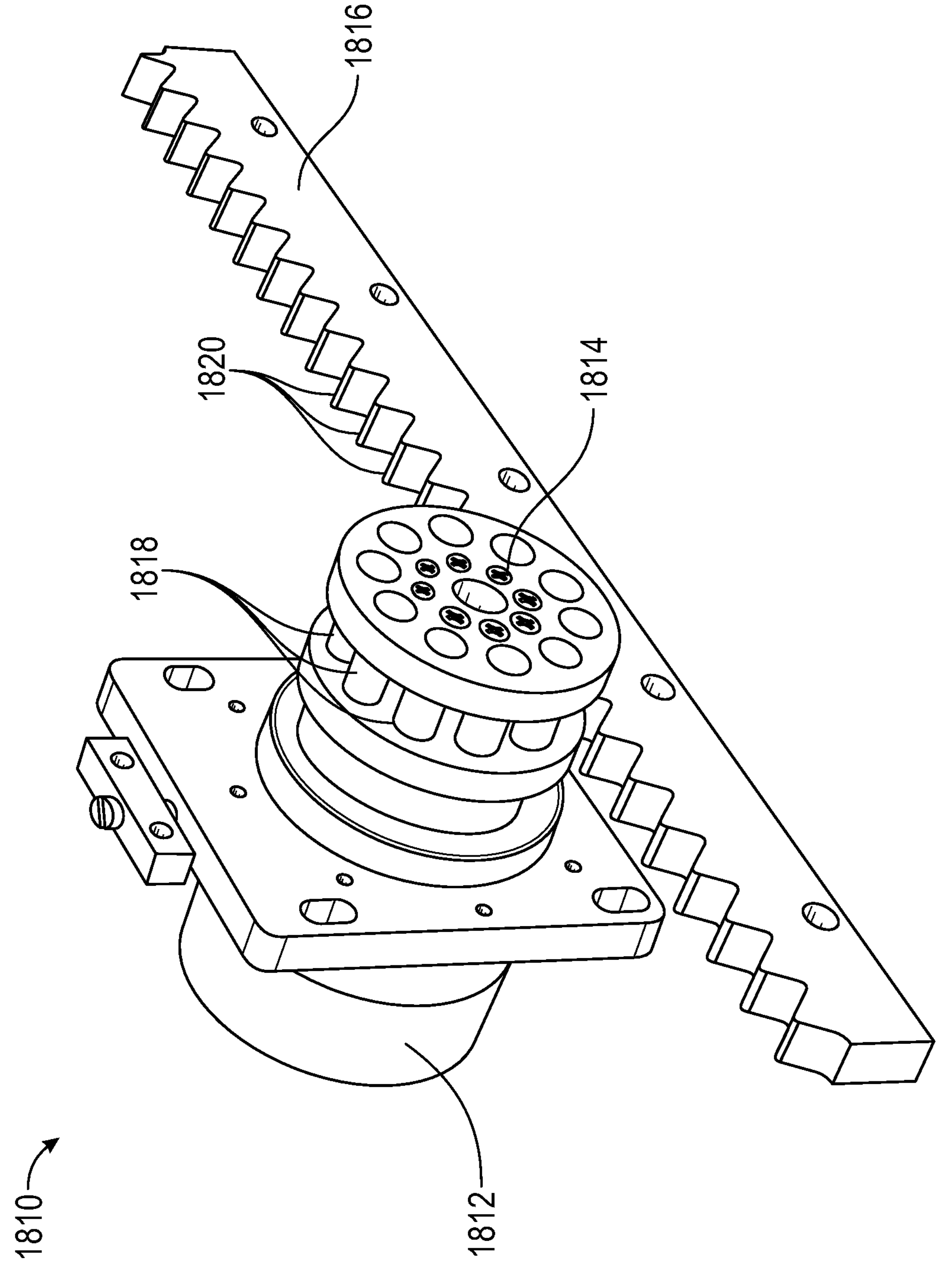
FIG. 49 is a perspective view of a rack and pinion actuator, according to an exemplary embodiment.

Referring now to FIG. 49, a rack and pinion actuator 1810 is shown, according to an exemplary embodiment. The rack and pinion actuator 1810 may be incorporated within the refuse vehicle 1710, discussed above, and used in place of any of the various actuators of the refuse vehicle 1710 (e.g., the tailgate lift actuator 1738, the carriage actuator 1752, the linear compactor actuator 1756). The rack and pinion actuator 1810 includes an electric motor 1812, a pinion drive gear 1814, and a rack 1816.

The electric motor 1812 is configured to selectively apply rotational actuation to the pinion drive gear 1814. The pinion drive gear 1814 includes a plurality of pinion gear teeth 1818 configured to mesh with and engage rack gear teeth 1820 of the rack 1816, such that rotation of the pinion drive gear 1814 results in translational motion of the rack 186. Accordingly, the electric motor 1812 may be used to selectively move the rack 1816 in either of a first translational direction or a second translational direction, opposite the first translational direction.

Figure 50:
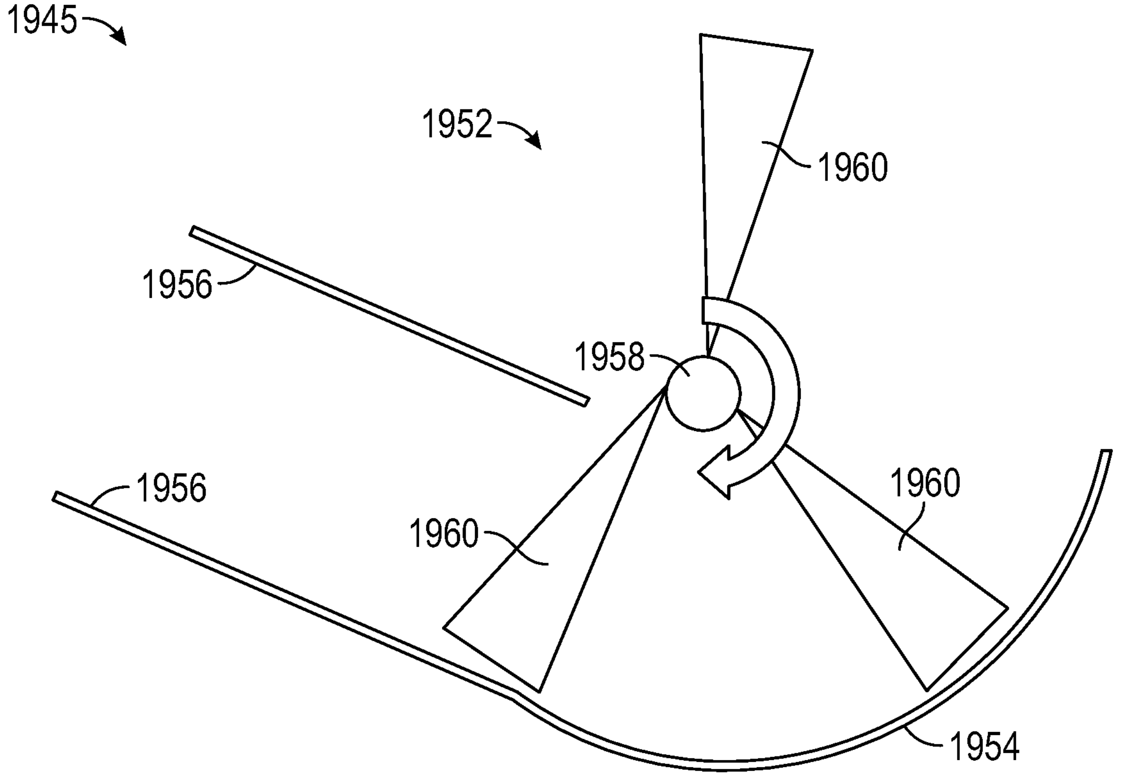
FIG. 50 is a schematic view of a rotary flail compaction assembly, according to an exemplary embodiment.

Referring now to FIG. 50, another tailgate compaction assembly, shown as a rotary flail compaction assembly 1945, is shown, according to an exemplary embodiment. The rotary flail compaction assembly 1945 may be incorporated into the refuse vehicle 1710, for example, in place of the sweep compaction assembly 1745. The rotary flail compaction assembly 1945 includes a rotary flail compactor 1952 disposed within a refuse receiving portion 1954 of a refuse chute 1956. The rotary flail compactor 1952 includes a central drive shaft 1958 and a plurality of compaction arms or paddles 1960. The central drive shaft 1958 is configured to rotate about a central axis of the central drive shaft 1958. For example, the central drive shaft 1958 may be driven, for example, by an electric motor (e.g., the electric motor 18 or any other suitable electric motor), either directly or via a gearbox configured to provide an appropriate gear ratio between the electric motor and the central drive shaft 1958. The plurality of compaction arms or paddles 1960 are each hingedly coupled to the central drive shaft 1958 at spaced-apart locations about a circumference of the central drive shaft 1958. Accordingly, the plurality of compaction arms or paddles 1960 are configured to be selectively rotated about the central drive shaft 1958.

Accordingly, during operation of the rotary flail compaction assembly 1945, refuse placed or inserted into the refuse receiving portion 1954 may be effectively pushed or compacted into or through the refuse chute 1956 into a refuse compartment (e.g., the refuse compartment 1730) by selectively rotating compaction arms or paddles 1960 using the electric motor.

Figure 51:
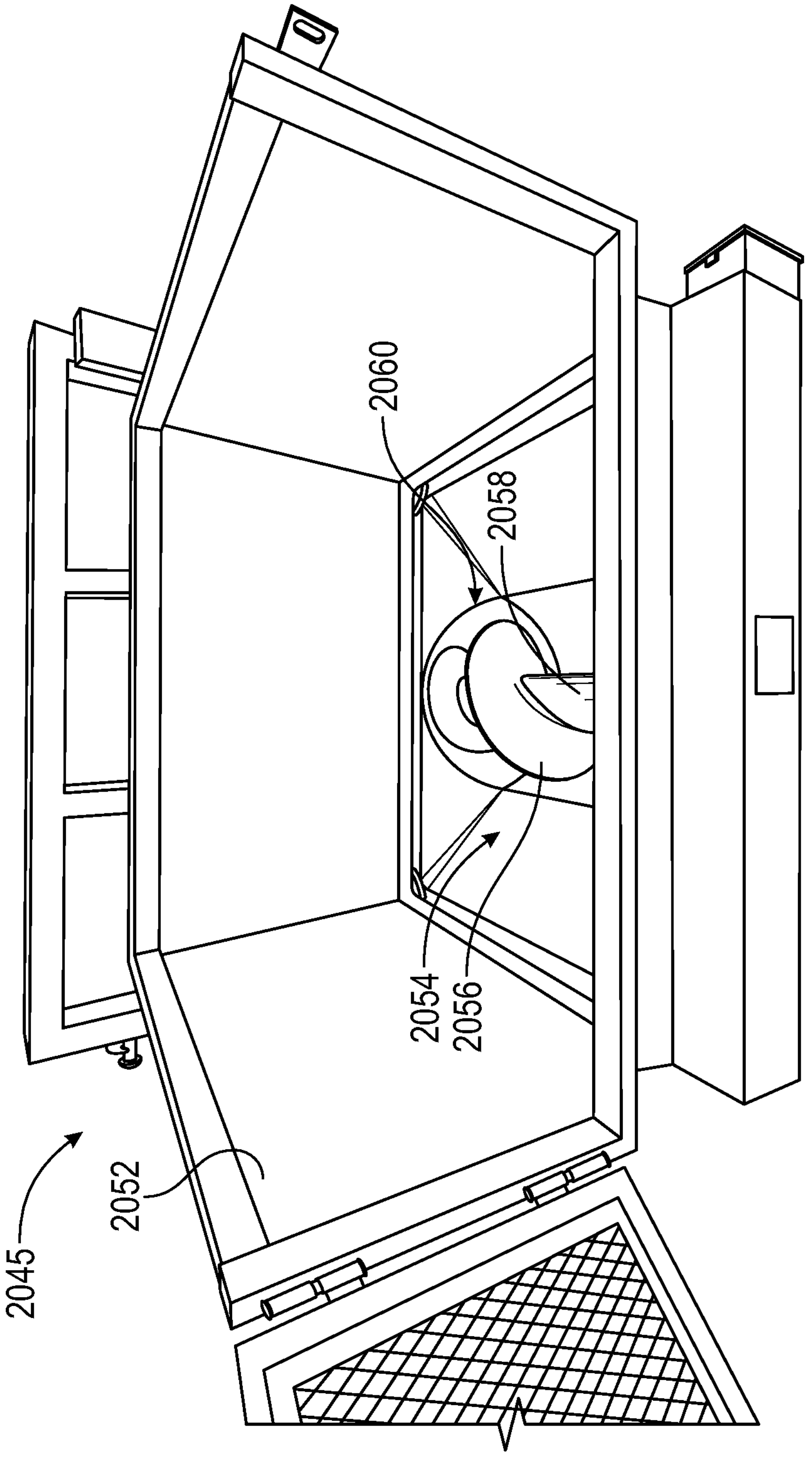
FIG. 51 is a perspective view of a single-auger compaction assembly, according to an exemplary embodiment.

Referring now to FIG. 51, another tailgate compaction assembly, shown as a single-auger compaction assembly 2045, is shown, according to an exemplary embodiment. The single-auger compaction assembly 2045 may be incorporated into the refuse vehicle 1710, for example, in place of the sweep compaction assembly 1745. The single-auger compaction assembly 2045 includes a refuse receiving hopper 2052 having an auger screw compactor 2054 disposed proximate the bottom of the refuse receiving hopper 2052. The auger screw compactor 2054 includes an auger screw compacting thread 2056 rotatably fixed to a central drive shaft 2058. The auger screw compactor 2054 is further configured to be selectively rotated about a central axis of the central drive shaft 2058, for example, by an electric motor (e.g., the electric motor 18 or any other suitable electric motor), either directly or via a gearbox configured to provide an appropriate gear ratio between the electric motor and the auger screw compactor 2054. The auger screw compacting thread 2056 of the auger screw compactor 2054 is further configured, when rotated by the electric motor, to pack refuse material contained within the refuse receiving hopper 2052 into a refuse compartment (e.g., the refuse compartment 1730) via an opening 2060 proximate the bottom of the refuse receiving hopper 2052.

Accordingly, during operation of the single-auger compaction assembly 2045, refuse placed or inserted into the refuse receiving hopper 2052 may be effectively pushed or compacted into or through the opening 2060 into a refuse compartment (e.g., the refuse compartment 1730) by selectively rotating the auger screw compactor 2054 using the electric motor.

Figure 52:
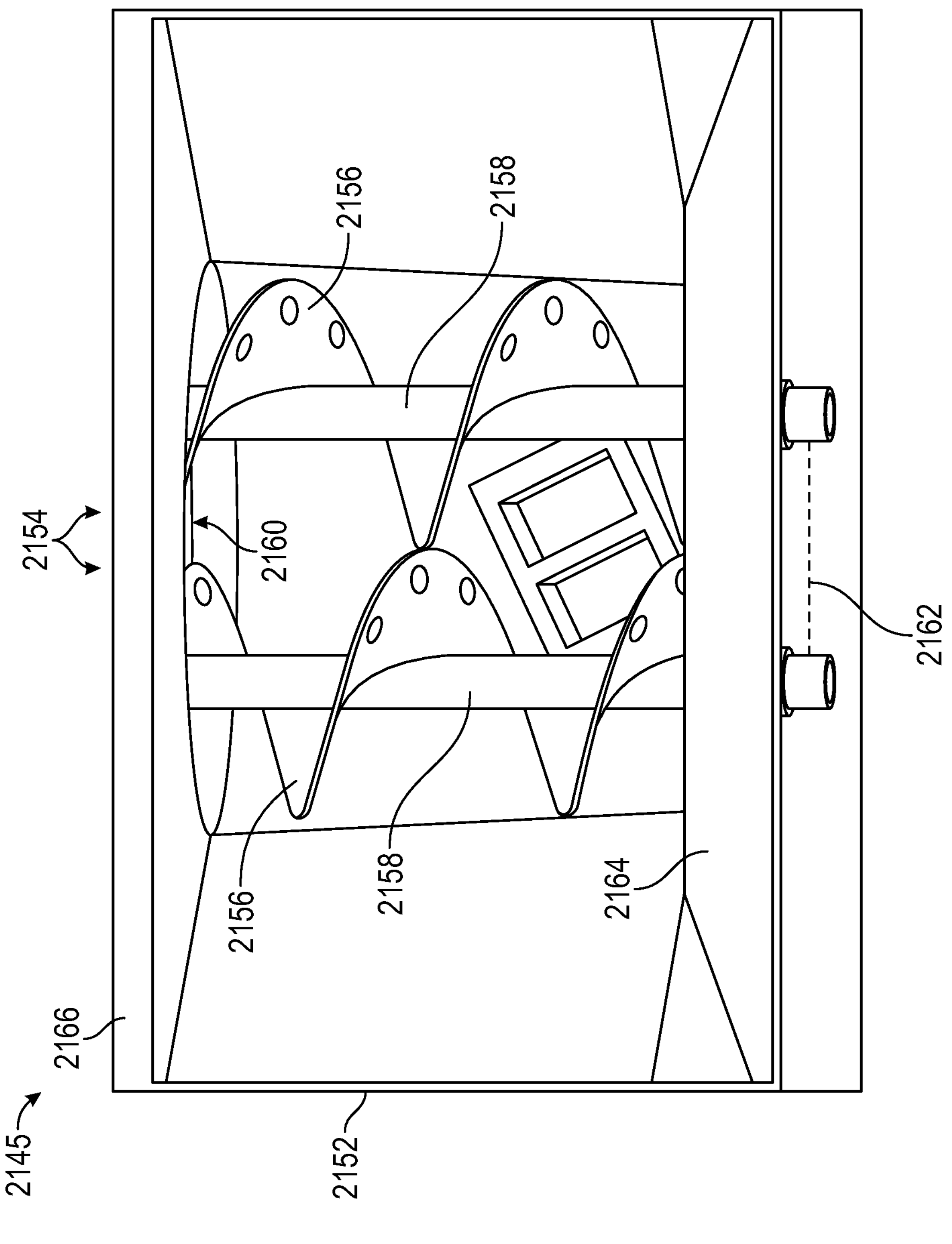
FIG. 52 is a top plan view of a dual-auger compaction assembly, according to an exemplary embodiment.

Referring now to FIG. 52, another tailgate compaction assembly, shown as a dual-auger compaction assembly 2145, is shown, according to an exemplary embodiment. The dual-auger compaction assembly 2145 may be incorporated into the refuse vehicle 1710, for example, in place of the sweep compaction assembly 1745. The dual-auger compaction assembly 2145 includes a refuse receiving hopper 2152 having a pair of auger screw compactors 2154 disposed proximate the bottom of the refuse receiving hopper 2152. The auger screw compactors 2154 may be substantially similar to the auger screw compactor 2054, discussed above. For example, each of the auger screw compactors 2154 includes a corresponding auger screw compacting thread 2156 rotatably fixed to a central drive shaft 2158.

Each auger screw compactor 2154 is further configured to be selectively rotated about a central axis of the corresponding central drive shaft 2158, for example, by an electric motor (e.g., the electric motor 18 or any other suitable electric motor), either directly or via a gearbox configured to provide an appropriate gear ratio between the electric motor and the auger screw compactor 2154. In some instances, each of the auger screw compactors 2154 are configured to be driven by the same electric motor. In some other instances, the auger screw compactors 2154 are configured to be driven by two separate electric motors, as desired for a given application. The auger screw compacting threads 2156 of the auger screw compactors 2154 are further configured, when rotated by the electric motor(s), to pack refuse material contained within the refuse receiving hopper 2152 into a refuse compartment (e.g., the refuse compartment 1730) via an opening 2160 proximate the bottom of the refuse receiving hopper 2152.

In some instances, the pair of auger screw compactors 2154 may be biased toward each other by a biasing mechanism, shown in FIG. 52 as a linear spring 2162. For example, each of the auger screw compactors 2154 may be configured to rotate within a pair of corresponding auger screw bearings. Each auger screw bearing may be configured to slide within a corresponding track configured to allow for the auger screw compactor 2154 to translate toward or away from the other auger screw compactor 2154. For example, the tracks may each extend along an axis parallel with a rear wall 2164 or a front wall 2166 of the receiving hopper 2052 and extending from the central drive shaft 2158 of one of the auger screw compactors 2154 toward the central drive shaft 2158 of the other auger screw compactor 2154. The tracks may be adequately spaced-apart from each other, such that, at their innermost possible positioning, the pair of auger screw compactors 2154 have little or no clearance between outermost edges of the corresponding auger screw compacting threads 2156. The biasing of the auger screw compactors 2154 may improve the capability of the dual-auger compaction assembly 2145 for handling large objects. Furthermore, the biasing of the auger screw compactors 2154 may prevent an unnecessarily large gap between the auger screw compactors 2154, which would otherwise result in additional required cleanouts of the refuse receiving hopper 2152.

Accordingly, during operation of the dual-auger compaction assembly 2145, refuse placed or inserted into the refuse receiving hopper 2152 may be effectively pushed or compacted into or through the opening 2160 into a refuse compartment (e.g., the refuse compartment 1730) by selectively rotating the auger screw compactor 2154 using the electric motor.

Figure 53:
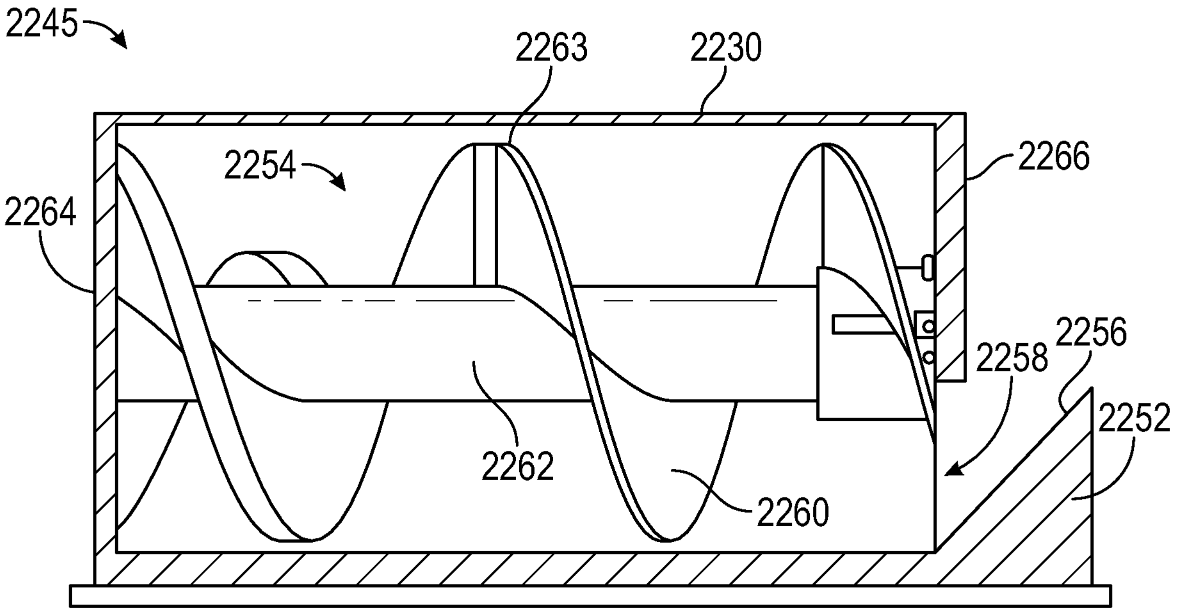
FIG. 53 is a schematic cross-sectional view of a refuse compartment auger compaction assembly, according to an exemplary embodiment.

Referring now to FIG. 53, another tailgate compaction assembly, shown as a refuse compartment auger compaction assembly 2245, is shown, according to an exemplary embodiment. The refuse compartment auger compaction assembly 2245 may be incorporated into the refuse vehicle 1710, for example, in place of the sweep compaction assembly 1745 and the refuse compartment 1730. The refuse compartment auger compaction assembly 2245 includes a refuse receiving hopper 2252 and a refuse compartment auger compactor 2254. The refuse receiving hopper 2252 has a sloped bottom surface 2256 configured to feed refuse placed in or otherwise loaded into the refuse receiving hopper 2252, through an opening 2258 in the refuse receiving hopper 2252, into a refuse compartment 2230.

The refuse compartment auger compactor 2254 is disposed within the refuse compartment 2230 and similarly includes an auger screw compacting thread 2260 rotatably fixed to a central drive shaft 2262. In some instances, the auger screw compacting thread 2260 has an outer edge 2263 that is configured to extend to or proximate an inner wall of the refuse compartment 2230. Said differently, in some instances, the refuse compartment auger compactor 2254 is configured to have an effective diameter (e.g., of a cylindrical shape defined by the outer edge 2263 of the auger screw compacting thread 2260) that corresponds to (is at least 75% of) a height and/or width of refuse compartment 2230.

The refuse compartment auger compactor 2254 is further configured to be selectively rotated about a central axis of the central drive shaft 2262, for example, by an electric motor (e.g., the electric motor 18 or any other suitable electric motor), either directly or via a gearbox configured to provide an appropriate gear ratio between the electric motor and the refuse compartment auger compactor 2254. The auger screw compacting thread 2260 of the refuse compartment auger compactor 2254 are configured, when rotated in a first direction by the electric motor, to pack refuse material contained within the refuse compartment 2230 toward a front end 2264 of the refuse compartment 2230. Similarly, in some instances, the auger screw compacting thread 2260 are further configured, when rotated in a second direction, opposite the first direction, by the electric motor, to selectively eject refuse material contained within the refuse compartment 2230 out of a rear end 2266 of the refuse compartment 2230 (e.g., when a tailgate of the refuse vehicle is opened).

Accordingly, during operation of the refuse compartment auger compaction assembly 2245, refuse may be placed or otherwise loaded into the refuse receiving hopper 2252. From the receiving hopper 2252, the refuse material may then be fed into the refuse compartment 2230 by the sloped bottom surface 2256 (e.g., via gravity). The refuse material may then be effectively pushed or compacted toward the front end 2264 of the refuse compartment 2230 by selectively rotating the refuse compartment auger compactor 2254 in the first direction using the electric motor. The refuse material may then be selectively ejected from the refuse compartment 2230 by selectively rotating the refuse compartment auger compactor 2254 in the second direction.

Figure 54:
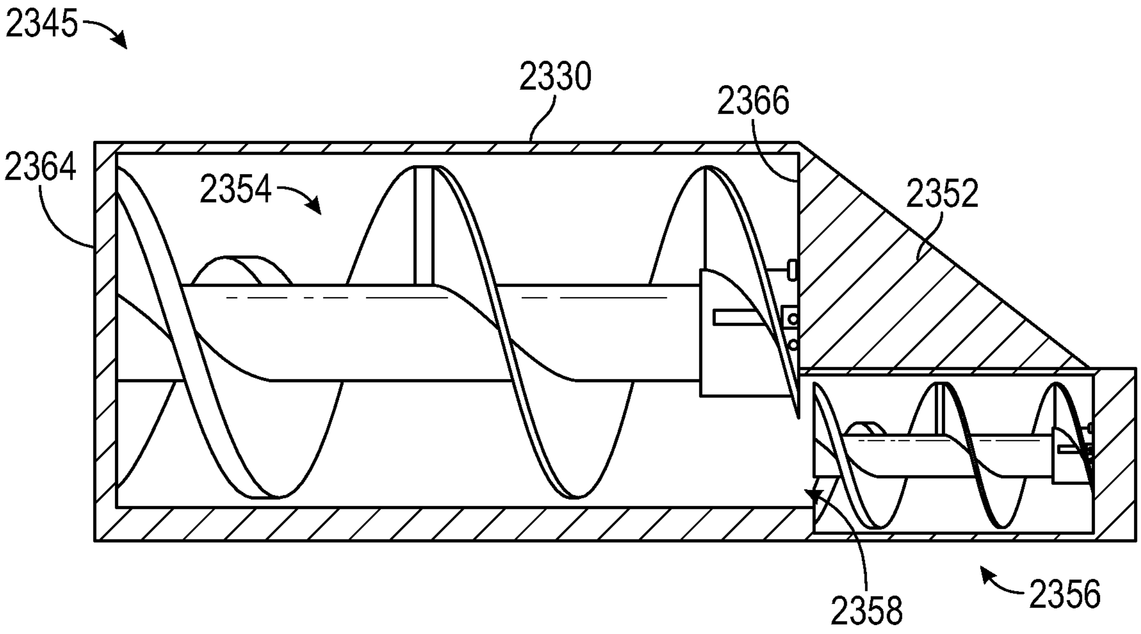
FIG. 54 is a schematic cross-sectional view of an offset dual-auger compaction assembly, according to an exemplary embodiment.

Referring now to FIG. 54, another tailgate compaction assembly, shown as an offset dual-auger compaction assembly 2345, is shown, according to an exemplary embodiment. The offset dual-auger compaction assembly 2345 may be incorporated into the refuse vehicle 1710, for example, in place of the sweep compaction assembly 1745 and the refuse compartment 1730. The offset dual-auger compaction assembly 2345 includes a refuse receiving hopper 2352 and a refuse compartment auger compactor 2354. The refuse receiving hopper 2352 has a tailgate auger screw compactor 2356 disposed therein. The tailgate auger screw compactor 2356 is substantially similar to auger screw compactor 2054, described above. Accordingly, the tailgate auger screw compactor 2356 is configured to feed refuse placed in or otherwise loaded into the refuse receiving hopper 2352, through an opening 2358 in the refuse receiving hopper 2352, into a refuse compartment 2330.

The refuse compartment auger compactor 2354 is substantially similar to the refuse compartment auger compactor 2254, described above. Accordingly, the refuse compartment auger compactor 2354 is configured, when rotated in a first direction by an electric motor, to pack refuse material contained within the refuse compartment 2330 toward a front end 2364 of the refuse compartment 2330. Similarly, in some instances, the refuse compartment auger compactor 2354 is further configured, when rotated in a second direction, opposite the first direction, by the electric motor, to selectively eject refuse material contained within the refuse compartment 2330 out of a rear end 2366 of the refuse compartment 2330 (e.g., when a tailgate of the refuse vehicle is opened).

It will be understood that each of the refuse compartment auger compactor 2354 and the tailgate auger screw compactor 2356 may be driven using an electric motor (e.g., similar to the electric motor 18) either directly or indirectly (e.g., via a gearbox).

Accordingly, during operation of the offset dual-auger compaction assembly 2345, refuse may be placed or otherwise loaded into the refuse receiving hopper 2352. From the receiving hopper 2352, the refuse material may then be fed into the refuse compartment 2330 by the tailgate auger screw compactor 2356. The refuse material may then be effectively pushed or compacted toward the front end 2364 of the refuse compartment 2330 by selectively rotating the refuse compartment auger compactor 2354 in the first direction using the electric motor. The refuse material may then be selectively ejected from the refuse compartment 2330 by selectively rotating the refuse compartment auger compactor 2354 in the second direction.

Figure 55:
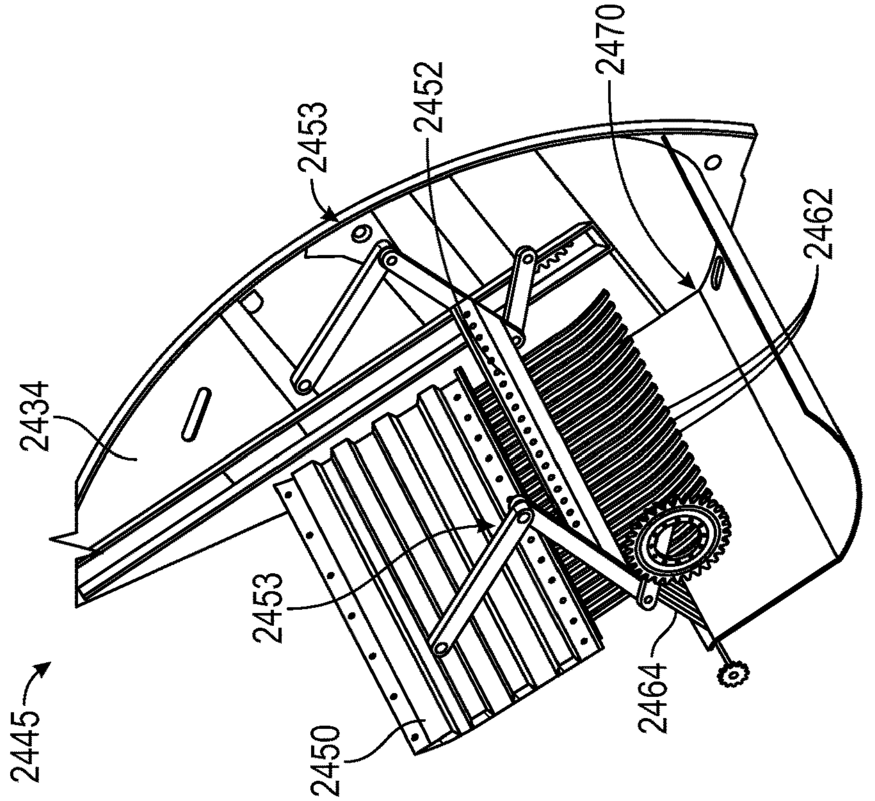
FIG. 55 is a perspective cross-sectional view of a thresher assembly, according to an exemplary embodiment.
Figure 56:
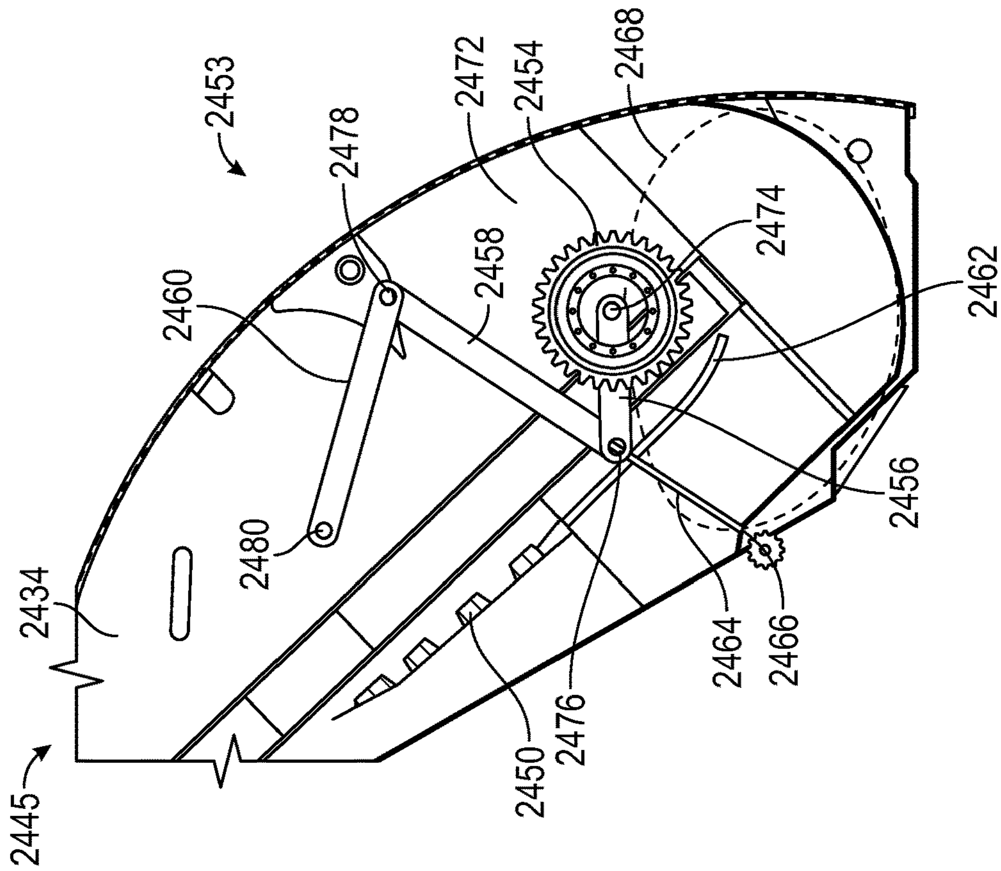
FIG. 56 is a cross-sectional view of the thresher assembly of FIG. 55, according to an exemplary embodiment.

Referring now to FIGS. 55 and 56, another tailgate compaction assembly, shown as a thresher assembly 2445, is shown, according to an exemplary embodiment. The thresher assembly 2445 is disposed within a tailgate 2434, which may be incorporated into any of the refuse vehicles described herein. The thresher assembly 2445 includes a stationary compaction thresher 2450, a rotary compaction thresher 2452, and a pair of sprocket-driven linkage assemblies 2453. Each sprocket-driven linkage assembly 2453 includes a sprocket drive gear 2454, a first thresher linkage 2456, a second thresher linkage 2458, and a third thresher linkage 2460. The stationary compaction thresher 2450 is rigidly fixed relative to the tailgate 2434. The stationary compaction thresher 2450 further includes a plurality of stationary tines 2462.

The rotary compaction thresher 2452 includes a plurality of rotary tines 2464 configured to moveably mesh with the plurality of stationary tines 2462. As will be described below, the rotary compaction thresher 2452 is configured to be articulated in a cyclical manner, via the sprocket drive gear 2454 and the various linkages 2456, 2458, 2460, such that a plurality of tine ends 2466 of the plurality of rotary tines 2464 move clockwise along a tine end path 2468 (shown as a dashed line in FIG. 56). With the rotary compaction thresher 2452 moving in this manner, the plurality of rotary tines 2464 are configured to engage, break up (via the moveable meshing with the plurality of stationary tines 2462), and pack refuse material received in a refuse receiving portion 2470 of the tailgate 2434 into a refuse compartment, such as the refuse compartment 1730 or any other refuse compartment described herein.

The sprocket drive gear 2454 is rotatably coupled to a side wall 2472 at a first joint 2474. The sprocket drive gear 2454 is rotatably fixed with respect to the first thresher linkage 2456, such that rotation of the sprocket drive gear 2454 results in rotation of the first thresher linkage 2456 about the first joint 2474. The first thresher linkage 2456 is rotatably coupled to the second thresher linkage 2458 at a second joint 2476. The second thresher linkage 2458 is rigidly coupled to the rotary compaction thresher 2452, such that movement of the second thresher linkage 2458 results in movement of the rotary compaction thresher 2452. The second thresher linkage 2458 is further rotatably coupled to the third thresher linkage 2460 at a third joint 2478. The third thresher linkage 2460 is rotatably coupled to the side wall 2472 at a fourth joint 2480.

The sprocket drive gear 2454 may be selectively driven by an electric motor (e.g., the electric motor 18 or any other suitable electric motor) to selectively articulate the rotary compaction thresher 2452. Specifically, as the sprocket drive gear 2454 is rotated clockwise (with respect to the exemplary illustration provided in FIG. 56), the rotary compaction thresher 2452 is articulated, via the various linkages 2456, 2458, 2460, such that the plurality of tine ends 2466 of the plurality of rotary tines 2464 move clockwise along the tine end path 2468.

Figure 58:
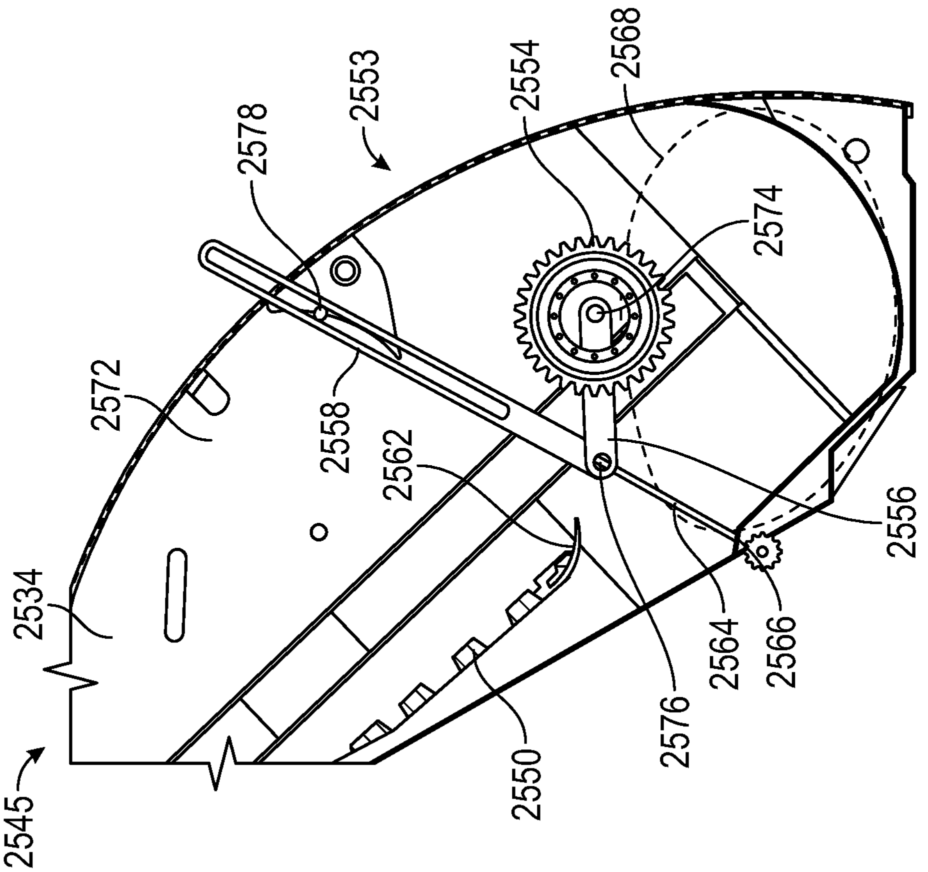
FIG. 58 is a cross-sectional view of the thresher assembly of FIG. 57, according to an exemplary embodiment.
Figure 57:
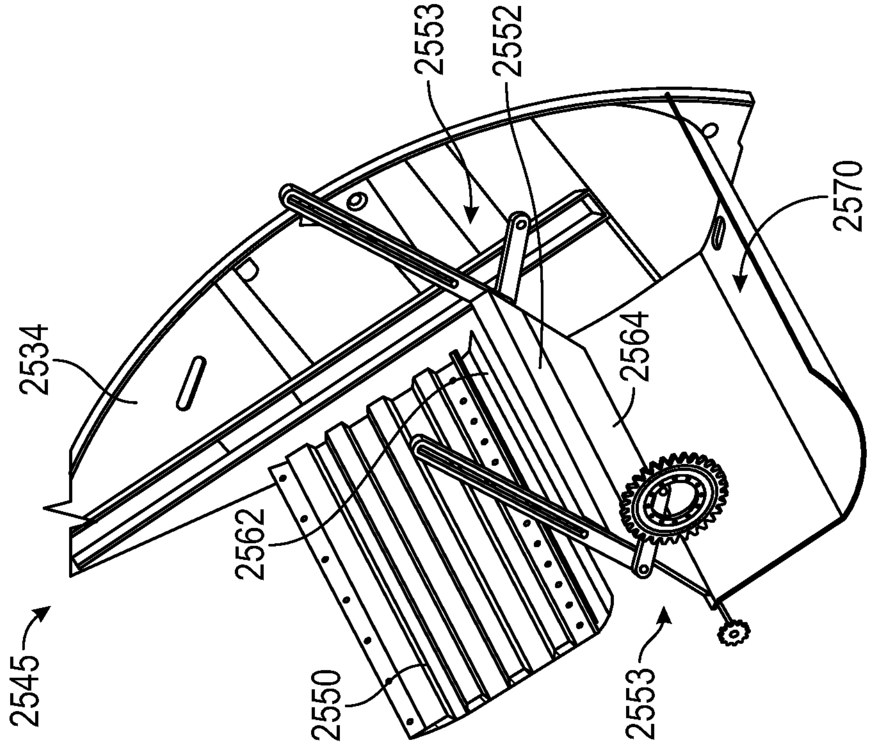
FIG. 57 is a perspective cross-sectional view of a thresher assembly, according to an exemplary embodiment.

Referring now to FIGS. 57 and 58, another tailgate compaction assembly, shown as a thresher assembly 2545, is shown, according to an exemplary embodiment. The thresher assembly 2545 is disposed within a tailgate 2534, which may be incorporated into any of the refuse vehicles described herein. The thresher assembly 2545 includes a stationary compaction thresher 2550, a rotary compaction thresher 2552, and a pair of sprocket-driven linkage assemblies 2553. Each sprocket-driven linkage assembly 2553 includes a sprocket drive gear 2554, a first thresher linkage 2556, and a slotted second thresher linkage 2558. The stationary compaction thresher 2550 is rigidly fixed relative to the tailgate 2534. The stationary compaction thresher 2550 further includes a flexible compaction lip 2562.

The rotary compaction thresher 2552 includes a rotary compaction sweep 2564 configured to engage the flexible compaction lip 2562 of the stationary compaction thresher 2550 during operation. As will be described below, the rotary compaction thresher 2552 is configured to be articulated in a cyclical manner, via the sprocket drive gear 2554 and the various linkages 2556, 2558, such that an outer sweep edge 2566 of the rotary compaction sweep 2564 moves clockwise along a sweep edge path 2568 (shown as a dashed line in FIG. 58). With the rotary compaction thresher 2552 moving in this manner, the rotary compaction sweep 2564 is configured to engage and pack refuse material received in a refuse receiving portion 2570 of the tailgate 2534 into a refuse compartment, such as the refuse compartment 1730 or any other refuse compartment described herein.

The sprocket drive gear 2554 is rotatably coupled to a side wall 2572 at a first joint 2574. The sprocket drive gear 2554 is rotatably fixed with respect to the first thresher linkage 2556, such that rotation of the sprocket drive gear 2554 results in rotation of the first thresher linkage 2556 about the first joint 2574. The first thresher linkage 2556 is rotatably coupled to the slotted second thresher linkage 2558 at a second joint 2576. The slotted second thresher linkage 2558 is rigidly coupled to the rotary compaction thresher 2552, such that movement of the slotted second thresher linkage 2558 results in movement of the rotary compaction thresher 2552. The slotted second thresher linkage 2558 is further slidably and rotatably coupled to the side wall 2572 at a third joint 2578 via a slotted connection.

The sprocket drive gear 2554 may similarly be selectively driven by an electric motor (e.g., the electric motor 18 or any other suitable electric motor) to selectively articulate the rotary compaction thresher 2552. Specifically, as the sprocket drive gear 2554 is rotated clockwise (with respect to the exemplary illustration provided in FIG. 58), the rotary compaction thresher 2552 is articulated, via the various linkages 2556, 2558, such that the outer sweep edge 2566 of the rotary compaction sweep 2564 moves clockwise along the sweep edge path 2568.

Figure 60:
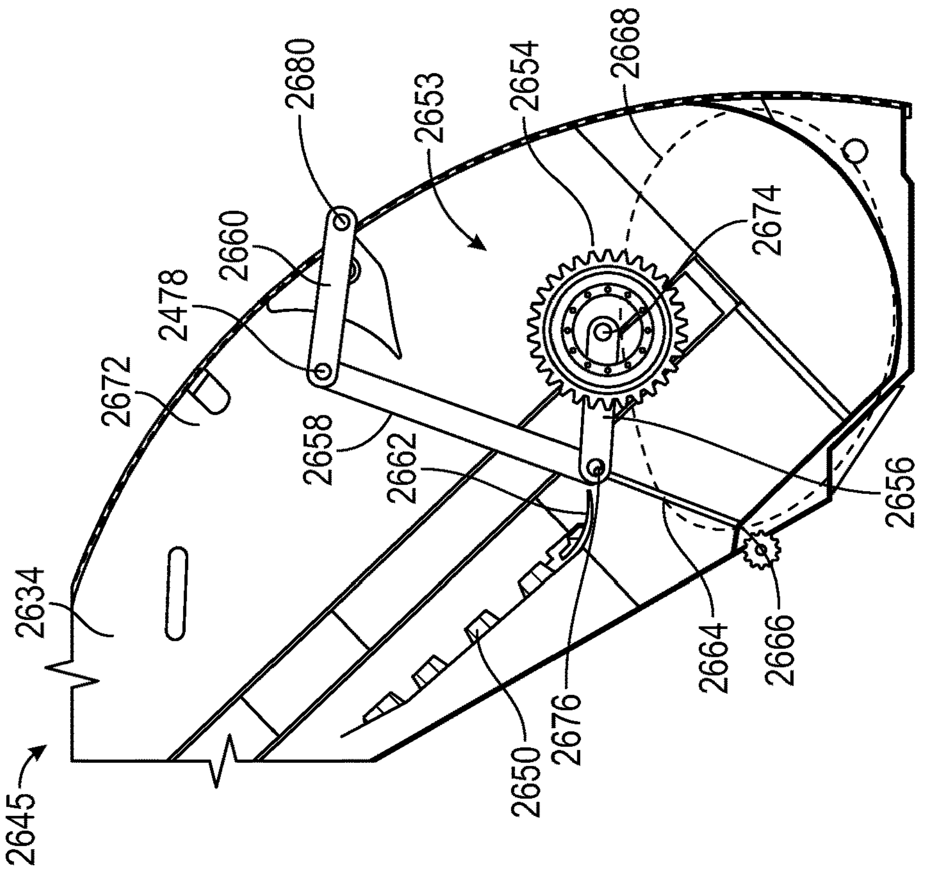
FIG. 60 is a cross-sectional view of the thresher assembly of FIG. 59, according to an exemplary embodiment.
Figure 59:
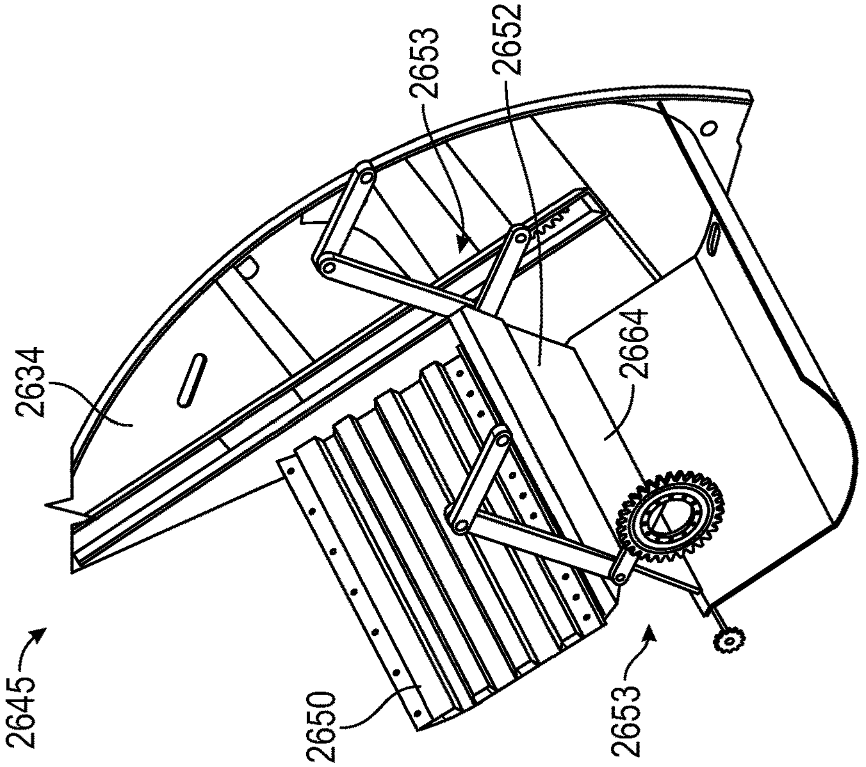
FIG. 59 is a perspective cross-sectional view of a thresher assembly, according to an exemplary embodiment.

Referring now to FIGS. 59 and 60, another tailgate compaction assembly, shown as a thresher assembly 2645, is shown, according to an exemplary embodiment. The thresher assembly 2645 is disposed within a tailgate 2634, which may be incorporated into any of the refuse vehicles described herein. The thresher assembly 2645 includes a stationary compaction thresher 2650, a rotary compaction thresher 2652, and a pair of sprocket-driven linkage assemblies 2653. Each sprocket-driven linkage assembly 2653 includes a sprocket drive gear 2654, a first thresher linkage 2656, a second thresher linkage 2658, and a third thresher linkage 2660. The stationary compaction thresher 2650 is rigidly fixed relative to the tailgate 2634. The stationary compaction thresher 2650 further includes a flexible compaction lip 2662.

The rotary compaction thresher 2652 includes a rotary compaction sweep 2664 configured to engage the flexible compaction lip 2662 of the stationary compaction thresher 2650 during operation. As will be described below, the rotary compaction thresher 2652 is configured to be articulated in a cyclical manner, via the sprocket drive gear 2654 and the various linkages 2656, 2658, 2660, such that an outer sweep edge 2666 of the rotary compaction sweep 2664 moves clockwise along a sweep edge path 2668 (shown as a dashed line in FIG. 60). With the rotary compaction thresher 2652 moving in this manner, the rotary compaction sweep 2664 is configured to engage and pack refuse material received in a refuse receiving portion 2670 of the tailgate 2634 into a refuse compartment, such as the refuse compartment 1730 or any other refuse compartment described herein.

The sprocket drive gear 2654 is rotatably coupled to a side wall 2672 at a first joint 2674. The sprocket drive gear 2654 is rotatably fixed with respect to the first thresher linkage 2656, such that rotation of the sprocket drive gear 2654 results in rotation of the first thresher linkage 2656 about the first joint 2674. The first thresher linkage 2656 is rotatably coupled to the second thresher linkage 2658 at a second joint 2676. The second thresher linkage 2658 is rigidly coupled to the rotary compaction thresher 2652, such that movement of the second thresher linkage 2658 results in movement of the rotary compaction thresher 2652. The second thresher linkage 2658 is further rotatably coupled to the third thresher linkage 2660 at a third joint 2678. The third thresher linkage 2660 is rotatably coupled to the side wall 2672 at a fourth joint 2680.

The sprocket drive gear 2654 may similarly be selectively driven by an electric motor (e.g., the electric motor 18 or any other suitable electric motor) to selectively articulate the rotary compaction thresher 2652. Specifically, as the sprocket drive gear 2654 is rotated clockwise (with respect to the exemplary illustration provided in FIG. 60), the rotary compaction thresher 2652 is articulated, via the various linkages 2656, 2658, 2660, such that the outer sweep edge 2666 of the rotary compaction sweep 2664 moves clockwise along the sweep edge path 2668.

Figure 62:
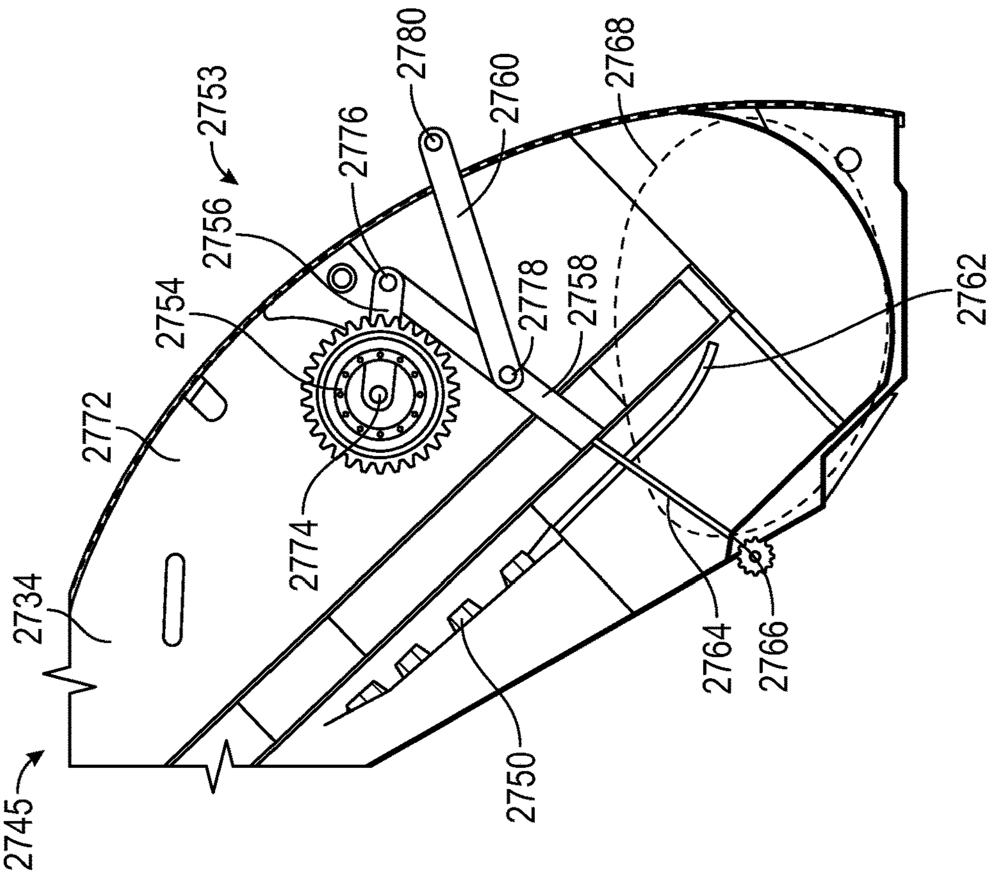
FIG. 62 is a cross-sectional view of the thresher assembly of FIG. 61, according to an exemplary embodiment.
Figure 61:
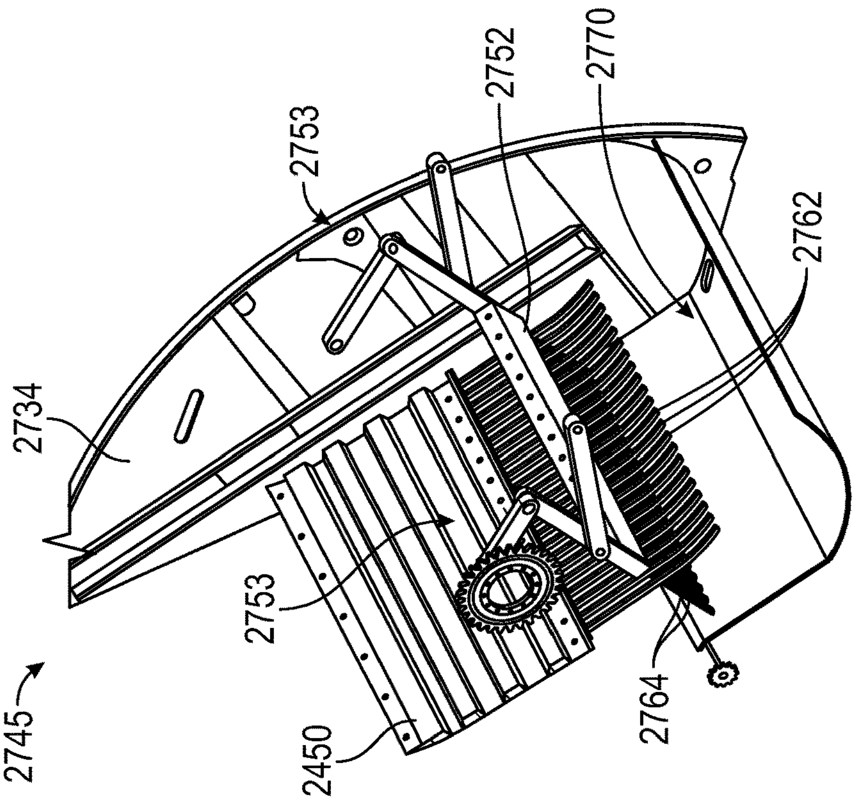
FIG. 61 is a perspective cross-sectional view of a thresher assembly, according to an exemplary embodiment.

Referring now to FIGS. 61 and 62, another tailgate compaction assembly, shown as a thresher assembly 2745, is shown, according to an exemplary embodiment. The thresher assembly 2745 is disposed within a tailgate 2734, which may be incorporated into any of the refuse vehicles described herein. The thresher assembly 2745 includes a stationary compaction thresher 2750, a rotary compaction thresher 2752, and a pair of sprocket-driven linkage assemblies 2753. Each sprocket-driven linkage assembly 2753 includes a sprocket drive gear 2754, a first thresher linkage 2756, a second thresher linkage 2758, and a third thresher linkage 2760. The stationary compaction thresher 2750 is rigidly fixed relative to the tailgate 2734. The stationary compaction thresher 2750 further includes a plurality of stationary tines 2762.

The rotary compaction thresher 2752 includes a plurality of rotary tines 2764 configured to moveably mesh with the plurality of stationary tines 2762. As will be described below, the rotary compaction thresher 2752 is configured to be articulated in a cyclical manner, via the sprocket drive gear 2754 and the various linkages 2756, 2758, 2760, such that a plurality of tine ends 2766 of the plurality of rotary tines 2764 move clockwise along a tine end path 2768 (shown as a dashed line in FIG. 62). With the rotary compaction thresher 2752 moving in this manner, the plurality of rotary tines 2764 are configured to engage, break up (via the moveable meshing with the plurality of stationary tines 2762), and pack refuse material received in a refuse receiving portion 2770 of the tailgate 2734 into a refuse compartment, such as the refuse compartment 1730 or any other refuse compartment described herein.

The sprocket drive gear 2754 is rotatably coupled to a side wall 2772 at a first joint 2774. The sprocket drive gear 2754 is rotatably fixed with respect to the first thresher linkage 2756, such that rotation of the sprocket drive gear 2754 results in rotation of the first thresher linkage 2756 about the first joint 2774. The first thresher linkage 2756 is rotatably coupled to the second thresher linkage 2758 at a second joint 2776. The second thresher linkage 2758 is rigidly coupled to the rotary compaction thresher 2752, such that movement of the second thresher linkage 2758 results in movement of the rotary compaction thresher 2752. The second thresher linkage 2758 is further rotatably coupled to the third thresher linkage 2760 at a third joint 2778. The third thresher linkage 2760 is rotatably coupled to the side wall 2772 at a fourth joint 2780.

The sprocket drive gear 2754 may be selectively driven by an electric motor (e.g., the electric motor 18 or any other suitable electric motor) to selectively articulate the rotary compaction thresher 2752. Specifically, as the sprocket drive gear 2754 is rotated counter-clockwise (with respect to the exemplary illustration provided in FIG. 62), the rotary compaction thresher 2752 is articulated, via the various linkages 2756, 2758, 2760, such that the plurality of tine ends 2766 of the plurality of rotary tines 2764 move clockwise along the tine end path 2768.

Figure 64:
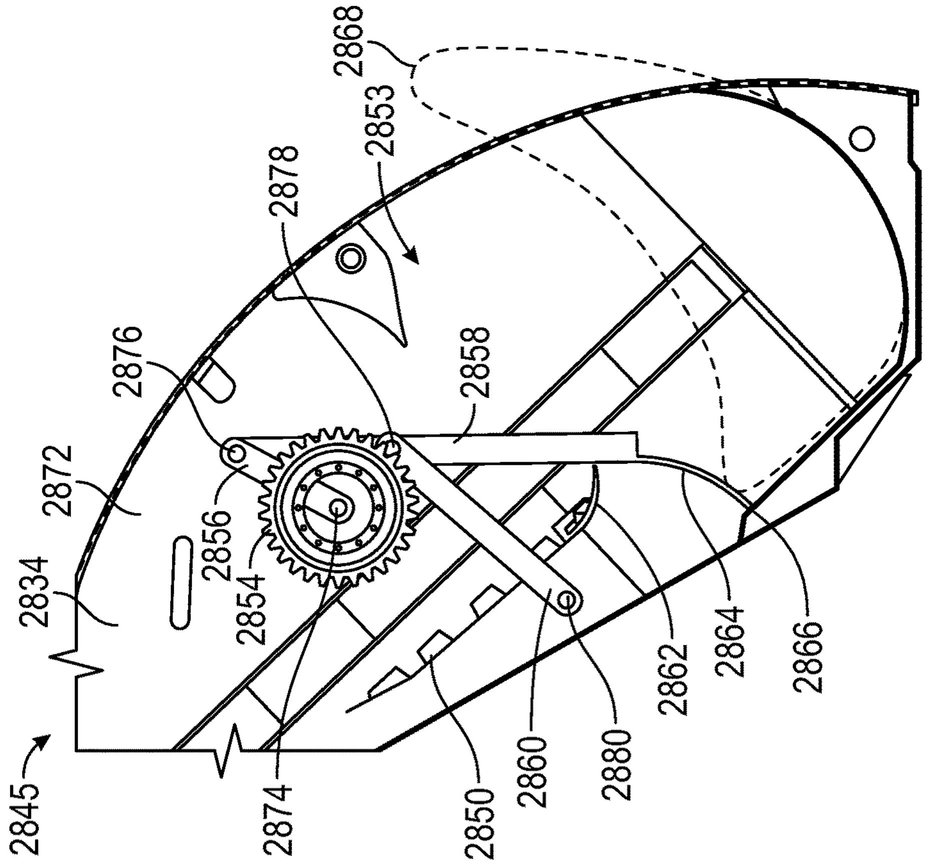
FIG. 64 is a cross-sectional view of the thresher assembly of FIG. 63, according to an exemplary embodiment.
Figure 63:
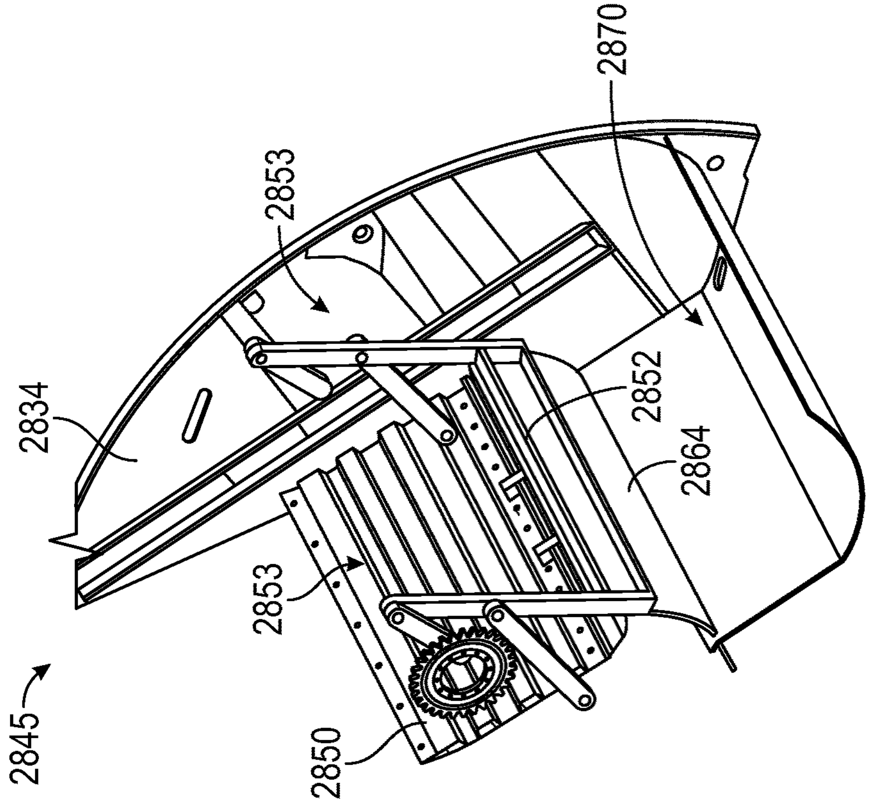
FIG. 63 is a perspective cross-sectional view of a thresher assembly, according to an exemplary embodiment.

Referring now to FIGS. 63 and 64, another tailgate compaction assembly, shown as a thresher assembly 2845, is shown, according to an exemplary embodiment. The thresher assembly 2845 is disposed within a tailgate 2834, which may be incorporated into any of the refuse vehicles described herein. The thresher assembly 2845 includes a stationary compaction thresher 2850, a rotary compaction thresher 2852, and a pair of sprocket-driven linkage assemblies 2853. Each sprocket-driven linkage assembly 2853 includes a sprocket drive gear 2854, a first thresher linkage 2856, a second thresher linkage 2858, and a third thresher linkage 2860. The stationary compaction thresher 2850 is rigidly fixed relative to the tailgate 2834. The stationary compaction thresher 2850 further includes a flexible compaction lip 2862.

The rotary compaction thresher 2852 includes a rotary compaction sweep 2864 configured to engage the flexible compaction lip 2862 of the stationary compaction thresher 2850 during operation. As will be described below, the rotary compaction thresher 2852 is configured to be articulated in a cyclical manner, via the sprocket drive gear 2854 and the various linkages 2856, 2858, 2860, such that an outer sweep edge 2866 of the rotary compaction sweep 2864 moves clockwise along a sweep edge path 2868 (shown as a dashed line in FIG. 64). With the rotary compaction thresher 2852 moving in this manner, the rotary compaction sweep 2864 is configured to engage and pack refuse material received in a refuse receiving portion 2870 of the tailgate 2834 into a refuse compartment, such as the refuse compartment 1730 or any other refuse compartment described herein.

The sprocket drive gear 2854 is rotatably coupled to a side wall 2872 at a first joint 2874. The sprocket drive gear 2854 is rotatably fixed with respect to the first thresher linkage 2856, such that rotation of the sprocket drive gear 2854 results in rotation of the first thresher linkage 2856 about the first joint 2874. The first thresher linkage 2856 is rotatably coupled to the second thresher linkage 2858 at a second joint 2876. The second thresher linkage 2858 is rigidly coupled to the rotary compaction thresher 2852, such that movement of the second thresher linkage 2858 results in movement of the rotary compaction thresher 2852. The second thresher linkage 2858 is further rotatably coupled to the third thresher linkage 2860 at a third joint 2878. The third thresher linkage 2860 is rotatably coupled to the side wall 2872 at a fourth joint 2880.

The sprocket drive gear 2854 may similarly be selectively driven by an electric motor (e.g., the electric motor 18 or any other suitable electric motor) to selectively articulate the rotary compaction thresher 2852. Specifically, as the sprocket drive gear 2854 is rotated counter-clockwise (with respect to the exemplary illustration provided in FIG. 64), the rotary compaction thresher 2852 is articulated, via the various linkages 2856, 2858, 2860, such that the outer sweep edge 2866 of the rotary compaction sweep 2864 moves clockwise along the sweep edge path 2668.

Figure 65:
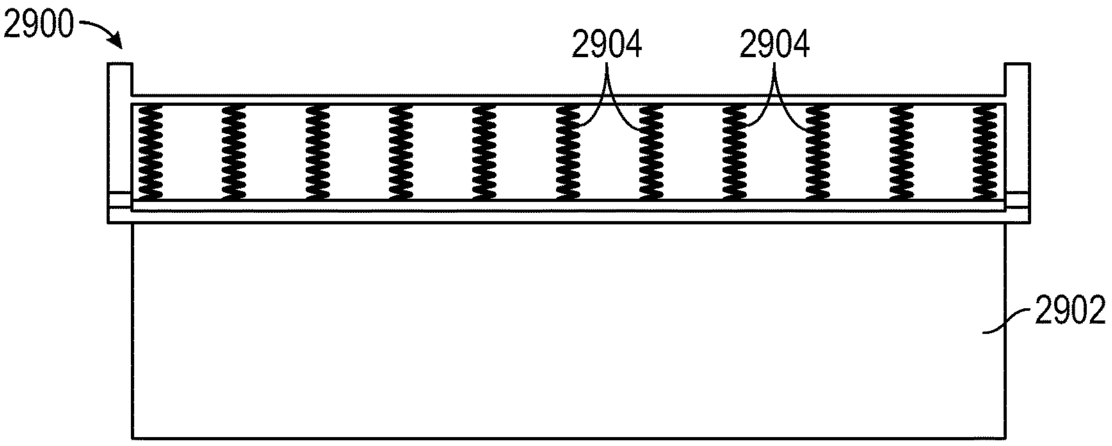
FIG. 65 is a top plan view of a spring-loaded compaction thresher, according to an exemplary embodiment.
Figure 66:
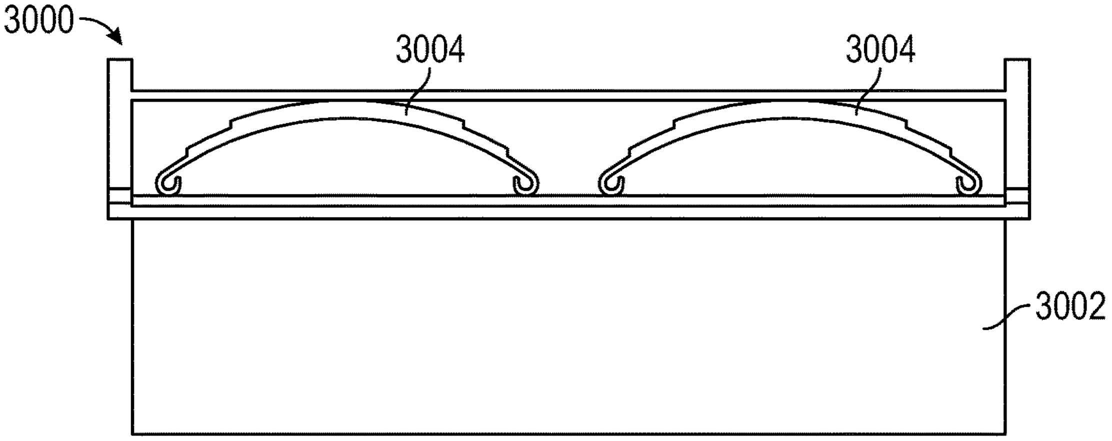
FIG. 66 is a top plan view of another spring-loaded compaction thresher, according to an exemplary embodiment.
Figure 67:
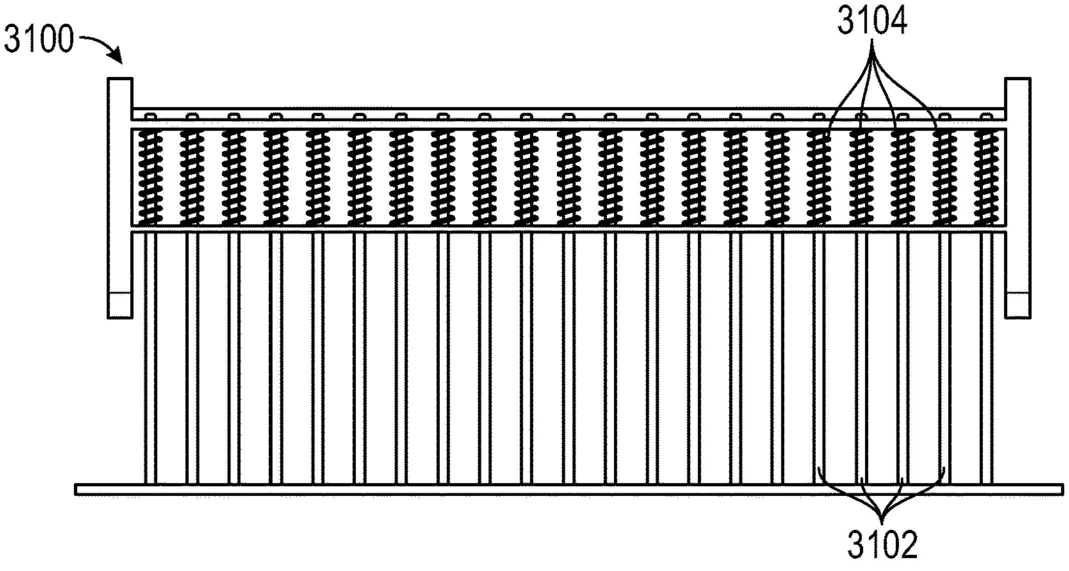
FIG. 67 is a top plan view of another spring-loaded compaction thresher, according to an exemplary embodiment.

Referring now to FIGS. 65-67, various spring-loaded compaction threshers are illustrated, according to various exemplary embodiments. For example, as shown in FIG. 65, a spring-loaded compaction thresher 2900 is shown, according to an exemplary embodiment. The spring-loaded compaction thresher 2900 may be implemented into any of the various tailgate compaction assemblies, discussed above, in place of any of the stationary or rotary compaction threshers. The spring-loaded compaction thresher 2900 includes a compaction sweep 2902 and a plurality of linear springs 2904. The plurality of linear springs 2904 are collectively configured to bias the compaction sweep 2902 in a direction of compaction during operation.

Referring now to FIG. 66 a spring-loaded compaction thresher 3000 is shown, according to an exemplary embodiment. The spring-loaded compaction thresher 3000 may similarly be implemented into any of the various tailgate compaction assemblies, discussed above, in place of any of the stationary or rotary compaction threshers. The spring-loaded compaction thresher 3000 includes a compaction sweep 3002 and a plurality of leaf springs 3004. The plurality of leaf springs 3004 are similarly collectively configured to bias the compaction sweep 3002 in a direction of compaction during operation.

Referring now to FIG. 67 a spring-loaded compaction thresher 3100 is shown, according to an exemplary embodiment. The spring-loaded compaction thresher 3100 may similarly be implemented into any of the various tailgate compaction assemblies, discussed above, in place of any of the stationary or rotary compaction threshers. The spring-loaded compaction thresher 3100 includes a plurality of tines 3102 (e.g., rod-shaped tines, as shown in FIG. 67) and a plurality of corresponding tine springs 3104. The plurality of tine springs 3104 are similarly each configured to bias the corresponding tine 3102 in a direction of compaction during operation.

Accordingly, by incorporating spring-loaded compaction threshers (e.g., any of spring-loaded compaction thresher 2900, 3000, 3100) the tailgate compaction assemblies may compensate for hard refuse objects being compacted during operation, thus preventing the tailgate compaction assemblies from binding or stalling.

Figure 68:
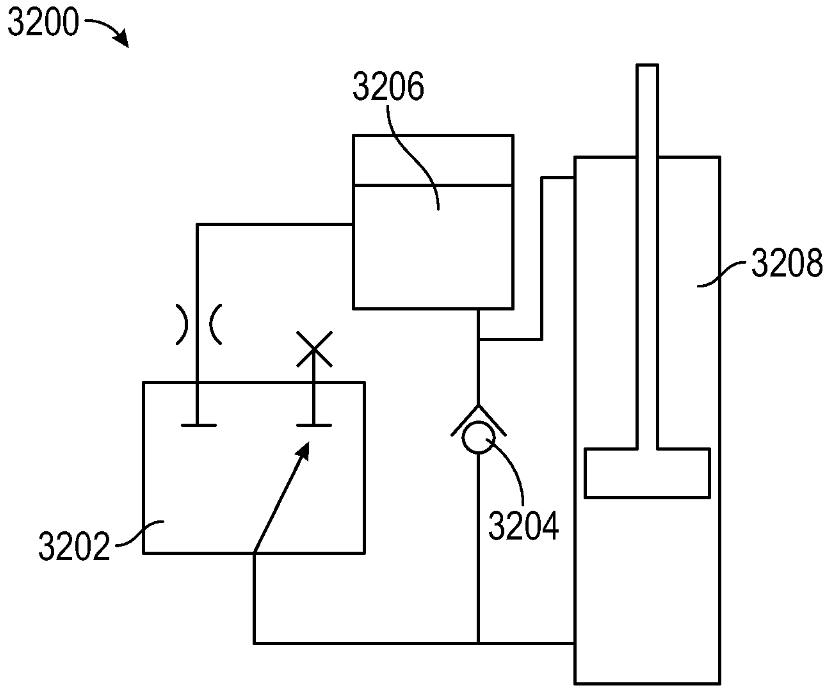
FIG. 68 is a schematic view of a hydraulic system configured to allow for an ejector to lift a tailgate of a refuse vehicle, according to an exemplary embodiment.

Referring now to FIG. 68, a hydraulic system 3200 is shown, according to an exemplary embodiment. The hydraulic system 3200 includes a switch 3202, a one-way check valve 3204, an ejector mechanism 3206, and a linear actuator 3208 configured to lift the tailgate of a refuse vehicle. The hydraulic system 3200 is configured such that the ejector mechanism 3206 may be used to passively hold the linear actuator 3208, and thereby the tailgate of the refuse vehicle, in the opened position. For example, use of the closed-loop cylinder of the linear actuator 3208 may act as a holding device for the tailgate. The hydraulic system 3200 may allow for the elimination of "soft" hydraulic lines, thereby minimizing failures and leak issues. The hydraulic system 3200 may further provide a very high power density for the holding location of the tailgate.

Figure 69:
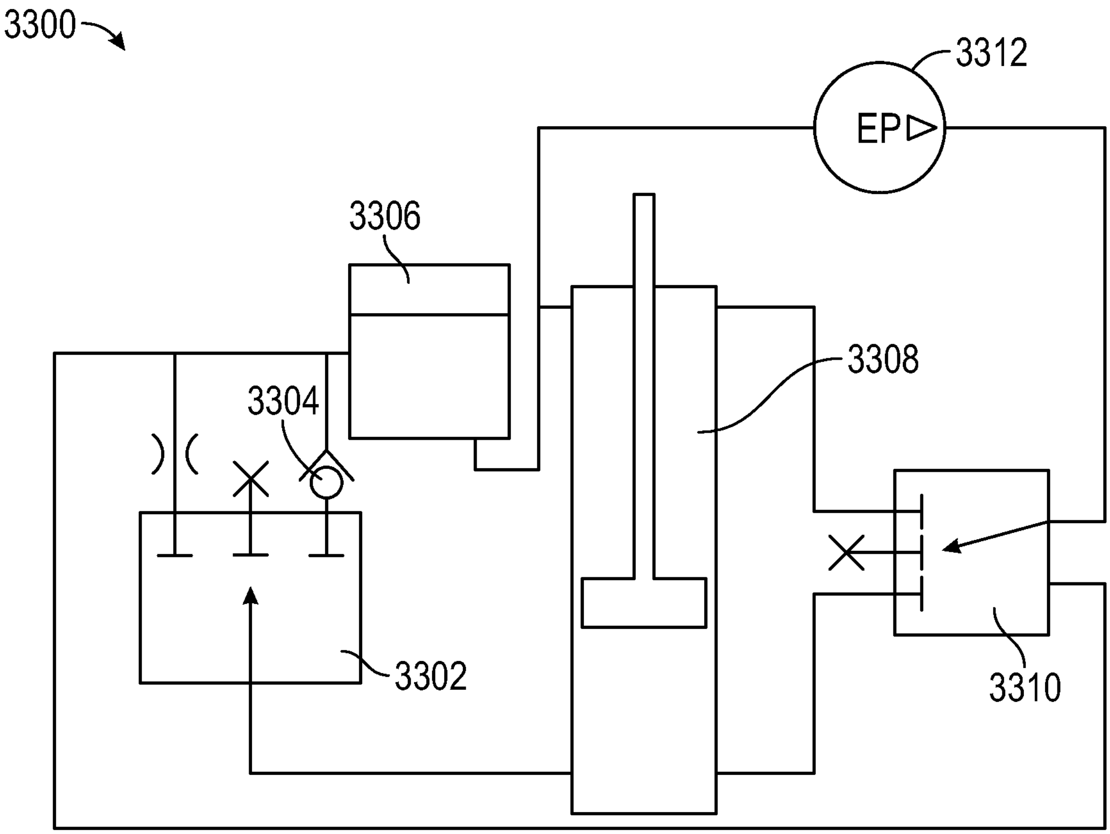
FIG. 69 is a schematic view of another hydraulic system configured to allow for an ejector to lift a tailgate of a refuse vehicle, according to an exemplary embodiment.

Referring now to FIG. 69, a hydraulic system 3300 is shown, according to an exemplary embodiment. The hydraulic system 3300 similarly includes a switch 3302, a check valve 3304, an ejector mechanism 3306, and a linear actuator 3308 configured to lift the tailgate of a refuse vehicle. The hydraulic system 3300 further includes a secondary switch 3310 and an electric pump 3312. The hydraulic system 3300 is configured for semi-passive holding of the linear actuator 3308, and thereby the tailgate of the refuse vehicle, in the opened position, with the potential for some small additional movement. The hydraulic system 3300 may similarly allow for the elimination of "soft" hydraulic lines, thereby minimizing failures and leak issues. The hydraulic system 3300 may further similarly provide a very high power density for the holding location of the tailgate.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the various refuse vehicles and the systems and components thereof as shown in the various exemplary embodiments is illustrative only. Additionally, any element disclosed in one embodiment may be incorporated or utilized with any other embodiment disclosed herein. For example, in one exemplary embodiment, both an ejector mechanism (e.g., mechanism 325) incorporating the helical band actuator 400 and the tailgate 2434 including the thresher assembly 2445 may be implemented into the refuse vehicle 1710. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle comprising:

a chassis;

a body assembly coupled to the chassis and defining a refuse compartment configured to store refuse material; and a tailgate comprising:

a refuse receiving portion configured to receive refuse material;

a thresher assembly including a compaction thresher comprising a plurality of tines and a plurality of tine springs configured to bias the plurality of tines in a direction of compaction, wherein the plurality of tine springs are each disposed around a corresponding tine of the plurality of tines; and an electrically driven actuation mechanism configured to selectively actuate the thresher assembly.

2. The refuse vehicle of claim 1, wherein the electrically driven actuation mechanism comprises an electric motor.

3. The refuse vehicle of claim 1, wherein the compaction thresher is one of a stationary compaction thresher or a rotary compaction thresher and the thresher assembly further includes the other of the stationary compaction thresher or the rotary compaction thresher.

4. The refuse vehicle of claim 3, wherein the rotary compaction thresher is configured to be articulated in a cyclical manner to engage and pack the refuse material received by the refuse receiving portion into the refuse compartment.

5. The refuse vehicle of claim 1, further comprising:

a tailgate lifting mechanism selectively actuatable to move the tailgate between an opened position and a closed position; and an ejector mechanism selectively actuatable to move an ejector between a refuse receiving position and an ejecting position.

6. The refuse vehicle of claim 5, wherein the ejector mechanism is a scissor mechanism selectively actuatable between an extended position and a retracted position to move the ejector between the receiving position and the ejecting position.

7. The refuse vehicle of claim 5, wherein the ejector mechanism comprises a belt drive system including a belt extending along a length of the refuse compartment, coupled to the ejector, and selectively actuatable to move the ejector between the receiving position and the ejecting position.

8. The refuse vehicle of claim 5, wherein the ejector mechanism comprises a recirculating cable winch system selectively actuatable to move the ejector between the refuse receiving position and the ejecting position.

9. A refuse vehicle comprising:

a chassis;

a body assembly coupled to the chassis and defining a refuse compartment configured to store refuse material;

an ejector mechanism selectively actuatable to move an ejector between a refuse receiving position and an ejecting position;

a tailgate moveable between an opened position and a closed position, the tailgate comprising:

a refuse receiving portion configured to receive refuse material; and a thresher assembly actuatable to compact the refuse material received by the refuse receiving portion into the refuse compartment, the thresher assembly including a compaction thresher comprising a plurality of tines and a plurality of tine springs configured to bias the plurality of tines in a direction of compaction, wherein the plurality of tine springs are each disposed around a corresponding tine of the plurality of tines; and an electrically driven actuation mechanism configured to selectively actuate at least one of the ejector mechanism or the tailgate.

10. The refuse vehicle of claim 9, wherein the ejector mechanism is a push chain ejector mechanism comprising:

a gear system including one or more gears; and a link system having a plurality of interlocking chain links configured to be selectively deployed by the gear system upon rotation of the one or more gears, the plurality of interlocking chain links further configured to form a rigid column upon deployment from the gear system, the rigid column being configured to selectively push the ejector from the refuse receiving position into the ejecting position.

11. The refuse vehicle of claim 9, wherein the ejector mechanism is a helical band actuator configured to selectively actuate between a retracted position and an extended position to move the ejector between the refuse receiving position and the ejecting position.

12. The refuse vehicle of claim 9, wherein the ejector mechanism is a scissor mechanism selectively actuatable between an extended position and a retracted position to move the ejector between the receiving position and the ejecting position.

13. The refuse vehicle of claim 9, wherein the ejector mechanism comprises a belt drive system including a belt extending along a length of the refuse compartment, coupled to the ejector, and selectively actuatable to move the ejector between the receiving position and the ejecting position.

14. The refuse vehicle of claim 9, wherein the ejector mechanism is a double-acting lead screw configured to selectively actuate between a retracted position and an extended position to move the ejector between the refuse receiving position and the ejecting position.

15. The refuse vehicle of claim 9, wherein the ejector mechanism comprises a recirculating cable winch system selectively actuatable to move the ejector between the refuse receiving position and the ejecting position.

16. A refuse vehicle comprising:

a chassis;

a body assembly coupled to the chassis and defining a refuse compartment configured to store refuse material; and a tailgate moveable between an opened position and a closed position, the tailgate comprising:

a refuse receiving portion configured to receive refuse material;

a tailgate compaction assembly selectively actuatable to compact the refuse material received by the refuse receiving portion into the refuse compartment, wherein the tailgate compaction assembly is a thresher assembly including a compaction thresher comprising a plurality of tines and a plurality of tine springs configured to bias the plurality of tines in a direction of compaction, wherein the plurality of tine springs are each disposed around a corresponding tine of the plurality of tines; and a tailgate lifting mechanism comprising an electric actuator that is selectively actuatable to move the tailgate between the opened position and the closed position.

17. The refuse vehicle of claim 16, wherein the tailgate lifting mechanism is a sliding gate lift mechanism comprising an actuation track and the electric actuator is configured to engage the actuation track of the sliding gate lift mechanism to actuate the tailgate between the opened position and the closed position along the actuation track.

18. The refuse vehicle of claim 16, wherein the tailgate lifting mechanism is a rack and pinion lift mechanism including a rack and a pinion gear, the rack being coupled to and axially translatable by the pinion gear, the rack further being coupled to the tailgate, and the electric actuator is configured to selectively rotate the pinion gear, thereby axially translating the rack and moving the tailgate between the opened position and the closed position.

19. The refuse vehicle of claim 18, wherein the rack comprises a curved rack.

20. The refuse vehicle of claim 16, further comprising a scissor mechanism selectively actuatable between an extended position and a retracted position to move an ejector between a refuse receiving position and an ejecting position.

* * * * *